US009109614B1

(12) United States Patent
Fong et al.

(10) Patent No.: US 9,109,614 B1
(45) Date of Patent: Aug. 18, 2015

(54) COMPRESSED GAS ENERGY STORAGE SYSTEM

(75) Inventors: Danielle A. Fong, Oakland, CA (US);
Stephen E. Crane, Santa Rosa, CA (US); Edwin P. Berlin, Jr., Oakland, CA (US); AmirHossein Pourmousa Abkenar, Walnut Creek, CA (US)

(73) Assignee: LightSail Energy, Inc., Berkeley, CA (US)

( * ) Notice: Subject to any disclaimer, the term of this patent is extended or adjusted under 35 U.S.C. 154(b) by 720 days.

(21) Appl. No.: 13/411,484

(22) Filed: Mar. 2, 2012

Related U.S. Application Data

(60) Provisional application No. 61/449,403, filed on Mar. 4, 2011.

(51) Int. Cl.
| | |
|---|---|
| F15B 21/14 | (2006.01) |
| F15B 21/04 | (2006.01) |
| H02J 15/00 | (2006.01) |
| F15B 1/26 | (2006.01) |

(52) U.S. Cl.
CPC ............... *F15B 21/042* (2013.01); *F15B 1/265* (2013.01); *H02J 15/006* (2013.01); *F15B 2201/42* (2013.01); *F15B 2211/625* (2013.01); *Y02E 60/15* (2013.01)

(58) Field of Classification Search
CPC ............... F15B 21/042; F15B 2201/42; F15B 2211/625; F15B 1/265; H02J 15/006; Y02B 10/30; Y02E 60/15
USPC ................... 60/398, 413, 415, 370, 371, 408; 220/592.2
See application file for complete search history.

(56) References Cited

U.S. PATENT DOCUMENTS

| | | |
|---|---|---|
| 1,751,537 A | 3/1930 | Vianello |
| 2,049,421 A | 9/1932 | Brelsford et al. |
| 1,929,350 A | 10/1933 | Christensen |
| 3,192,705 A | 7/1965 | Miller |

(Continued)

FOREIGN PATENT DOCUMENTS

| | | |
|---|---|---|
| CN | 1105103 A | 12/1995 |
| CN | 1432109 A | 7/2003 |

(Continued)

OTHER PUBLICATIONS

Stephenson et al., "Application of Liquid Sprays to Achieve Isothermal Compression, Part 1", Presented at the 17th Annual Conference on Liquid Atomization & Spray Systems (ILASS), Sep. 2-6, 2001, Zurich, Switzerland.

(Continued)

*Primary Examiner* — Dwayne J White
*Assistant Examiner* — Logan Kraft

(57) ABSTRACT

Embodiments of the present invention use compressed air to store and deliver electrical, mechanical, and/or thermal power with high round-trip efficiency. Various embodiments may be scalable for use in a variety of environments—from wind farms to power plants to motor vehicles. An energy storage system according to the present invention can operate as a stand-alone storage system that connects electrically to the grid, it can be tightly integrated with a wind turbine, and/or it can be co-located with a thermal power generation facility and operate with even higher efficiency by scavenging low-grade waste heat.

22 Claims, 53 Drawing Sheets
(28 of 53 Drawing Sheet(s) Filed in Color)

(56) References Cited

U.S. PATENT DOCUMENTS

| | | | |
|---|---|---|---|
| 3,877,229 | A | 4/1975 | Resler, Jr. |
| 4,393,653 | A | 7/1983 | Fischer |
| 4,426,847 | A | 1/1984 | Fischer |
| 4,432,203 | A | 2/1984 | Fischer |
| 4,454,427 | A | 6/1984 | Sosnowski et al. |
| 4,476,821 | A | 10/1984 | Robinson et al. |
| 4,640,343 | A * | 2/1987 | Dearden et al. .............. 165/70 |
| 4,702,273 | A | 10/1987 | Allen, Jr. et al. |
| 4,723,516 | A | 2/1988 | Slagley et al. |
| 4,747,271 | A | 5/1988 | Fischer |
| 4,777,915 | A | 10/1988 | Bonvallet |
| 4,861,236 | A | 8/1989 | Kustes et al. |
| 5,076,067 | A | 12/1991 | Prenger et al. |
| 5,121,607 | A | 6/1992 | George, Jr. |
| 5,176,164 | A | 1/1993 | Boyle |
| 5,195,874 | A | 3/1993 | Odagiri |
| 5,261,360 | A | 11/1993 | Voll et al. |
| 5,491,969 | A | 2/1996 | Cohn et al. |
| 5,537,822 | A | 7/1996 | Shnaid et al. |
| 5,634,340 | A | 6/1997 | Grennan |
| 5,680,764 | A | 10/1997 | Viteri |
| 5,934,076 | A | 8/1999 | Coney |
| 5,946,908 | A | 9/1999 | Motoyama et al. |
| 6,082,324 | A | 7/2000 | Liu |
| 6,158,465 | A | 12/2000 | Lambert et al. |
| 6,206,660 | B1 | 3/2001 | Coney et al. |
| RE37,603 | E * | 3/2002 | Coney .......................... 60/407 |
| 6,817,185 | B2 | 11/2004 | Coney et al. |
| 6,840,309 | B2 | 1/2005 | Wilson et al. |
| 6,874,453 | B2 | 4/2005 | Coney et al. |
| 6,883,775 | B2 | 4/2005 | Coney et al. |
| 7,082,911 | B2 | 8/2006 | Ezaki et al. |
| 7,086,231 | B2 | 8/2006 | Pinkerton |
| 7,140,182 | B2 | 11/2006 | Warren |
| 7,311,068 | B2 | 12/2007 | Jackson et al. |
| 7,356,993 | B2 * | 4/2008 | Smith ............................ 60/651 |
| 7,802,426 | B2 | 9/2010 | Bollinger |
| 7,832,207 | B2 * | 11/2010 | McBride et al. .............. 60/410 |
| 7,874,155 | B2 | 1/2011 | McBride et al. |
| 7,958,731 | B2 | 6/2011 | McBride et al. |
| 8,146,354 | B2 | 4/2012 | Fong et al. |
| 8,196,395 | B2 | 6/2012 | Fong et al. |
| 8,869,757 | B2 * | 10/2014 | Kim et al. ................. 123/41.31 |
| 8,912,684 | B2 | 12/2014 | Stahlkopf et al. |
| 2003/0180155 | A1 | 9/2003 | Coney et al. |
| 2004/0099003 | A1 * | 5/2004 | Yu .................................. 62/318 |
| 2004/0244580 | A1 | 12/2004 | Coney et al. |
| 2005/0274334 | A1 | 12/2005 | Warren |
| 2005/0279296 | A1 | 12/2005 | Coney et al. |
| 2006/0171824 | A1 | 8/2006 | Nieter et al. |
| 2006/0218924 | A1 | 10/2006 | Mitani |
| 2007/0006586 | A1 | 1/2007 | Hoffman et al. |
| 2007/0095069 | A1 | 5/2007 | Joshi et al. |
| 2007/0283157 | A1 | 12/2007 | Yami et al. |
| 2008/0006032 | A1 | 1/2008 | Robinson |
| 2008/0201147 | A1 | 8/2008 | Han et al. |
| 2008/0203347 | A1 | 8/2008 | Burrola et al. |
| 2009/0071062 | A1 * | 3/2009 | Hedman ...................... 43/132.1 |
| 2009/0283157 | A1 | 11/2009 | Hogan |
| 2010/0083921 | A1 | 4/2010 | Ooyama |
| 2010/0089063 | A1 | 4/2010 | McBride et al. |
| 2010/0218500 | A1 | 9/2010 | Ruer |
| 2010/0229544 | A1 | 9/2010 | Bollinger et al. |
| 2010/0307156 | A1 | 12/2010 | Bollinger et al. |
| 2011/0056368 | A1 | 3/2011 | McBride et al. |
| 2011/0094231 | A1 | 4/2011 | Freund |
| 2011/0100010 | A1 | 5/2011 | Freund et al. |
| 2011/0115223 | A1 | 5/2011 | Stahlkopf et al. |
| 2011/0131966 | A1 | 6/2011 | McBride et al. |
| 2011/0197834 | A1 | 8/2011 | Gustafson |
| 2013/0074949 | A1 | 3/2013 | McBride et al. |

FOREIGN PATENT DOCUMENTS

| | | |
|---|---|---|
| CN | 101146981 A | 3/2008 |
| DE | 69329459 T2 | 1/2001 |
| EP | 0647291 B1 | 9/2000 |
| JP | 56-085527 | 7/1981 |
| JP | 56-132477 A | 10/1981 |
| JP | 57-97006 A | 6/1982 |
| JP | 9-166028 A | 6/1997 |
| JP | 2000-314405 | 11/2000 |
| JP | 2004-218436 A | 8/2004 |
| JP | 2007-502389 A | 2/2007 |
| JP | 2007-107490 A | 4/2007 |
| KR | 20-1993-0011547 | 6/1993 |
| KR | 10-2008-0024497 A | 3/2008 |
| WO | WO 03/021702 A1 | 3/2003 |
| WO | WO 2008/139267 A1 | 11/2008 |
| WO | WO 2009/034421 A1 | 3/2009 |
| WO | WO 2009/034548 A2 | 3/2009 |
| WO | WO 2009/053593 A1 | 4/2009 |
| WO | WO 2009/061866 A2 | 5/2009 |

OTHER PUBLICATIONS

Linnemann et al., "The Isoengine—A Novel High Efficiency Engine with Optional Compressed Air Energy Storage (CAES)", Presented at the 2003 International Joint Power Generation Conference, Jun. 16-19, 2003, Atlanta, Georgia, USA.

Coney et al., "Engineering Aspects of a Novel High Efficiency Reciprocating Internal Combustion Engine", Presented at the 2002 International Joint Power Generation Conference, Jun. 24-26, 2002, Phoenix, Arizona, USA.

Coney et al., "Development of a Reciprocating Compressor Using Water Injection to Achieve Quasi-Isothermal Compression", Presented at the International Compressor Engineering Conference at Purdue, Jul. 16-19, 2002.

Malmgren et al., "Experiments and Simulations of a Quasi-Isothermal Compressor for a Novel High Efficiency Engine", Copyright 2003.

Stephenson et al., "Application of Liquid Sprays to Achieve Isothermal Compression, Part 2," Presented at the 17th Annual Conference on Liquid Atomization & Spray Systems (ILASS), Sep. 2-6, 2001, Zurich, Switzerland.

* cited by examiner

- Combinations of Configurations are Possible
- (Parenthesis) indicate optional functionality or optional presence of element

| Configuration | ID | 1 | 2 | 3 | 4 |
|---|---|---|---|---|---|
| | Description | Energy Storage | Energy Delivery | Heat Engine | Heat Engine |
| | Storage | to storage | from storage | No storage | No storage |
| | Gas Flow | Open System; Fig. 9BA; upward to storage | Open System; Fig. 9BB; downward from storage | Closed Circuit; Fig. 9BC; counter-clock-wise/clockwise | Open System; Fig. 9BD; Left→Right/ Right→Left |
| Cylinder No. | 14502 | Compressor | Expander | Compressor/ Expander | Compressor/ expander |
| | 14504 | Compressor | Expander | Expander/ Compressor | Expander/ compressor |
| Valve No. Connection: Port a - port _ | 14506 | b | c | d | b |
| | 14508 | c | b | d | d |
| | 14510 | b | c | d | d |
| | 14512 | c | b | d | b |
| Counterflow Heat Exchanger 14538 | Side 1 | N/A | N/A | Cold/Hot | N/A |
| | Side 2 | | | Hot/Cold | |
| Gas-Gas Heat Exchanger | 14514 | -- | -- | -- | -- |
| | 14516 | (act as heater) | (act as cooler) | (act as heater/ act as cooler) | (act as heater/ act as cooler) |
| | 14518 | -- | -- | -- | -- |
| | 14520 | (act as heater) | (act as cooler) | (act as cooler/ act as heater) | (act as cooler/ act as heater) |
| Liquid-Gas Heat Exchanger | 14522 | (act as heater) | (act as cooler) | (act as heater/ act as cooler) | (act as heater/ act as cooler) |
| | 14524 | (act as heater) | (act as cooler) | (act as cooler/ act as heater) | (act as cooler/ act as heater) |
| External Thermal Node | 14526 | (Heat Sink) | (Heat Source) | (Heat Sink/ Heat Source) | (Heat Sink/ Heat Source) |
| | 14528 | (Heat Sink) | (Heat Source) | Heat Sink/ Heat Source | Heat Sink/ Heat Source |
| | 14530 | (Heat Sink) | (Heat Source) | Heat Sink/ Heat Source | (Heat Sink/ Heat Source) |
| | 14532 | (Heat Sink) | (Heat Source) | (Heat Source/ Heat Sink) | (Heat Source/ Heat Sink) |
| | 14534 | (Heat Sink) | (Heat Source) | (Heat Source/ Heat Sink) | (Heat Source/ Heat Sink) |
| | 14536 | (Heat Sink) | (Heat Source) | (Heat Source/ Heat Sink) | (Heat Source/ Heat Sink) |
| | 14540 | N/A | N/A | Heat Sink or Heat Source | Heat Sink or Heat Source |

FIG. 9A

Heat engine + Compressor (storage)

Heat engine + expander (energy delivery)

Contours of Velocity Magnitude (mixture) (m/s) Time=24855e-03.

1 cm from cylinder head 2 cm from cylinder head 3 cm from cylinder head 4 cm from cylinder head

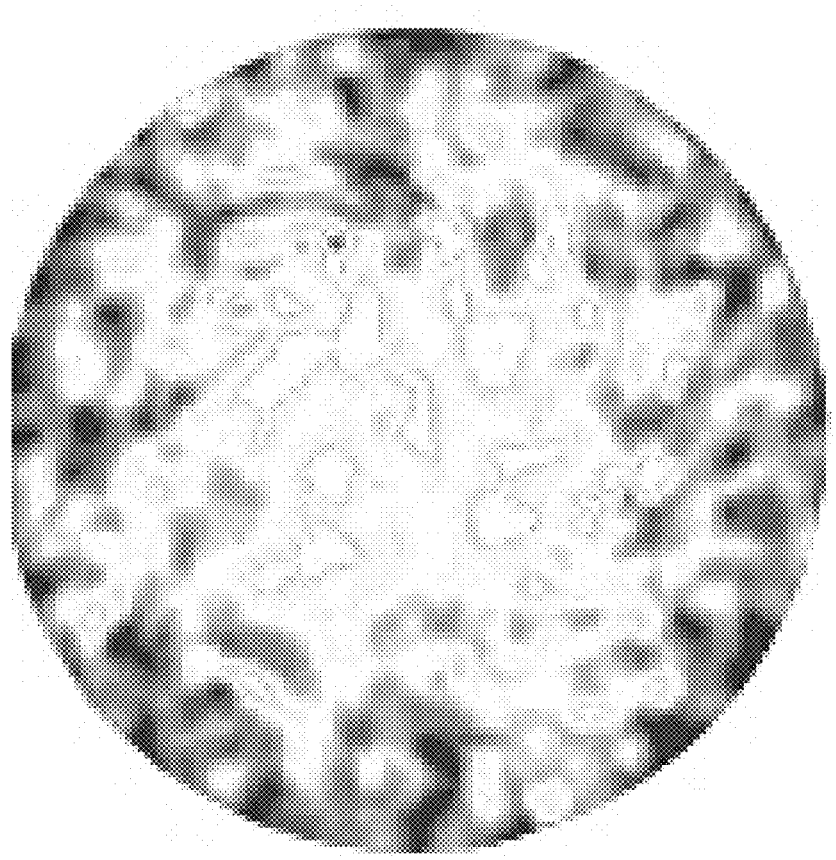
FIG. 18E  5 cm from cylinder head
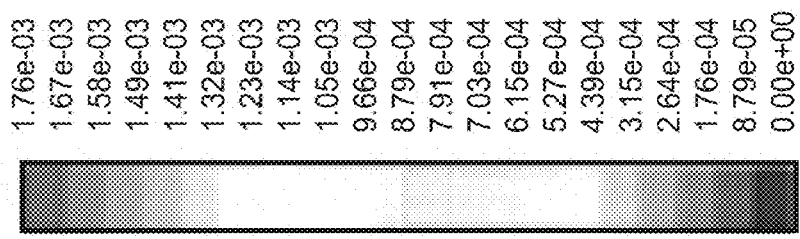

6 cm from cylinder head

COMPRESSED GAS ENERGY STORAGE SYSTEM

CROSS-REFERENCE TO RELATED APPLICATION

The instant nonprovisional patent application claims priority to U.S. Provisional Patent Application No. 61/449,403 filed Mar. 4, 2011, which is incorporated by reference in its entirety herein for all purposes.

BACKGROUND

The availability of low-cost energy storage at utility scales would address a number of issues relating to the energy grid. In particular, the deployment of renewable power generators, such as wind and solar, may be limited by a difficulty in these technologies providing a reliable supply of power at predictable times or during periods of high demand.

SUMMARY

Embodiments of the present invention use compressed air to store and deliver electrical, mechanical, and/or thermal power with high round-trip efficiency. Various embodiments may be scalable for use in a variety of environments—from wind farms to power plants to motor vehicles. An energy storage system according to the present invention can operate as a stand-alone storage system that connects electrically to the grid, it can be tightly integrated with a wind turbine, and/or it can be co-located with a thermal power generation facility and operate with even higher efficiency by scavenging low-grade waste heat.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 9A shows various basic operational modes of the system of FIG. 9.

FIGS. 18A-F show liquid injection into a piston.

DESCRIPTION

Incorporated by reference herein for all purposes is the U.S. Patent Publication 2011/0115223. Compressed air is capable of storing energy at densities comparable to lead-acid batteries—but without a battery's limited lifetime or materials availability or disposal issues.

| Storage Medium | Energy Density (Wh/kg) | Energy Density (Wh/liter) | Cycle Efficiency (%) | Lifetime (80% DoD cycles) |
|---|---|---|---|---|
| Lead-acid batteries | 30 to 60 | 80 to 150 | 75 | <1000 |
| Lithium-ion batteries | 160 | 270 | 90 | ~1600 to 3000 |

| Storage Medium | Energy Density (Wh/kg) | Energy Density (Wh/liter) | Cycle Efficiency (%) | Lifetime (80% DoD cycles) |
| --- | --- | --- | --- | --- |
| Redox flow batteries | 10 to 20 | 15 to 25 | 70+ | 10000? |
| High-speed flywheel | 4.3 | 9.8 | 85 | >10000 |
| Pumped hydro (head = 200 m) | 0.55 | 0.55 | 75 to 85 | >10000 |
| Compressed air (LSE tech at 300 atm) | 142 | 38.9 | 70+ (See below) | >10000 |

The energy density of compressed air is a function of its pressure. Off-the-shelf technology exists to store and handle air at 200 to 300 atmospheres (i.e. the working pressure of scuba tanks), which may be an operational pressure range for embodiments of the systems.

A useful number to keep in mind is that about 140 kJ of energy (=38.9 watt-hours) is stored in one liter of air at 300 atmospheres pressure. That is, 25.7 liters of 300 atmosphere air will store one kilowatt-hour. Typical laboratory compressed gas cylinders hold 80 liters, or just over 3 kWh.

To retrieve the entire amount of the energy, the expansion process must be 100% efficient. Development efforts focus upon coming as close that that number as possible.

Figure 10:
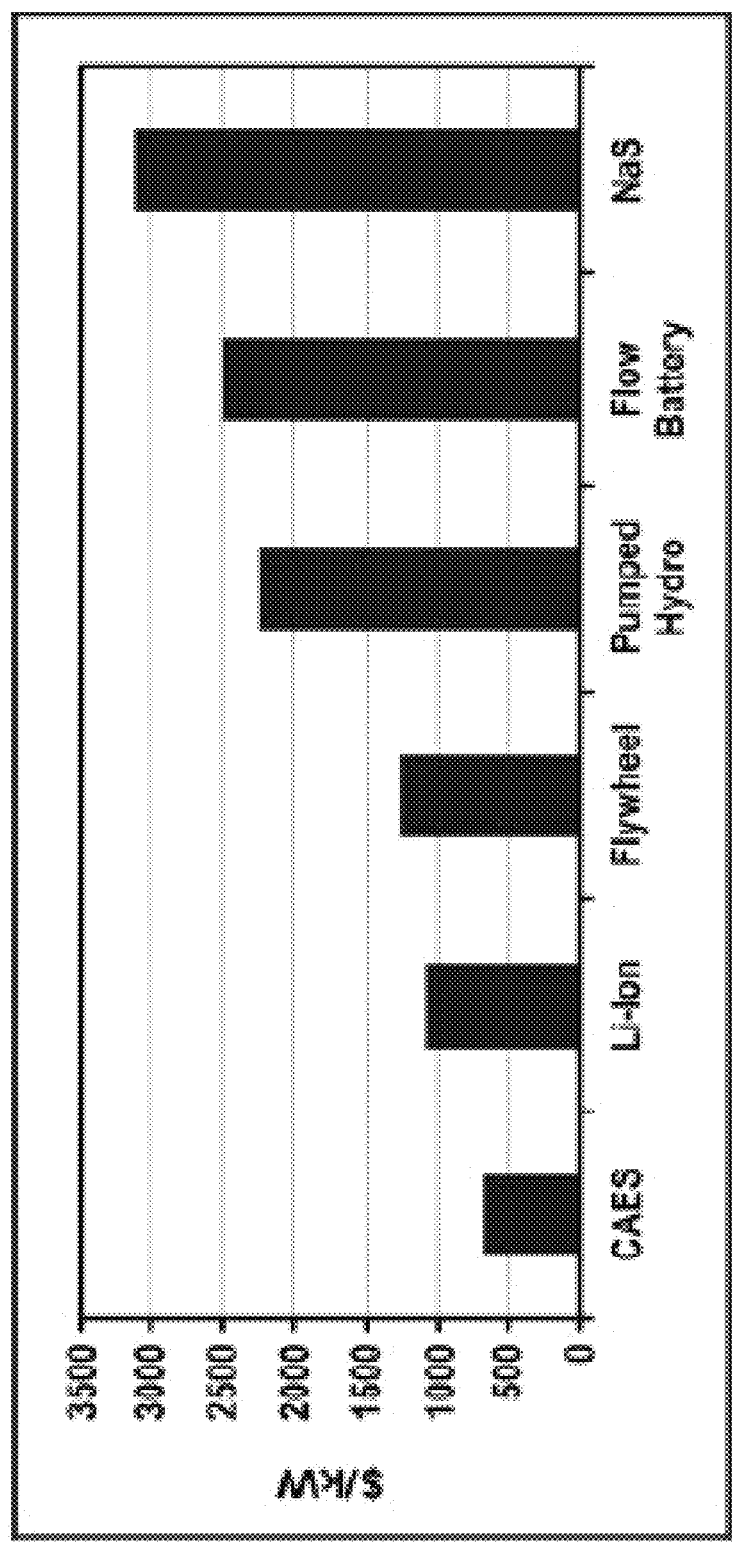
FIG. 10 plots cost of various energy storage approaches.

One advantage of compressed air energy storage is its low capital cost. The source for FIG. 10 is a Department of Energy (DOE) Energy Advisory Board report on energy storage technologies. Though each bar comes with a number of caveats, other reports come to similar conclusions. Costs are discussed in more detail below.

Compressed air energy storage (CAES) can be a low-cost solution for bulk energy storage. However, known CAES technology losses are supplemented by burning fossil fuels and, even then, delivering only half the energy stored. Embodiments of the present invention seek to improve round-trip efficiency and permit CAES to be used cost-effectively for a broad variety of energy storage applications.

Thermodynamics of Compression and Expansion

Thermodynamics plays a role in making compressing and expanding air inefficient in most applications. When air is compressed, it heats up. The heated air wants to expand, resisting further compression. As a result, extra work may need to be done to obtain a high compression ratio. Unless all the heat generated is kept in perfectly insulated thermal storage, the lost heat is irrecoverable, leading to a low efficiency.

The reverse situation applies during expansion. Specifically, the expanding air cools, preventing it from expanding as much as it would have had it stayed at its original temperature. Less power is produced as a result.

Also, compressing to high pressures can heat the air to very high temperatures. Adiabatic compression (that is, a compression process during which no heat leaves the compression chamber) from one atmosphere pressure to 300 atmospheres will heat the air being compressed to about 1500° C. That creates quite a design challenge for the compression apparatus—most common materials won't handle those temperatures, and the thermal stress on the system is extreme. Similarly, expanding air that has any moisture in it will result in condensation and freezing of the condensed water, likely clogging valves and pipes.

A solution is to remove the heat of compression from the compression chamber as it's being created—and/or to add heat to the chamber during expansion. If all the heat generated during compression is removed as quickly as it's being created and then added back during expansion, both processes will occur at a constant temperature. That is, compression and expansion will proceed isothermally.

Accordingly, certain embodiments of the present invention may perform gas expansion or compression in a manner in which a temperature change experienced by the gas is controlled to be within a predetermined range. Where that range is relatively narrow, the expansion or compression can be said to occur in a manner that is isothermal or near-isothermal.

In certain embodiments of the present invention, gas may be compressed or expanded cumulatively across multiple stages. In some embodiments a temperature change experienced by each stage may be substantially equivalent (whether the process comprises gas compression or gas expansion). As referenced herein, the term "substantially equivalent" refers to a temperature change that differs by 500° C. or less, by 300° C. or less, by 100° C. or less, by 75° C. or less, by 50° C. or less, by 25° C. or less by 20° C. or less, by 15° C. or less, by 10° C. or less, or by 5° C. or less. The temperature change experienced by one or more particular stages, may be controlled according to embodiments of the present invention utilizing one or more techniques applied alone or in combination.

Isothermal compression and expansion are, in theory, completely reversible. That is, entropy is not created, and the processes are 100% efficient—you can get exactly as much energy back out as you put in.

In reality however, there are many other processes that drain energy from the system, including but not limited to: friction, leakage, pressure drops, etc. But, for high-pressure systems, thermodynamic inefficiency is by far the biggest loss.

Note that, if more heat is added during expansion than is necessary to keep the process isothermal, it is possible to get more energy out than was originally stored in the form of compressed air. That is, the cycle can be more than 100% efficient.

Of course, the extra energy delivered was obtained from the extra heat added during expansion. But, if a source of even low-grade heat is available that would otherwise be wasted—warm water from a power plant, say, or water heated by the sun—a compressed air energy storage system can be a net generator of energy.

Spray-Mediated Heat Transfer

In order to maintain near-isothermal conditions, a liquid (typically water with some additive) may be sprayed into the compression and/or expansion chambers in order to minimize the change in temperature. For example, water has a heat capacity of about 3200 times that of air by mass. So, if there is an equal mass of air and water, about 99.97% of the heat ends up in the water. Or, considered another way, instead of rising hundreds of degrees, the temperature of the compressed air/water droplet aerosol may rise only a few degrees.

Note that the presence of liquid doesn't change the amount of heat that has to be transferred from the air. That heat is still collected (almost entirely by the water) and transmitted out of the compression chamber, then transferred to a thermal store of some kind. However, the temperature of the process stays nearly constant, allowing efficient operation and making the heat transfer problem much easier to deal with.

A factor in allowing rapid heat exchange between the water introduced into the compression or expansion chamber and the air being compressed or expanded, is to have a large surface area where heat exchange can take place. Such a large surface area is characteristic of uniformly distributed, small liquid droplets.

There are many considerations in designing a spray system capable of supporting adequate heat exchange. The total air-liquid surface area may be above some minimum level in the compression/expansion chamber; the trajectory and velocity of the droplets may such that they have time to reach thermal equilibrium with the air before they hit a surface or body of liquid; the distribution of the droplets may need to be uniform so as to avoid hot/cold spots, etc.

Note that unlike a conventional refrigeration cycle, very little of the liquid sprayed into the compression chamber evaporates. Instead, the temperature typically rises by only a few degrees. So the great majority of the heat transfer occurs in the form of sensible heat—that is, by warming the water (or by cooling it in the case of expansion).

Certain compressor technologies may take some advantage of this principle. Some screw compressors, for example, are flooded with oil or water. Oil is sprayed into the inlets of some compressors. In a liquid ring compressor, compression vanes are surrounded by a ring of water formed by centrifugal force.

In none of these known cases, however, is enough liquid mixed with the air to effect substantially isothermal compression. In fact, water inside a compression chamber can create a number of issues.

One issue is corrosion. Most conventional compressor components are made of carbon steel, which is susceptible to rust. In addition, turbine compressors avoid water because water droplets can damage the high-speed turbine blades.

In a reciprocating compressor, the danger is that the presence of water in the compression chamber will result in hydro-lock. That is, the incompressible water will be unable to escape when the piston approaches top dead center, resulting in a blown head gasket, broken valve plate, bent connecting rod, or other catastrophic result.

Embodiments of systems of the present invention may be comprised of five components:
an air compression/expansion mechanism;
a control system;
compressed air storage;
heat exchanger(s) or thermal storage; and
a motor/generator (if the system is electrically coupled).

The Compression/Expansion Mechanism

There are many ways to compress air. There are centrifugal compressors, lobe compressors, screw compressors, axial turbine compressors, etc. Any of these approaches may offer viable technologies for compressed air energy storage according to embodiments of the present invention.

Embodiments of energy storage according to the present invention may exhibit one or more of the following characteristics:
compatibility with water sprays;
mechanically efficiency;
capability of handling high volumes of air;
high power density;
scalability across a broad power range;
low cost;
high reliability.

For very high power requirements—100 MW or greater—turbines may be well suited. However, spraying liquid into turbines can damage conventional high-speed rotor blades. Nevertheless, embodiments of the present invention may utilize liquid injection into a turbine.

Other CAES systems have used turbine compressors (without liquid spray) or hydraulic piston compressors. However, for powers ranging from hundreds of watts to megawatts, a technology that embraces many of the above characteristics is the one that is perhaps the oldest, most highly refined and definitely the most ubiquitous—the reciprocating piston.

As a result, certain embodiments of the present invention exhibit similarities with a conventional multi-stage reciprocating air compressor. That is, we will use (in most configurations) a cascade of pistons and cylinders may compress/decompress the air in stages.

Single-Stage System Design

Figure 11:
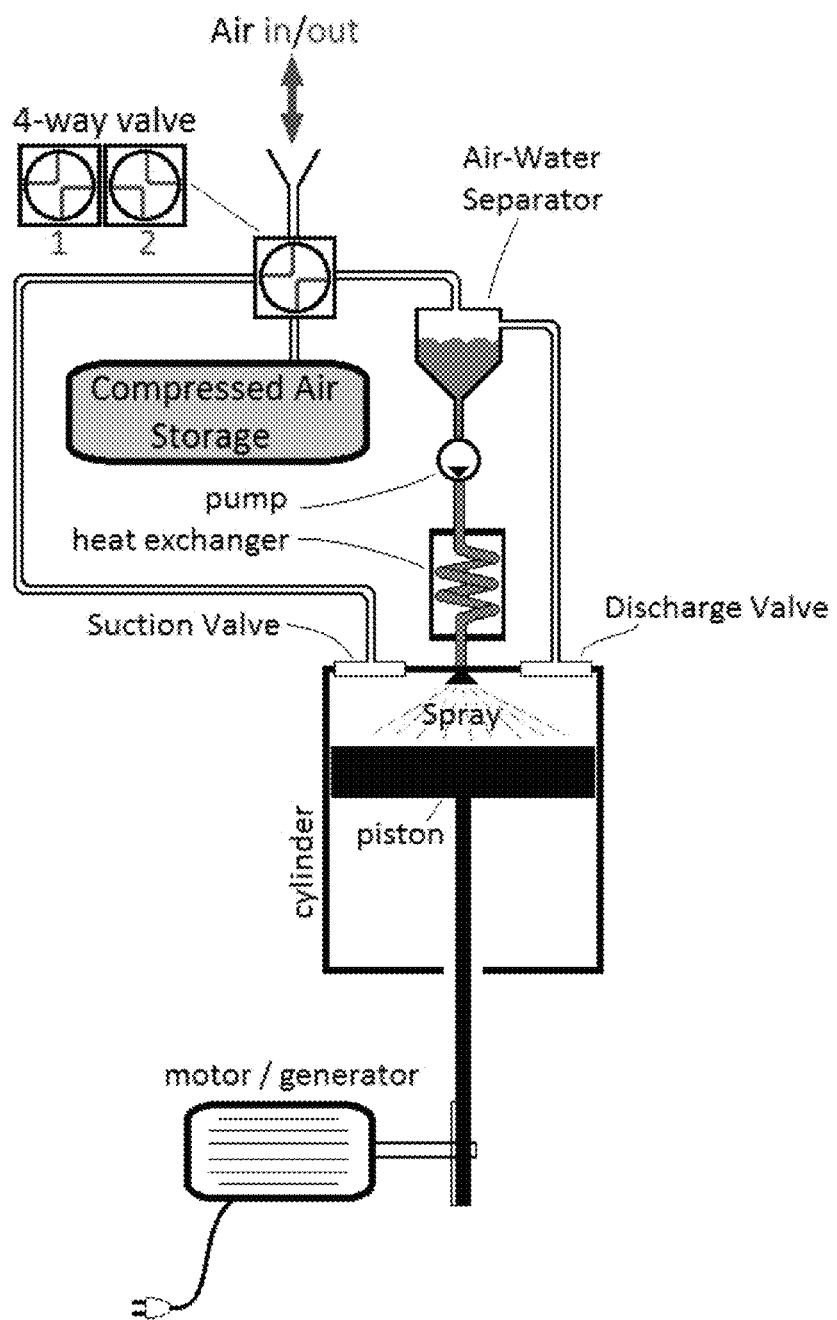
FIG. 11 shows one embodiment of a single-stage configuration of an energy storage system.

FIG. 11 shows one embodiment of a single-stage configuration. Some real-world systems will use multiple stages.

Compression may occur as follows, as summarized in the following table:

1. Air is drawn in through the air filter and enters the cylinder via the suction valve (Step 1).

2. Liquid is sprayed into the cylinder (or into a pre-mixing chamber upstream of the cylinder)

3. The resulting air-liquid aerosol is compressed in the cylinder by upward motion of the piston. The liquid absorbs the great majority of the heat of compression (Step 2).

4. The compressed mixture is exhausted from the cylinder via the discharge valve into the air-liquid separator (Step 3)

5. The compressed air flows into the compressed air storage tank via the four-way valve, which is in position 1

6. The separated liquid is pumped through a heat exchanger, which exchanges heat with an external thermal reservoir (e.g. the atmosphere, a water tank) in order to return its temperature to near-ambient—ready for the next spray cycle

|  | Step 1<br>Refill<br>cylinder | Step 2<br>Compress | Step 3<br>Move compressed<br>air to separator |
| --- | --- | --- | --- |
| Four-way valve | Position 1 | Position 1 | Position 1 |
| Suction valve | Open | Closed | Closed |
| Discharge valve | Closed | Closed | Open |
| Piston | At TDC at start of step | At BDC at start of step | Between BDC and TDC |

During step 1, the piston is driven upward by a crankshaft, by hydraulic pressure, or by some other mechanical means, compressing the air and liquid mist contained in the cylinder. Step 2 begins when the air pressure inside the cylinder reaches the pressure inside the pressure cell, at which point the discharge valve opens, allowing compressed air to flow from the cylinder to the pressure cell. During step 3, the piston is pulled down by a flywheel or other, out-of-phase pistons, allowing low-pressure air to refill the cylinder.

Expansion may happen similarly, as described below and in the following table:

1. Compressed air leaves the air tank via the four-way valve, which is in position 2, and enters the cylinder via the suction valve (Step 1)

2. Liquid is sprayed into the cylinder (or into a pre-mixing chamber upstream of the cylinder). In the case of expansion, the liquid spray adds heat to the process.

3. The resulting air-liquid aerosol expands nearly isothermally (Step 2)

4. The air-liquid mixture, now at atmospheric pressure, is exhausted from the cylinder into the air-liquid separator (Step 3)

5. The air is exhausted to the atmosphere

6. The separated liquid is pumped through a heat exchanger, which exchanges heat with an external thermal reservoir (e.g. the atmosphere, a chiller) in order to return its temperature to near-ambient—ready for the next spray cycle

|  | Step 1 Add compressed air to cylinder | Step 2 Expand | Step 3 Move expanded air to separator |
|---|---|---|---|
| Four-way valve | Position 2 | Position 2 | Position 2 |
| Suction valve | Open | Closed | Closed |
| Discharge valve | Closed | Closed | Open |
| Piston | At TDC at start of step | Between TDC and BDC | At BDC at start of step |

There are three process details worth noting here:

1. One potential benefit of a reciprocating piston compressor, is that the same system (with some minor modifications) can be used for both compression and expansion. This saves capital cost.

2. During expansion, only a pre-determined amount of air may be admitted into the cylinder at the beginning of each stroke. This amount is the volume of air at the current pressure in the storage tank, that will fill the total volume of the cylinder when it has fully expanded.

For example, in a single-stage system with a one liter cylinder and 20 atmospheres of pressure in the storage tank, the amount of compressed air that needs to be introduced into the cylinder is one twentieth of a liter, or 50 cc's. When the piston is at the bottom of its stroke, the air will have expanded to 20 times its compressed volume; that is, to one liter. At that point it will be at one atmosphere pressure. This approach of letting a pre-determined pulse of air into a cylinder, then letting it expand fully with the inlet and exhaust valves closed, allows efficient extraction of substantially the full amount of energy available in that air.

As the storage tank depletes, the inlet valve timing may be changed. The air pressure in the tank drops, and the volume of air introduced into the cylinder can be increased to maintain a steady power level. As a consequence, the valve may stay open longer, helping to maximize efficiency.

3. Control over the amount of air let into the cylinder allows varying the power output by the system. By allowing more air to enter the cylinder, the system can generate more power—at the cost of efficiency. If the system has to follow a varying load, the control system for the valves can adapt to very quickly.

Multi-Stage System Design

Now, let's say we are using N stages. We therefore have N cylinders. For simplicity, let's say that we want the expansion ratio, r, in each cylinder to be the same. r is therefore the $n^{th}$ root of the overall expansion ratio R:

$$r = \sqrt[N]{R}$$

The displacement in each successive cylinder increases exponentially. If $V_i$ is the volume of the $i^{th}$ cylinder, and $V_f$ is the total displacement of the system (that is, the sum of the displacements of all of the cylinders), then:

$$V_i = V_f \frac{r^j}{\sum_{j=1}^{N} r^j}$$

As an example, suppose that the total displacement of a three-stage system is one liter. If the stroke length of each piston is the same and equal to the bore (diameter) of the final cylinder, then the volumes of the three cylinders are 19 cm³, 127 cm³, and 854 cm³. The bores are 1.54 cm, 3.96 cm, and 10.3 cm, with a stroke length of 10.3 cm for all three.

Using the same compression ratio in each stage may offer an advantage in that each stage generates roughly the same amount of work, leading to a balanced load on the crankshaft. However, such an approach can also pose certain design challenges.

For example, roughly the same volume of water is sprayed into each cylinder, regardless of its diameter. Specifically, a same amount of power is put into each stage and, therefore, a same amount of heat has to be absorbed.

In practice, there is a limit to the volume fraction of water than can be introduced. This limits the compression ratio for the higher-pressure cylinders, assuming that the same ΔT is wanted in each cylinder. This is typically a valid assumption, otherwise, the cylinders with higher ΔT's would operate at lower efficiencies.

The Spray System

Although the idea of spraying water into a compression cylinder in order to absorb the heat of compression (and add heat during expansion) is conceptually simple, implementing such a spray system presents certain challenges.

One challenge is to provide enough thermal mass of water to absorb all the heat generated. This determines the minimum mass fraction of water.

Another challenge is to provide enough surface area to permit the heat exchange to occur in the time available (about 10 to 15 milliseconds at 1200 RPM). This determines the minimum droplet size.

A further challenge is to distribute water droplets uniformly throughout the chamber. "Dead spots" not only reduce efficiency but can subject those areas of the cylinder to high thermal stresses. As is shown and discussed below in connection with FIG. 5, sprayers can be configured to introduce liquid droplets to valve pockets to help enhance a uniformity of spray distribution.

Still another challenge is to allow droplets to reach thermal equilibrium between the time they exit the nozzle, and when they strike a cylinder surface or coalesce with other droplets. The mean free path/mean flight time is a complex function of nozzle pressure, volume fraction of water, droplet size, spray distribution, and other factors.

Yet another challenge is posed by having spray exiting the nozzle, break up into droplets quickly. In addition, the pumping power consumed to force the water through the nozzles must not be too great, as it represents a parasitic loss.

Theory

One size range of interest is for droplet size on the order of 100 microns. In this regime the droplets reach terminal velocity, and are therefore entrained in the air within a few milliseconds. This maximizes their ability to exchange heat with the air before they hit a wall and coalesce.

Figure 12:
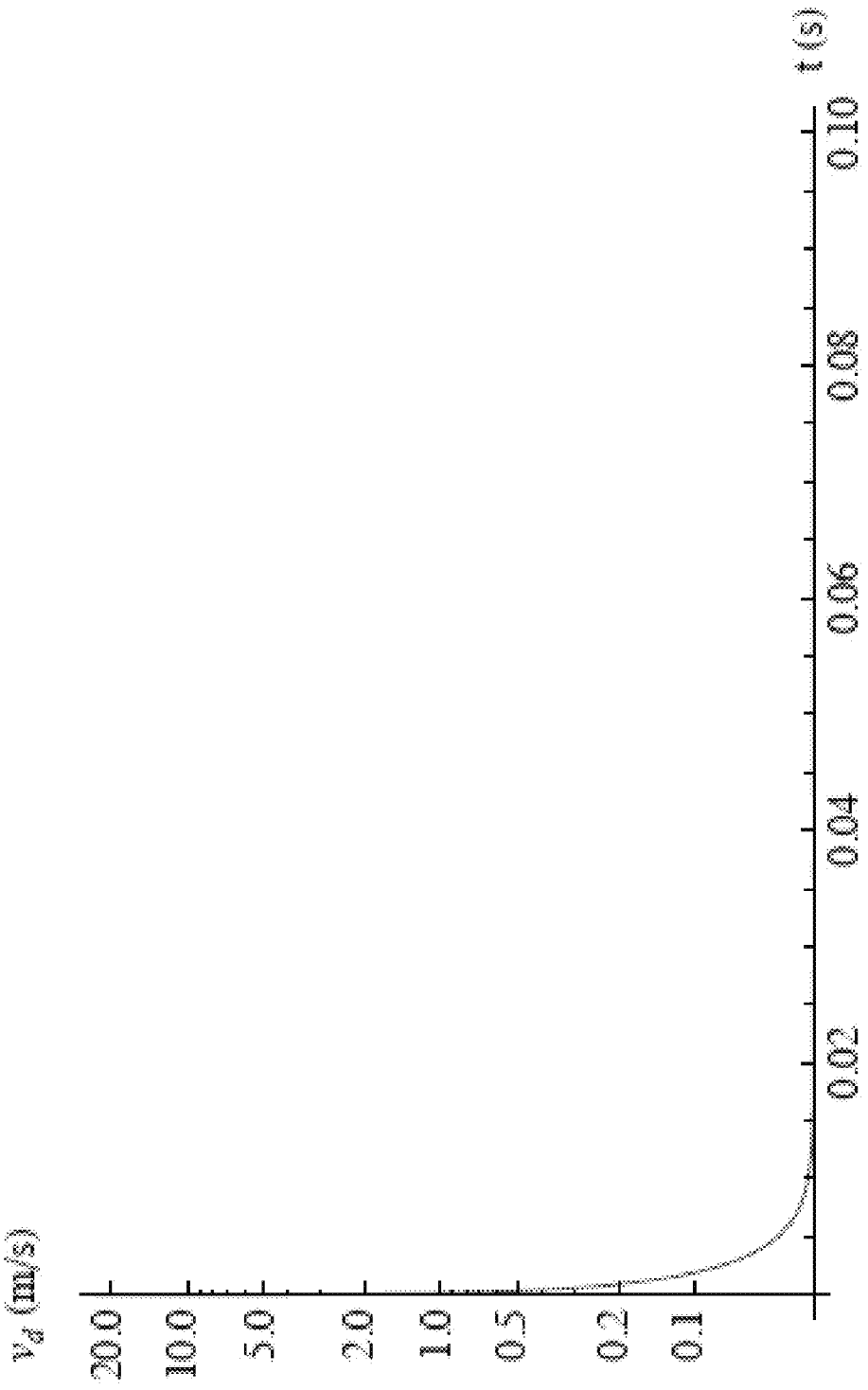
FIG. 12 plots droplet velocity versus time.
Figure 13:
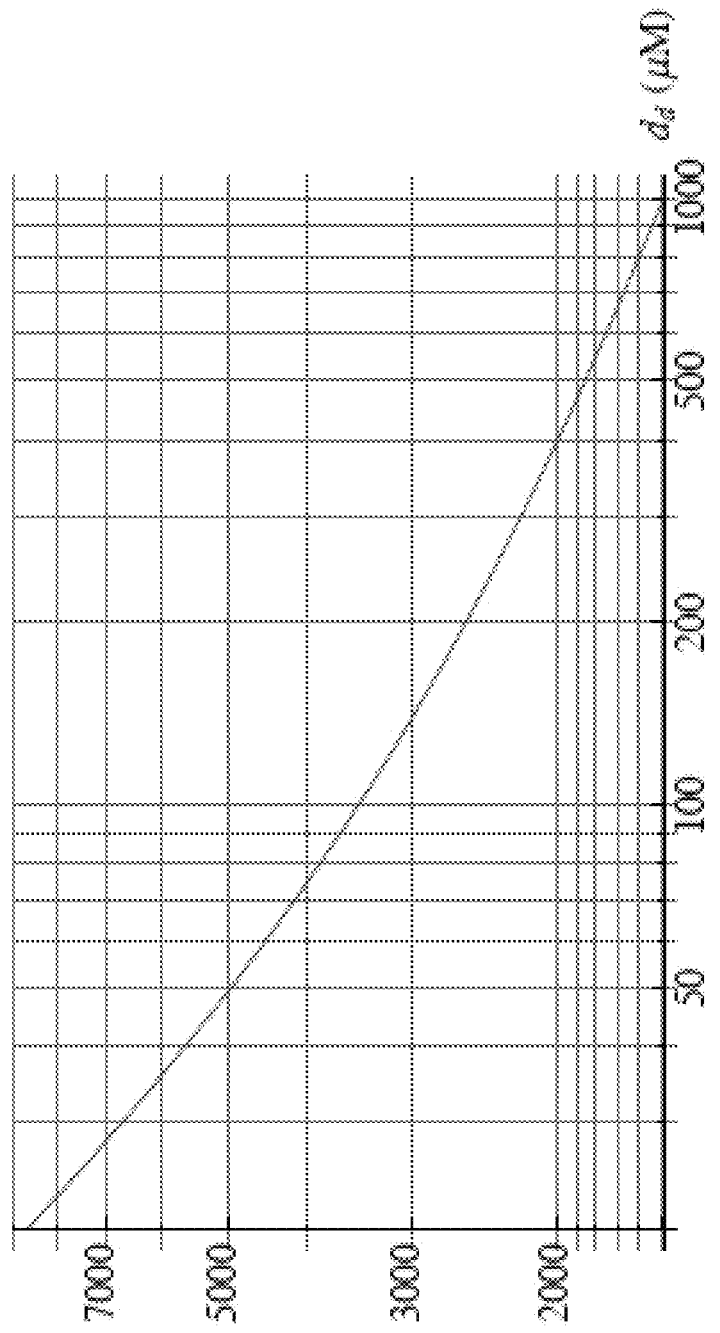
FIG. 13 plots heat transfer coefficient versus droplet diameter.

FIG. 12 shows that 100 micron droplets sprayed into the compression chamber at 20 meters per second decelerate rapidly and are effectively at zero velocity at 10 milliseconds. If that time is, let's say, to be on the order of one fifth of the duration of the compression stroke (which, in turn, is half of the complete cycle), then the maximum speed of the system is 600 RPM. FIG. 13 indicates that the ability of a droplet to transfer heat is, as expected, dependent on its diameter.

Figure 14:
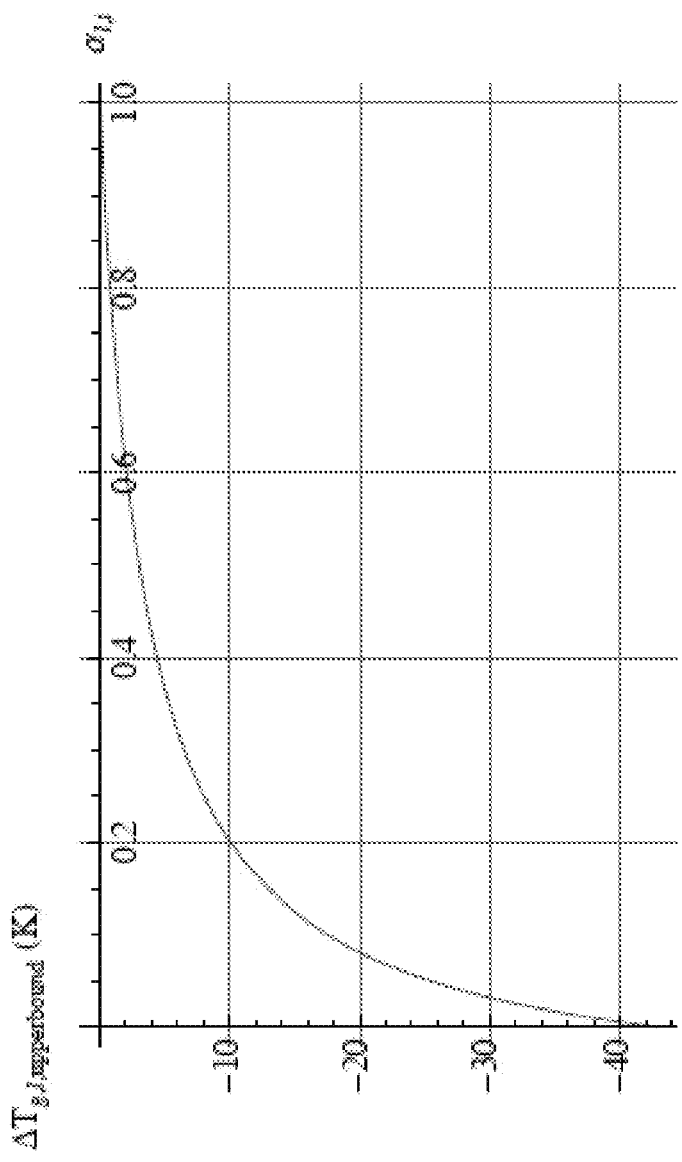
FIG. 14 plots temperature versus initial volume proportion of water in air.

One quantity for determination is the amount of water to be sprayed into the cylinder to achieve a particular ΔT (and, therefore, a particular thermodynamic efficiency) at a given pressure. FIG. 14 shows that, in order to keep the temperature drop to 10° C. as air expands from 300 atm to 150 atm, it is useful to begin the expansion with a very high volume fraction of 50 micron water droplets—about 20%.

Figure 15:
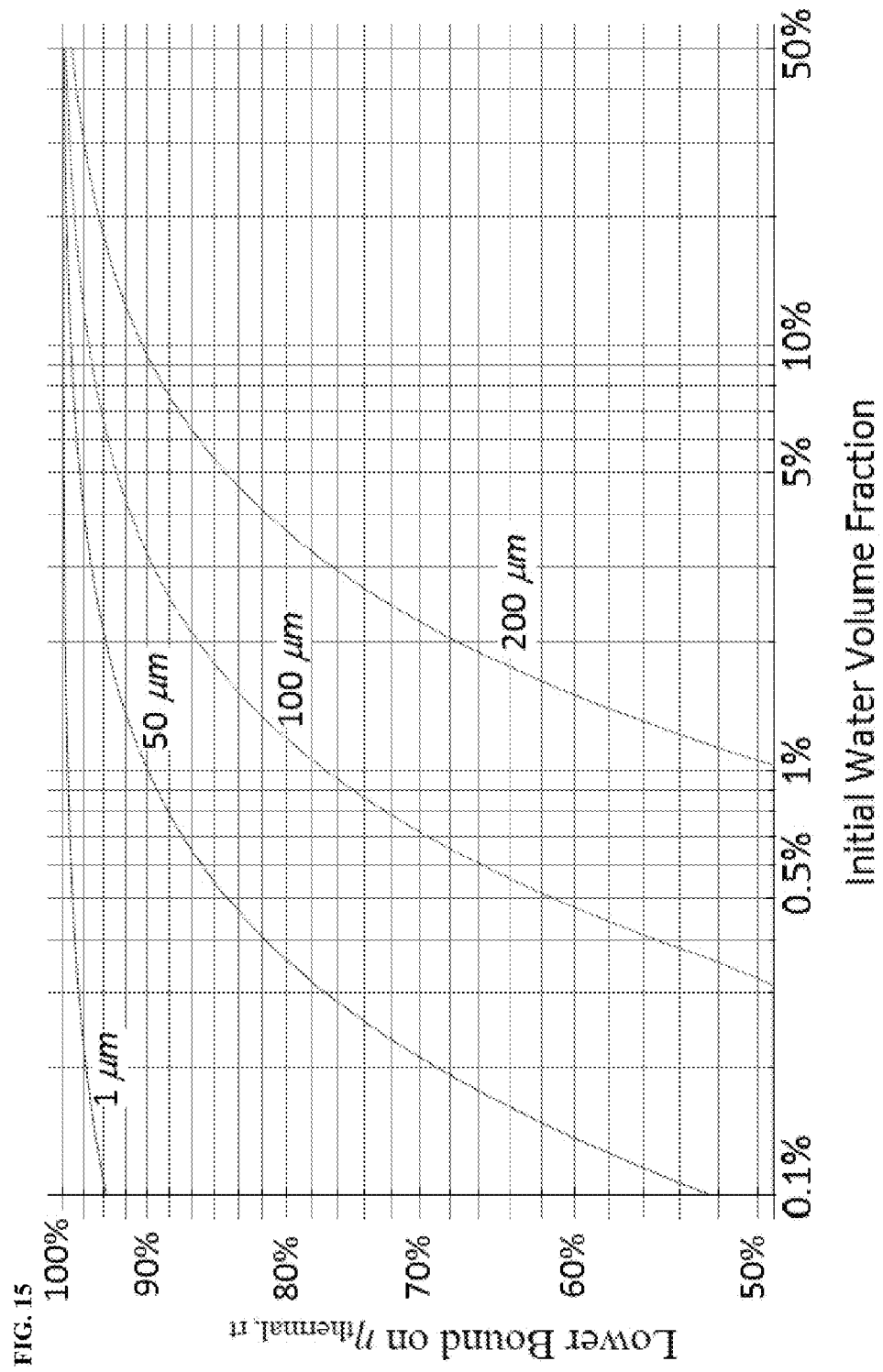
FIG. 15 plots efficiency versus water volume fraction.

The volume fraction needed becomes higher still at higher expansion (or compression) ratios. For this reason, it may be desirable to have smaller ratios for higher-pressure stages. At sufficiently high volume fractions, very high efficiencies are achievable with reasonably-sized droplets, as can be seen in FIG. 15.

Nozzle Design

It is desirable that the spray system fill the compression/expansion cylinder as uniformly as possible throughout the stroke, with a high density of droplets of the desired size, and with a minimum of pumping losses. Achieving such uniformity (that is, volume-filling) property has been challenging.

Figure 16A:
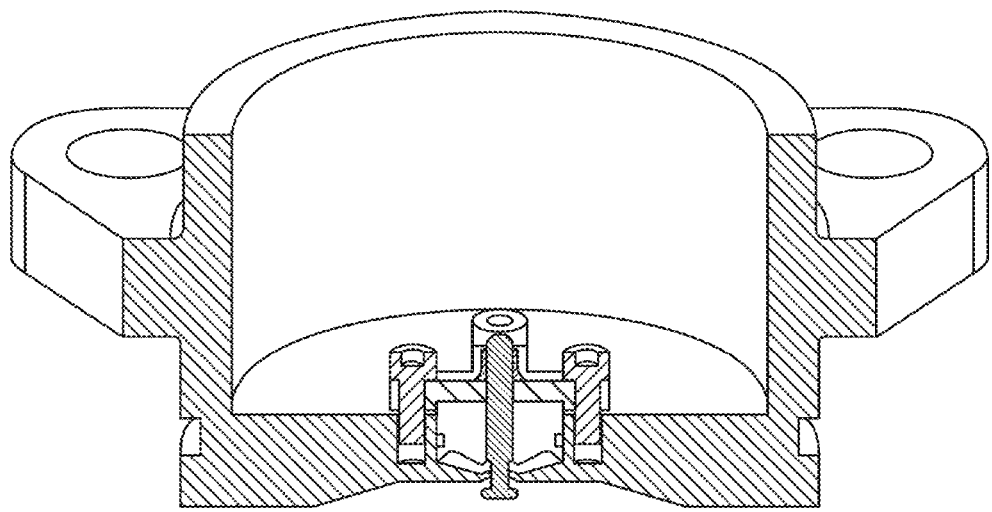
FIG. 16A shows the internal geometry of a nozzle embodiment.
Figure 16B:
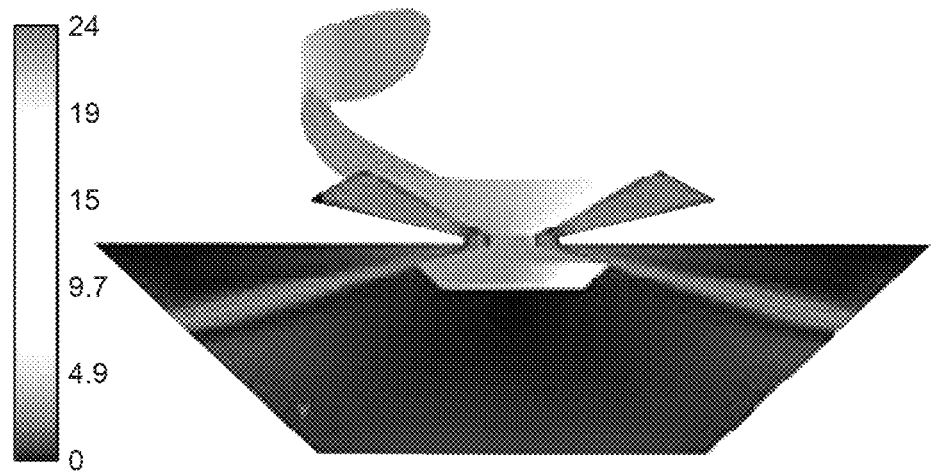
FIG. 16B shows a simulation of the velocity droplets emerging from the nozzle of FIG. 16A

Hollow-cone nozzles have been developed with a very wide cone angle (about 150°) to spread the spray across the full width of the cylinder bore even when the piston is near top dead center. The technique for achieving the wide angle is to swirl the spray as it emerges, then deflect it of a small central plate. FIGS. 16A-B shows the internal geometry of the nozzle and a simulation of the velocity of the emerging droplets, respectively.

Figure 17:
FIG. 17 shows a swirl nozzle.
Figure 18A:
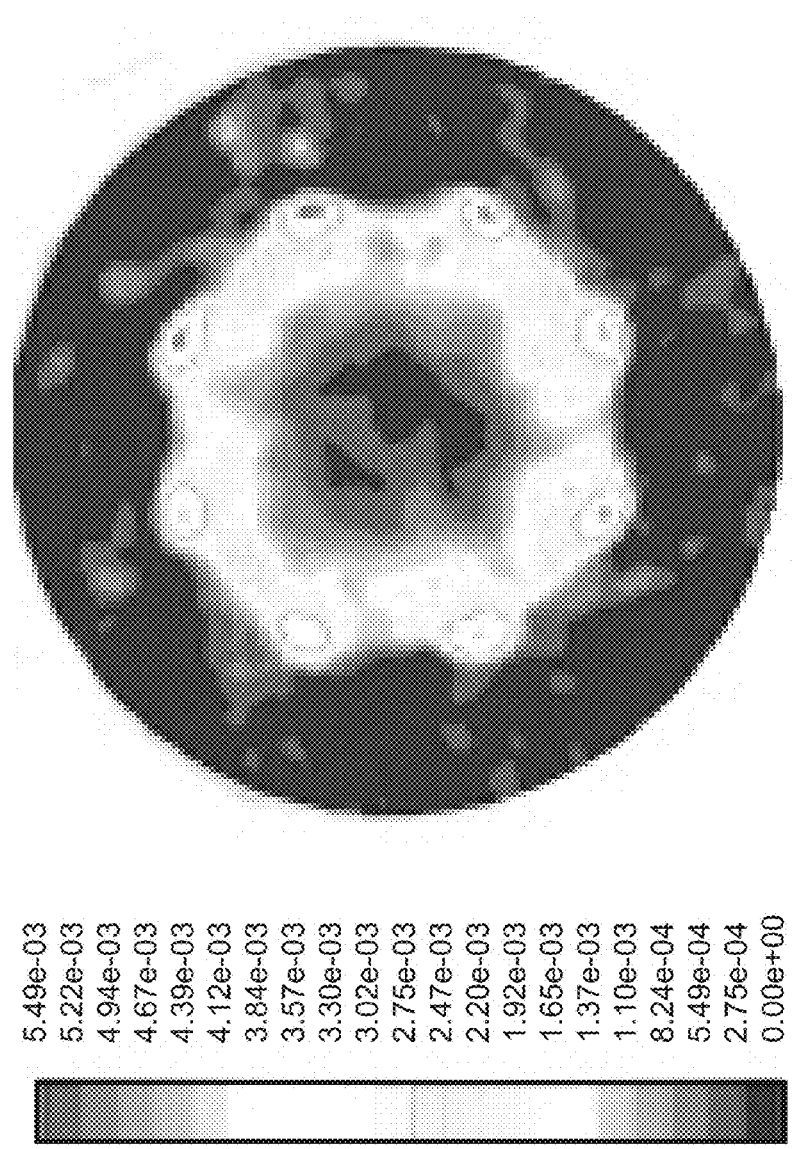
Figure 18B:
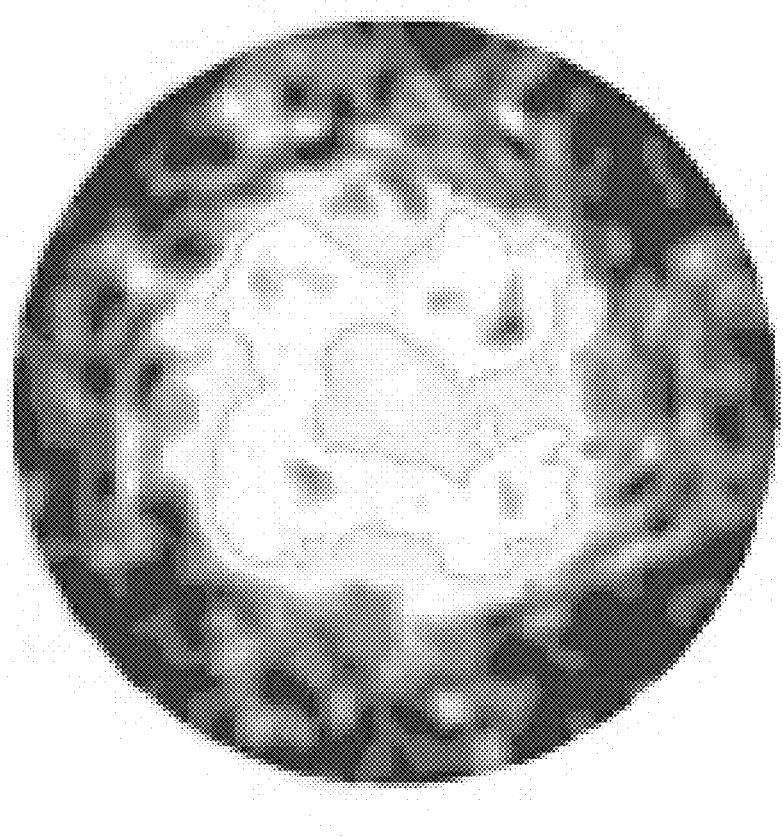
Figure 18B:
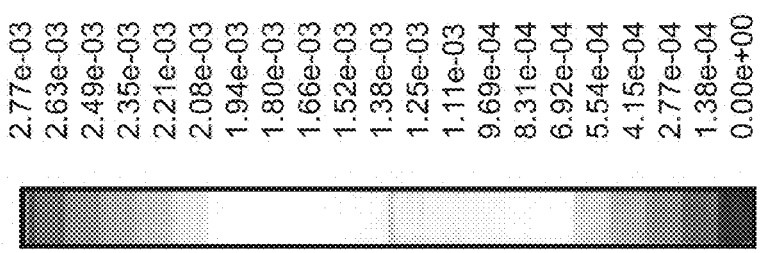
Figure 18C:
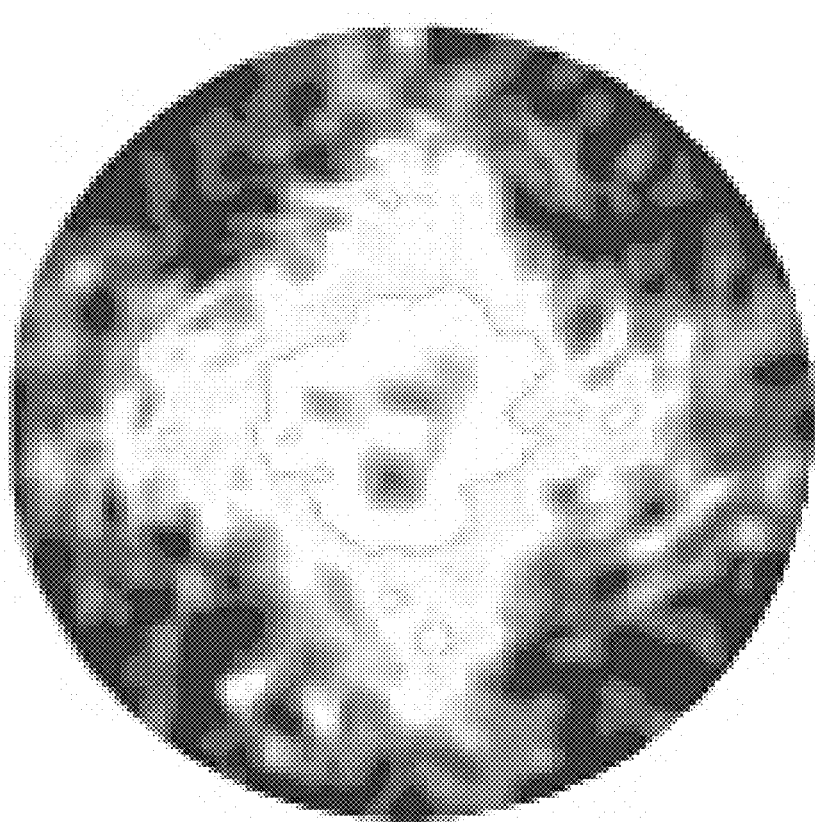
Figure 18C:
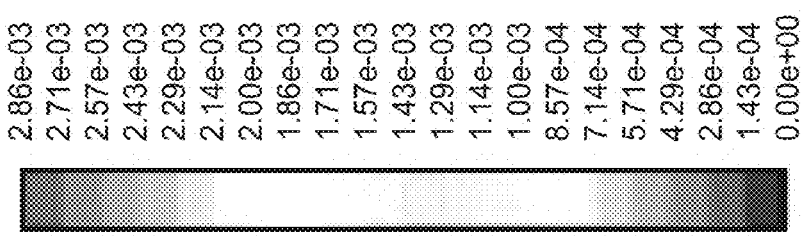
Figure 18D:
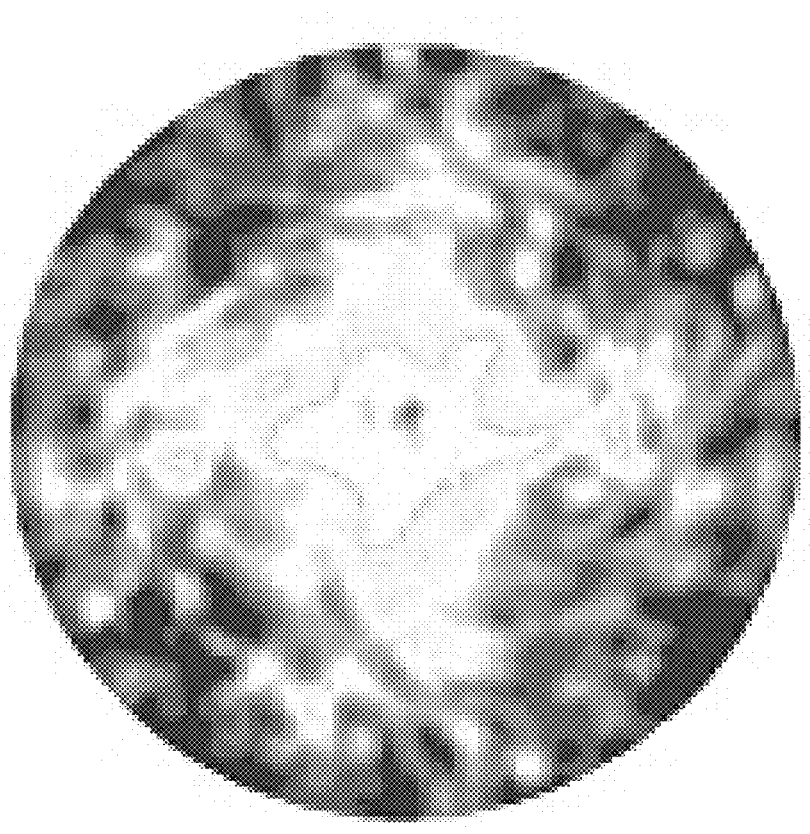
Figure 18D:
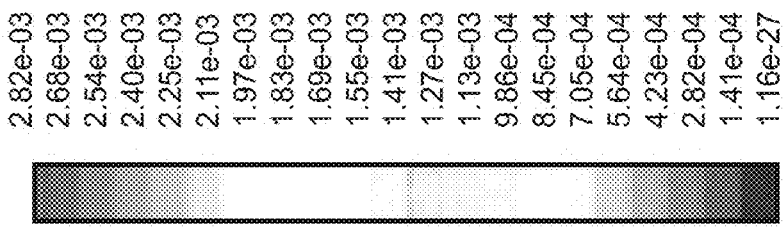
Figure 18F:
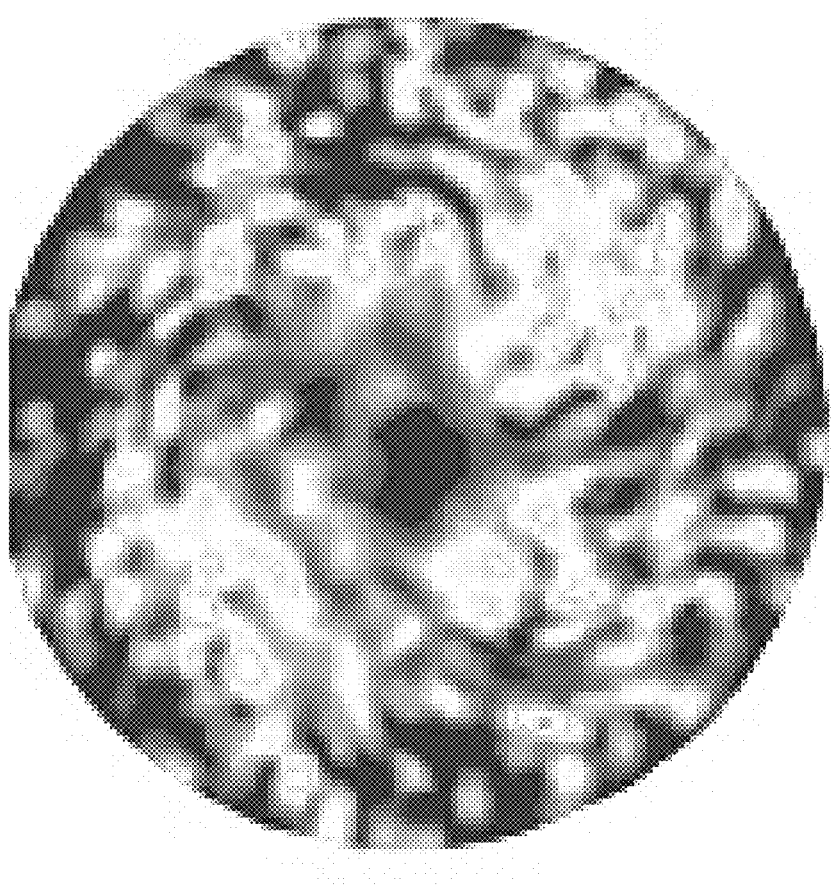

When the piston is closer to bottom dead center, nozzles that are more volume-filling may be used. Certain "showerhead" type nozzles for that purpose. In some cases, nozzles designed specifically for the geometry of a particular section of the cylinder (e.g. the valve pockets) may be used. The effect of swirl is shown in FIG. 17, along with the droplet break-up. The absence of a deflector plate produces a narrower cone.

Spray System Design

To achieve uniform volumetric distribution, nozzles can be positioned inside the compression cylinder with locations and spray patterns such that sufficient spray finds its way into all the nooks and crannies of the cylinder. An analogy exists with direct fuel injection in internal combustion engines. Such an approach is shown in FIGS. 18A-F.

Alternatively or in conjunction with direct injection, pre-mixing can be used upstream of the intake valves that entrain droplets in the incoming air stream. A pre-mixing chamber may have the velocity of the droplets slow down to match that of the air before they strike a wall.

The spray nozzles must be distributed such the sprays don't overly interfere with each other, which can lead to droplet coalescence. The droplets may be small enough to remain in the air flow as it moves through the intake manifold and the intake valves. Use of a pre-mixing chamber may call for a valve design allowing straight-through flow of the air-water droplet aerosol created within the chamber.

For the highest-pressure cylinder, both a pre-mixing chamber and in-cylinder nozzles may be used to achieve desired density of spray.

Valve Design

Large gas compressors typically use large-aperture, passive valves, such as plate valves for gas intake and discharge. These valves can operate quickly, have high effective flow areas, and are easy to maintain (the plates are typically hard plastic and can be replaced in a few minutes if they warp or crack). Passive valves are held closed via springs, and they open when there is a pressure differential across them sufficient to overcome the spring force (typically, very small).

In choosing the operating parameters of the valve, one consideration is that the effective flow area ($C_v$) is high enough to allow the water introduced by the spray system to exit during the exhaust stroke. Otherwise, there is the danger of hydro-lock, discussed above. In practice, the plate valves (and similar technologies such as poppet and ring valves) work well with no modifications, even at high compression ratios and high spray volumes.

While passive valves have the virtue of simplicity, they can flutter if the air flow has pulsations, resulting in leakage. In addition, it may not be easy to directly control when they open or close. This is acceptable for compression, but not helpful for expansion.

In order to allow a certain amount of air into the cylinder during expansion, and then close the valve, an active valve may be used (at least for the intake).

Active valves are more complex, in that they require some actuation mechanism, and some fail-safe device to handle the situation in which the valve doesn't open when it should. Otherwise, hydro-lock is a real danger.

However, active valves offer the advantage of direct control. This allows us to experiment with the timing—opening a little early, for example—in order to improve efficiency. This has been a component of performance tuning of internal combustion engines (another type of engine operated using active valves) throughout the long history of that technology. However, it is not typically used on air compressors.

If a valve is used in conjunction with a pre-mixing chamber, the flow path through the valve, when open, should not overly obstruct the passage of the droplet-laden air. Plate valves typically exhibit circuitous paths that are difficult for water droplets larger than a few microns to navigate successfully.

Figure 28:
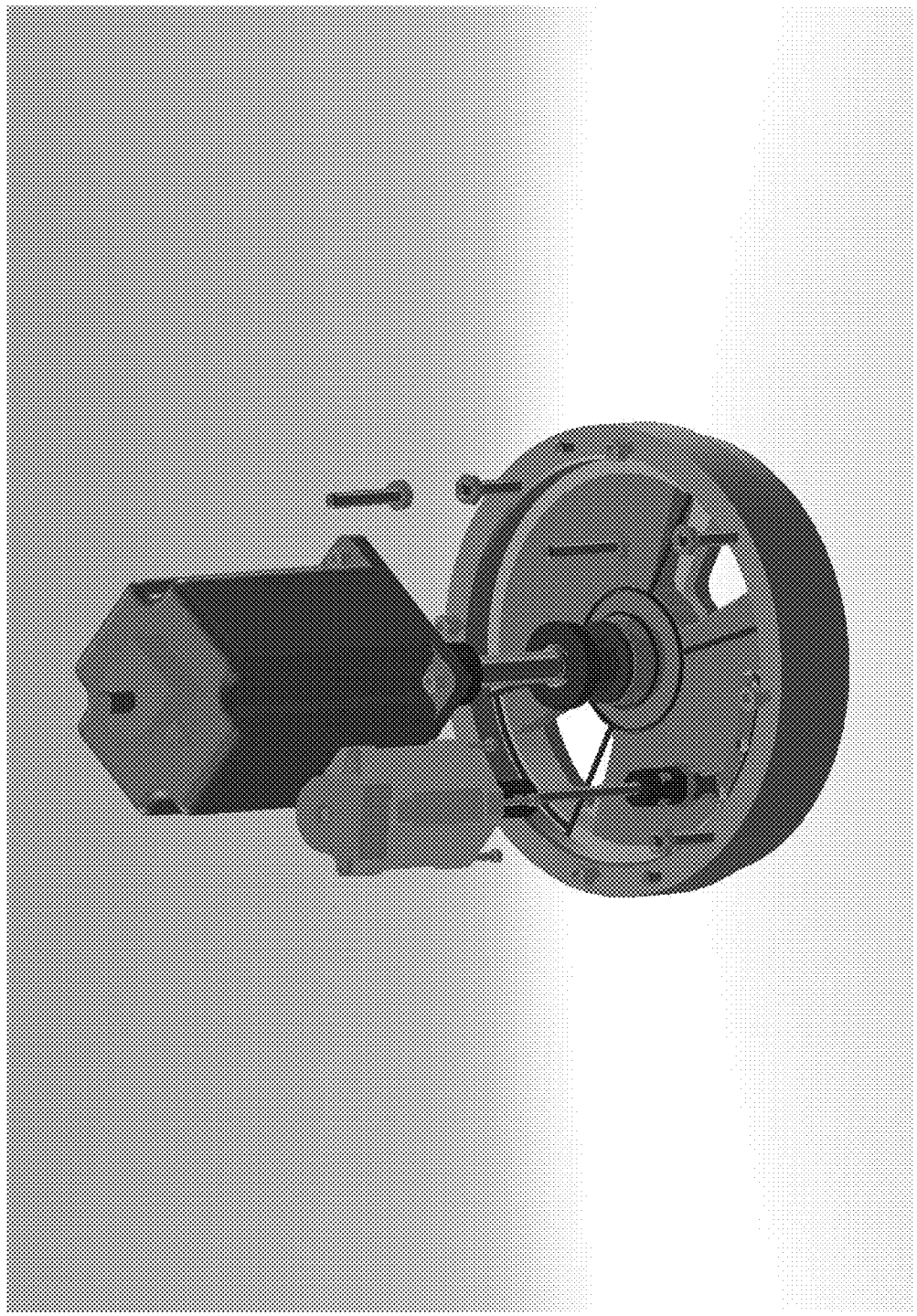
FIGS. 28-30 show views of an embodiment of an active valve.
Figure 29:
Figure 30:
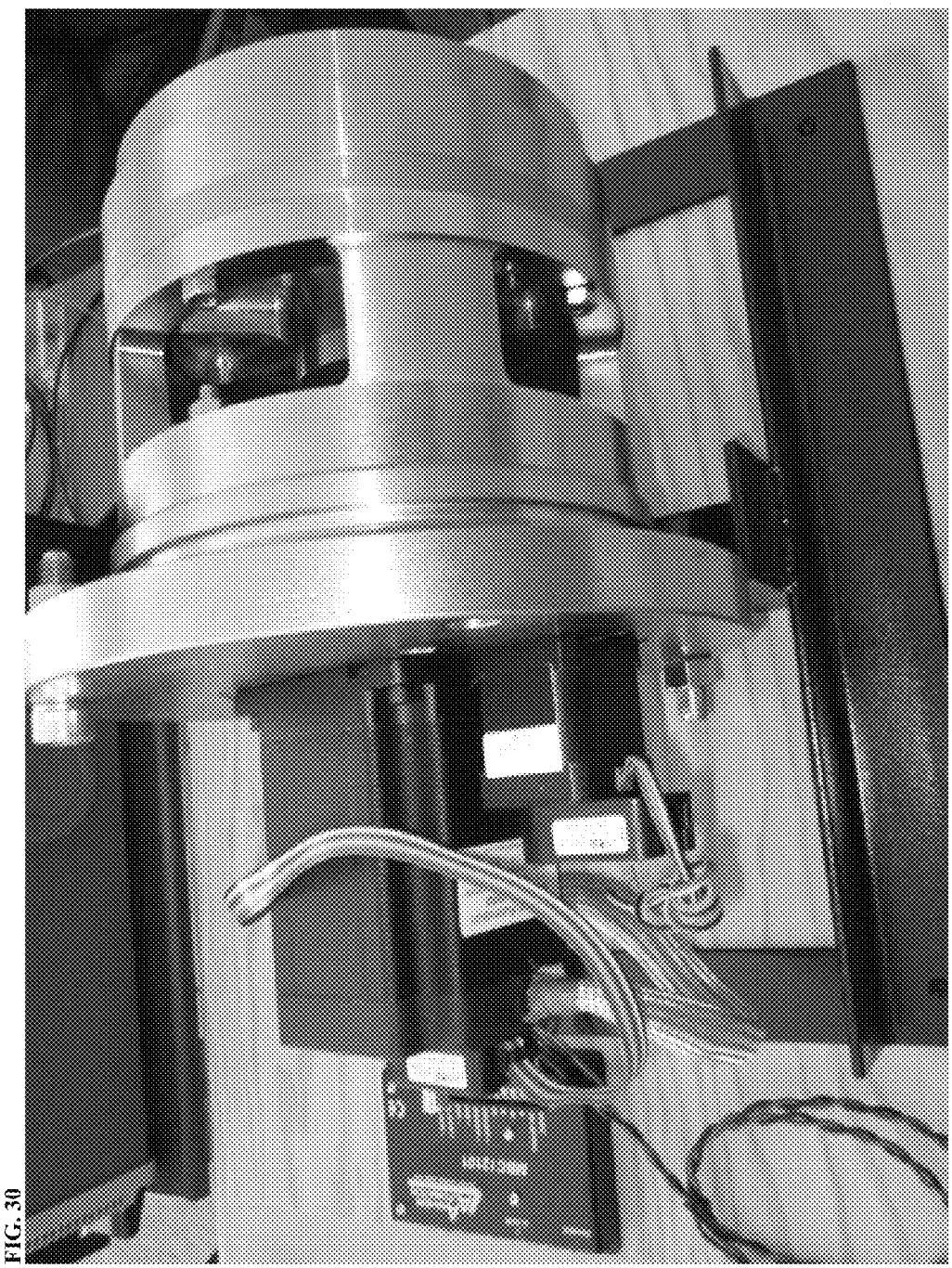

To address this problem, we have designed rotary valves with a large, unobstructed opening(s). One example is illustrated and described below in connection with FIGS. 28-30.

Materials Issues

Pressure vessels, cylinders, pulsation bottles and other system components of big compressors are typically made of carbon steel, and are therefore susceptible to corrosion when in regular contact with water. One approach, of course, is to use materials or liners that are less susceptible to corrosion. Examples include but are not limited to aluminum, brass, PVC, etc.

For large compression cylinders, however, steel is likely to be the most cost-effective and practical material. To use it with water, some form of anti-corrosion coating is required. A nickel-polymer coating protecting against both against corrosion and wear, may be useful.

Large compressors typically use oil-lubricated steel piston rings. However, the presence of oil in water may result in undesirable emulsification.

Non-lubricated versions of compressors are also common, and such systems typically use piston rings made of Teflon or PEEK, impregnated with materials such as molybdenum disulfide, carbon, or brass that act as solid lubricants. Embodiments of the present invention may employ cylinder and rings designed for non-lubricated operation. Examples include $MoS_2$ and brass-impregnated Teflon rings that have exhibited low wear and low leakage.

Control System

Unlike conventional engines and compressors, the timing and control of embodiments of systems according to the present invention, may be managed electronically. This allows, for example, maximizing expansion efficiency by varying $V_0$ as the pressure in the storage tank changes, as discussed above. The high-pressure inlet valve is simply opened for a longer time as the tank depletes.

Embodiments of rotary valves may use stepper motors that are phase-locked to the crankshaft. Pressure, temperature, humidity, and/or torque may be monitored during operation, and fine timing adjustments made as required to maximize efficiency.

The operating characteristics of the system—for example, the power output—can be determined by timing of the valves and their flow areas. Balancing pressure ratios among multiple stages can be effected by changes in the valve parameters as well.

To the first order, these parameters can be calculated based on the system simulation and empirical performance characteristics. However, real-time adjustments may be needed because of changes in the tank pressure during operation and the ambient conditions.

The basic approach for controlling an individual valve is to monitor three pressures: the pressure upstream of the cylinder, the pressure downstream the cylinder, and the pressure in the cylinder. For compression, the first-order timing computation uses only two pressure values are needed. The valve is closed when there is a pressure difference across it. The valve opens when the pressure on either side approaches some small value (a fraction of a psi, typically). The first-order timing may be adjusted to maximize efficiency, for example by advancing the opening of the inlet valves.

The exhaust valve timing for expansion is similar to that for compression. The inlet valve will open, again, when the Δp across the valve is near zero. However, the inlet may close when the crank angle is such that the percentage of the cylinder filled is the quotient of the downstream and upstream pressures (taking the dead volume into account).

A processor may perform these computations, and the inlet valve timing for expansion, and possibly others, can be adjusted using a PID (proportional-integral-derivative) controller to fine-tune performance. This is particularly true in multi-stage systems.

Figure 31:
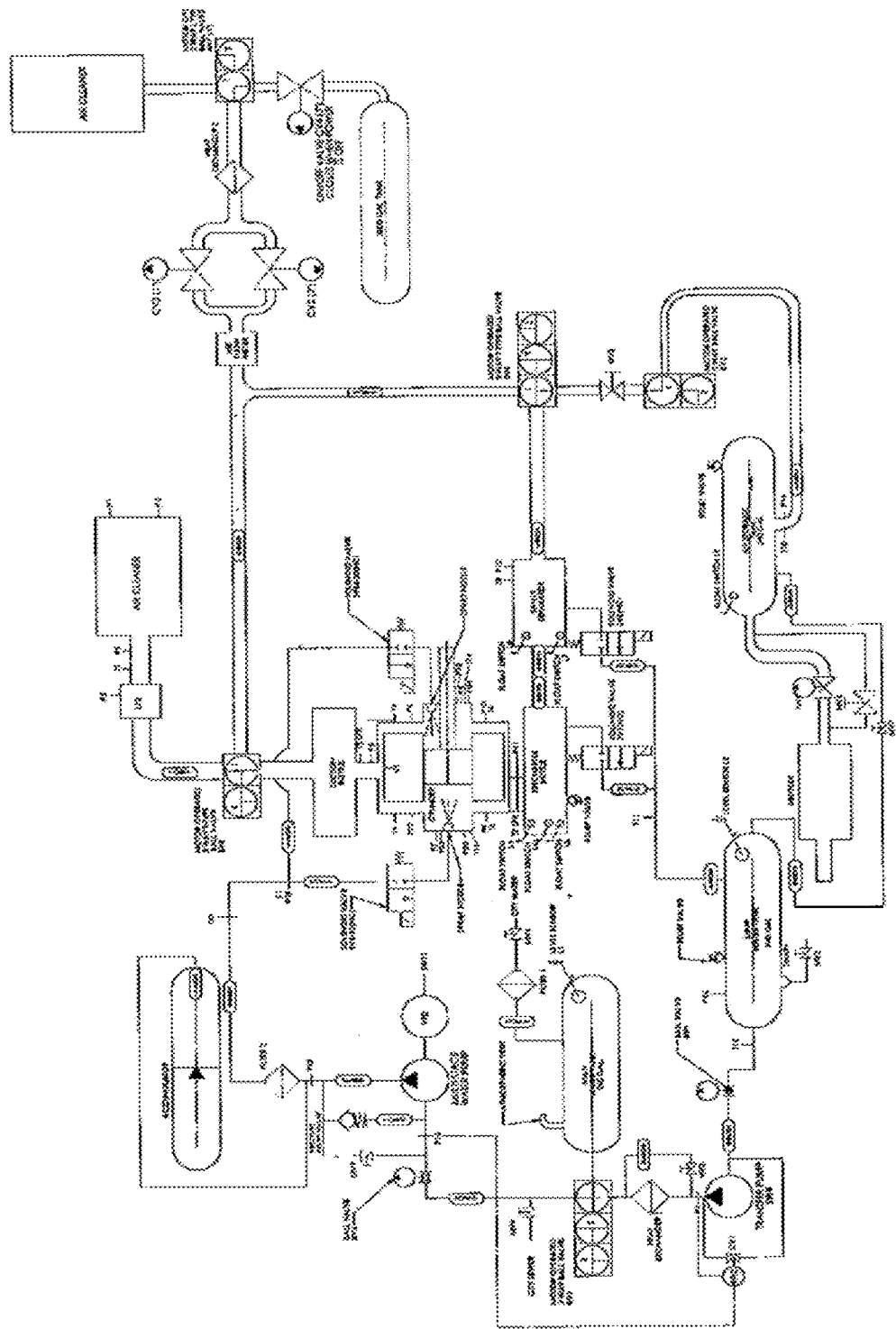
FIGS. 31-31D are schematics for one embodiment of a system.
Figure 31A:
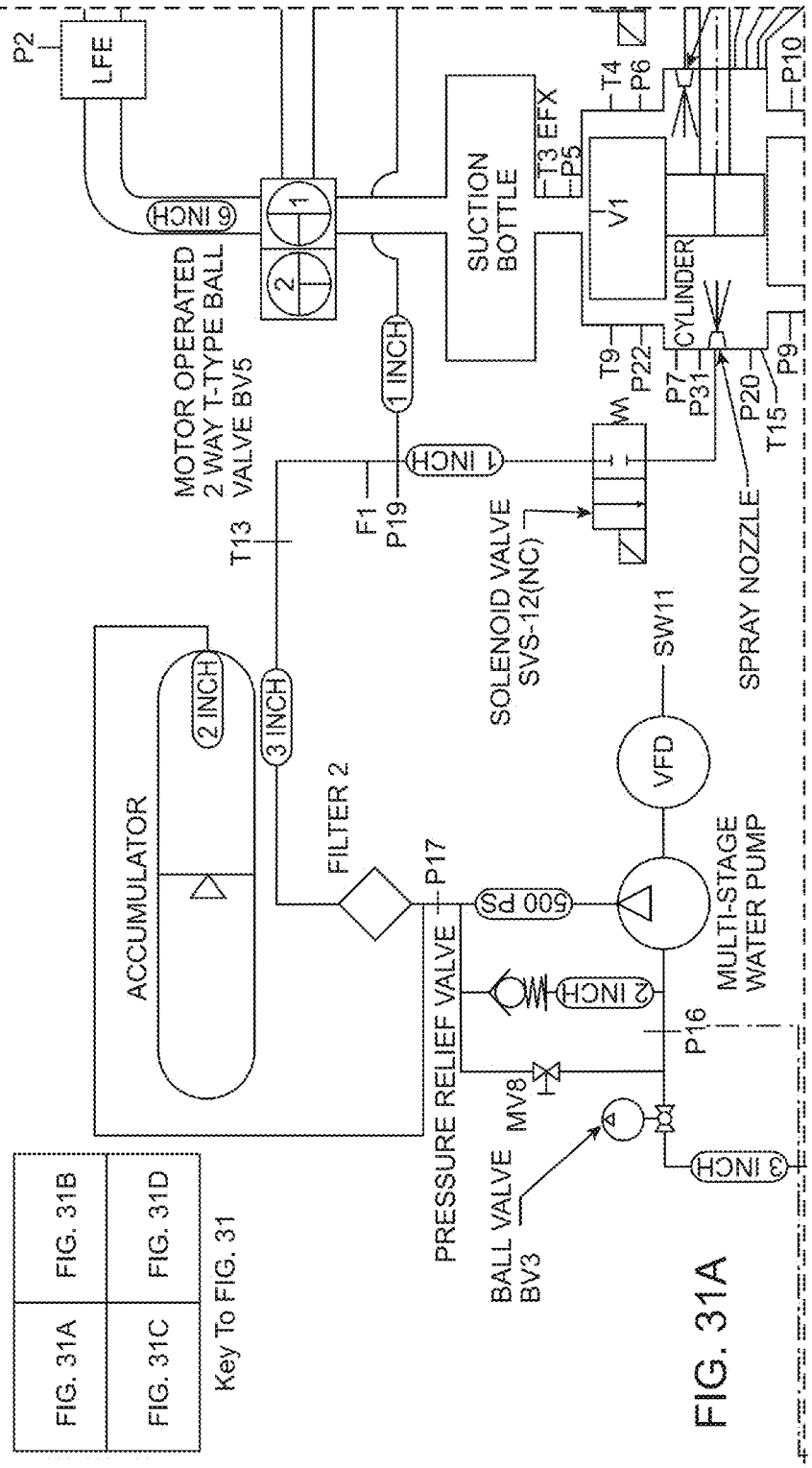
Figure 31B:
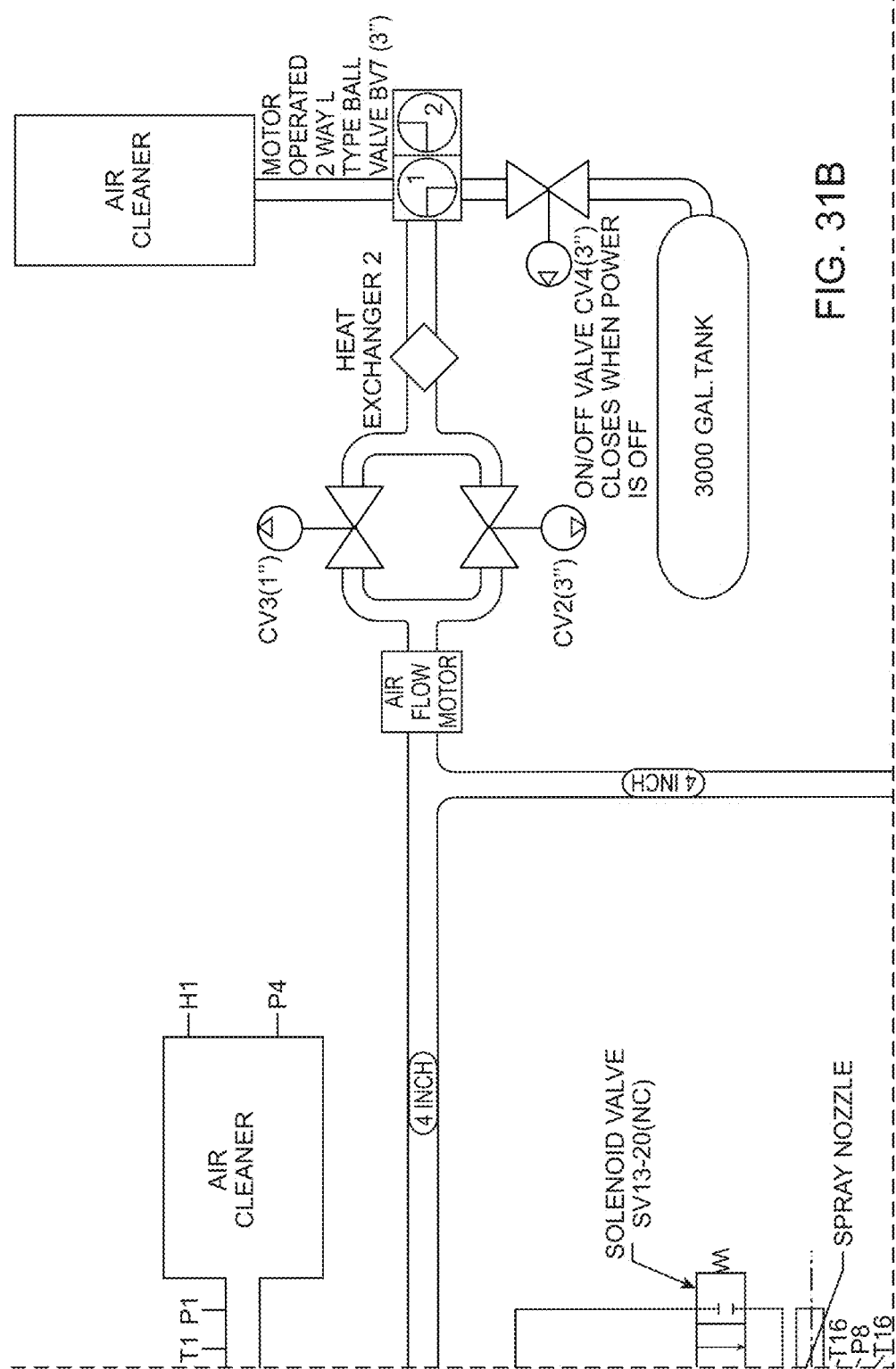
Figure 31C:
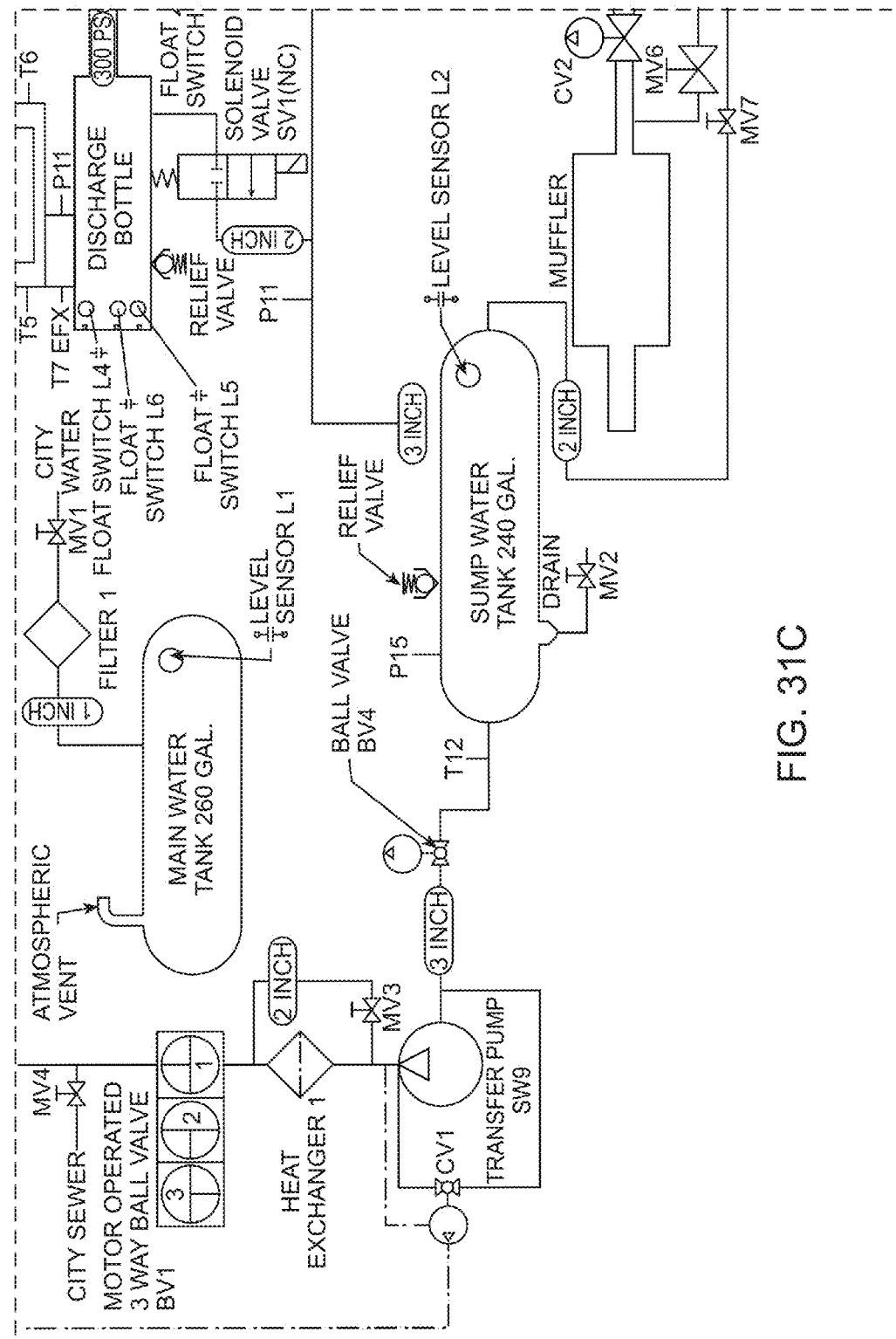
Figure 31D:
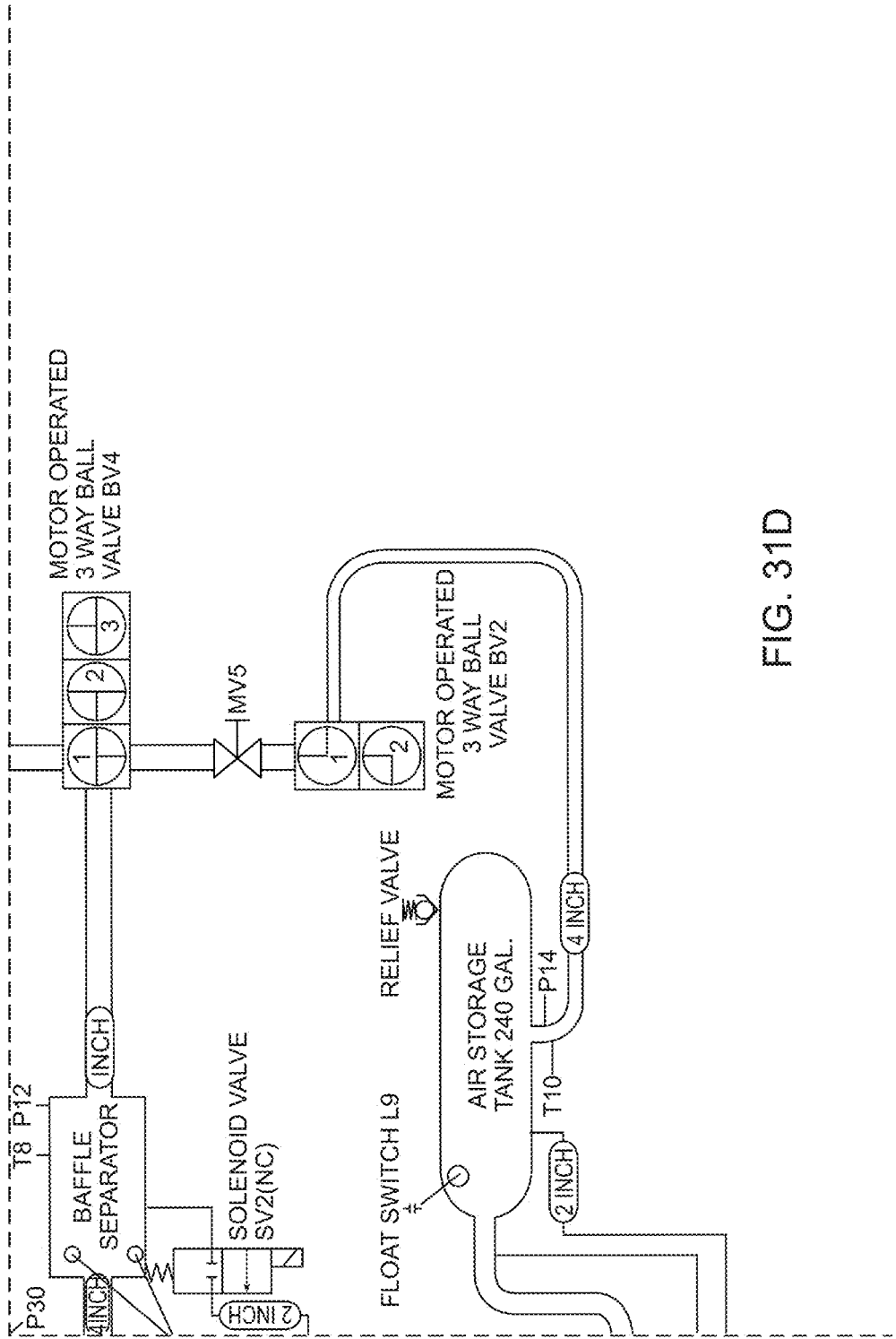

Another example of the possible use of a PID controller is for liquid pumps. For example, FIG. 31A shows an embodiment of a compression system including a non-positive displacement (centrifugal) transfer pump in fluid communication with a positive displacement multi-stage water pump. Flows of liquid from the transfer pump to the multi-stage water pump utilize a Proportional-Integral-Derivative (PID) loop around the transfer pump as shown. The PID loop is configured to maintain a target pressure (or other parameter such as flow rate) into the multi-stage water pump.

Compressed Air Storage

Typically, high-pressure air is stored in seamless metal cylinders no larger than about 100 liters. Such cylinders will be fine for small facilities (e.g. storage for a residential-scale solar array). However, for utility-scale volumes larger cylinders may be fabricated.

One low-cost solution is to utilize seamless steel pipe of the sort used for compressed natural gas pipelines. Such pipe (X60 grade is a good choice) is available inexpensively, and it's relatively easy to machine. It would be spun, heated and necked to form long tanks; or it could be welded on-site into a very long pipe. Tanks with an outside diameter of 75 cm, a length of 12 meters and 20 mm wall thickness can hold 300 atmospheres (4500 psi) safely. A megawatt-hour would require six such tanks, which would cost about $50K. Costs of manufacturing, coating, valves, a manifold, and a container—may increase that cost.

In the US, power plant pressure vessels need to follow the ASME section VII standard if they're installed permanently. Air cylinders designed to be transportable must follow Department of Transportation codes. Various ISO pressure vessel codes tend to be used overseas.

External Heat Exchange

The design of heat exchangers can vary with the installation. If the only available thermal reservoir is the atmosphere, a conventional air-cooled heat exchanger or cooling tower will typically be appropriate. The same heat exchanger can generally be used both to remove heat from the spray water during compression or to add it during expansion.

Note that at least some of the water passing through the heat exchanger will be at a pressure higher than ambient (an exception is the water used in the final expansion stage). Embodiments of the present invention may keep the water supplies for each stage separate, so that pipes carrying the water removed by the air-water separator in each stage will be at different pressures.

This may rely upon a two-step heat exchange process. First, the pressurized water passes through a shell-and-tube heat exchanger, transferring the heat to water (or other heat exchange fluid) in the shell, which is at atmospheric pressure. That fluid traverses the shell-and-tube heat exchangers for all the stages, then travels to an air-cooled heat exchanger to release the heat to the atmosphere.

The ΔT is small (in order to run close to isothermal), so that the heat exchanger's job is relatively easy, provided that the exit temperature is some distance away from ambient. This implies that the fluid in the system should be circulated for some cycles until it reaches a set temperature above ambient, at which point it is shunted through the air-cooled heat exchanger. This is the same approach used in a car radiator.

The reverse is true for expansion. However, the operating temperature must not be below the freezing point of the water or the heat exchange fluid.

A variant on this approach is to replace the air-cooled heat exchanger or cooling tower with an insulated water storage tank. The idea is that the energy in the heated water can be recovered during expansion. Of course, this approach only makes sense if the interval between energy storage and delivery isn't too long. A storage tank is likely a lower-cost solution than a heat exchanger, but it will have a larger footprint.

For example, FIG. 11 shows an embodiment wherein thermal energy may be communicated to the system through a heat exchanger in direct thermal communication with the volume of separated liquid. Such direct thermal communication between the injected liquid and a heat source/heat sink is not required, however.

Figure 33:
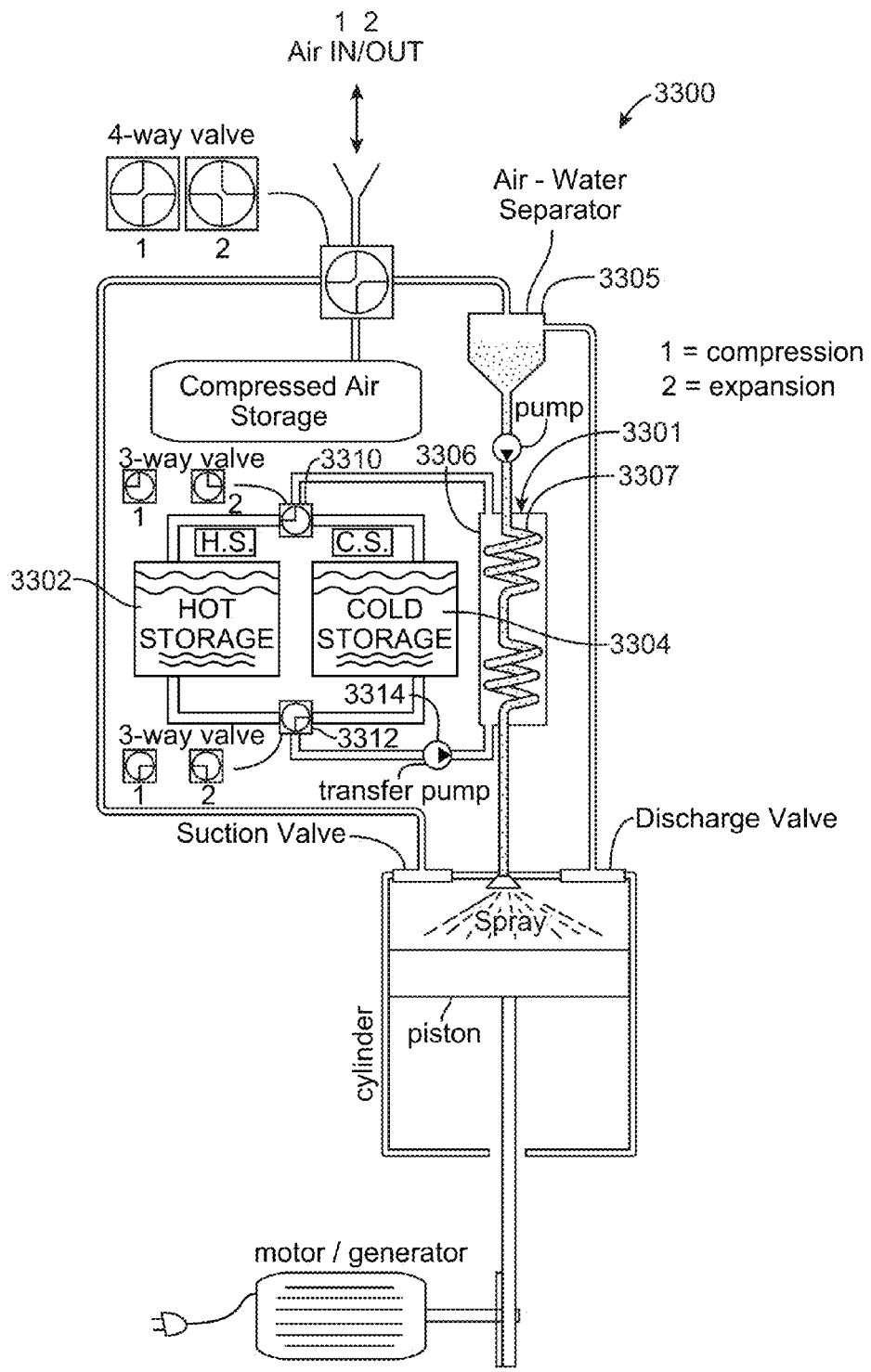
FIG. 33 shows an embodiment of an energy storage system utilizing separate insulated thermal storage tanks for hot and cold liquid.

According to alternative embodiments, thermal storage could take the form of a second stored liquid in thermal communication with the injected/separated liquid. FIG. 33 illustrates one embodiment of a system utilizing insulated storage tanks for liquid.

In particular, system 3300 is similar to that shown in FIG. 11, comprising tube-in-shell heat exchanger 3301 having tube 3303 configured to receive separated liquid from air-water separator 3305. Hot insulated thermal storage tank 3302 and cold insulated thermal storage tank 3304 are in selective fluid communication with shell 3306 of heat exchanger 3301 through transfer pump 3314 and 3-way valves 3310, 3312.

In the compression mode of operation, heat from the separated liquid is pumped to hot insulated thermal storage tank 3302 for storage and later reuse in expansion mode (described below). Cold liquid is replenished in the shell by drawing from the cold insulated storage tank.

In the expansion mode of operation, hot liquid is replenished in the shell by pumping from the hot insulated storage tank 3302. Coolness from the separated liquid flows to the cold insulated thermal storage tank 3304 for storage and later reuse in compression mode.

Effective for improving the efficiency of air expansion, is access to a source of waste heat, even low-grade heat such as hot water from a steam condenser or liquid warmed by a solar collector. High temperatures are not necessary. Even 80° C. water will increase the work done by a factor of about 1.2.

In applications where storage is located near the point of demand, the thermal characteristics of the system can be leveraged. Heat is generated during compression that can be used for any suitable low-temperature heat application (e.g. space or water heating). During power delivery, cool air and cool water are generated that can be used to supply cooling by coupling with an HVAC system or chiller. Air or water of any desired temperature can be supplied by suitable adjustments to the spray and other subsystems.

A larger ΔT will reduce efficiency slightly. However, this will often be a favorable trade-off for a reduction in heating or cooling load—which would otherwise consume electricity.

Thus FIG. 33 shows an embodiment wherein the stored liquid may be placed into thermal communication with an appropriate heat source (H.S.) or cool source (C.S.) in order to maintain or even further change its temperature. Liquid stored in a cold insulated thermal storage tank could be in communication with a heat sink such as a naturally-occurring body of water (e.g. lake, river, or ocean), or an artificial heat sink such as a cooling tower.

Liquid stored in a hot insulated thermal storage tank could be in communication with a heat source, which could be naturally occurring (e.g. solar or geothermal) or artificial (e.g. an industrial process, building environment, and/or internal heat from elements of the system itself). For example, heat generated internally by the energy storage system may also comprise a source of thermal energy that may be captured and stored.

Figure 37A:
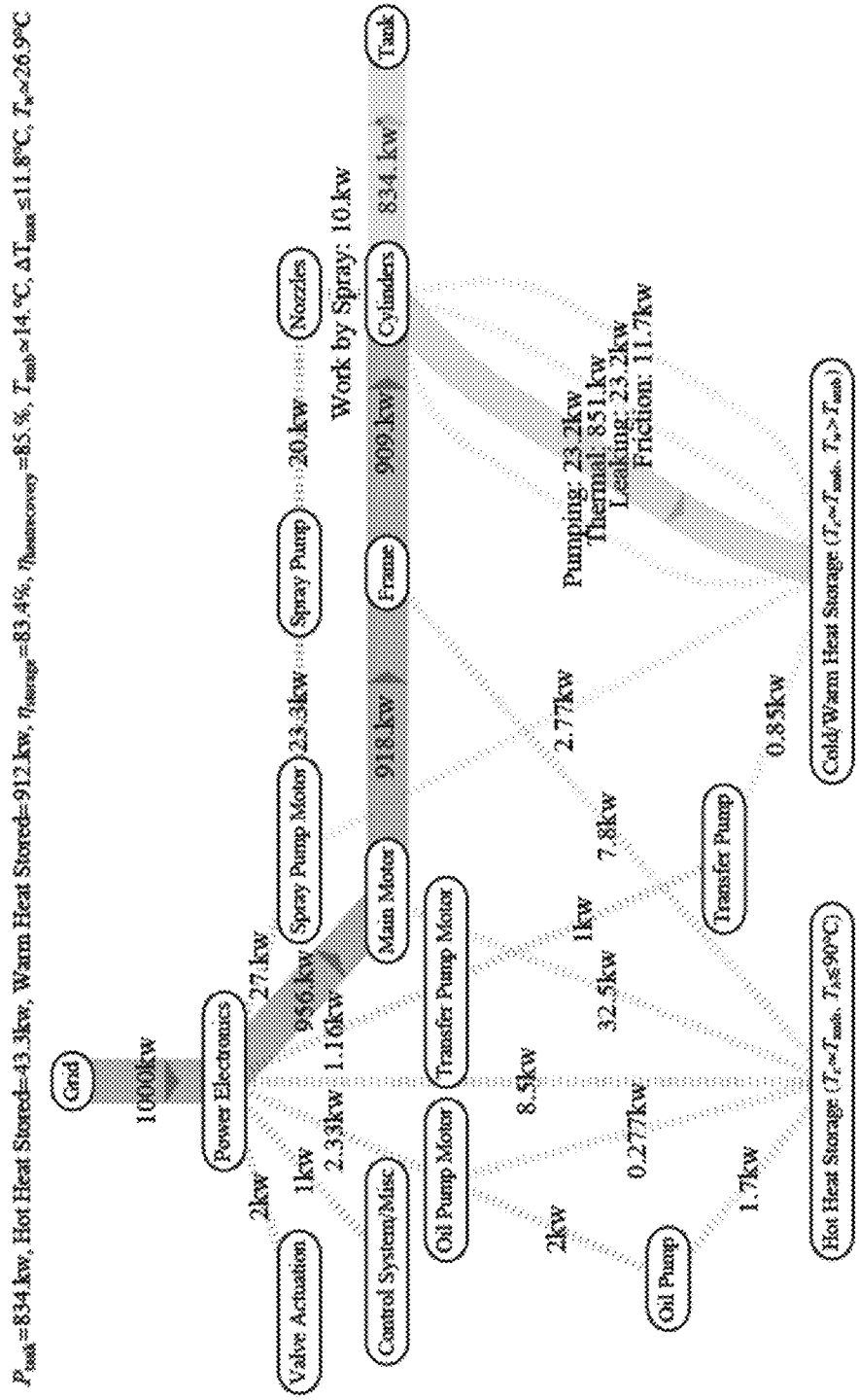
FIG. 37A shows internal energy flows in one embodiment of a compression cycle.
Figure 37B:
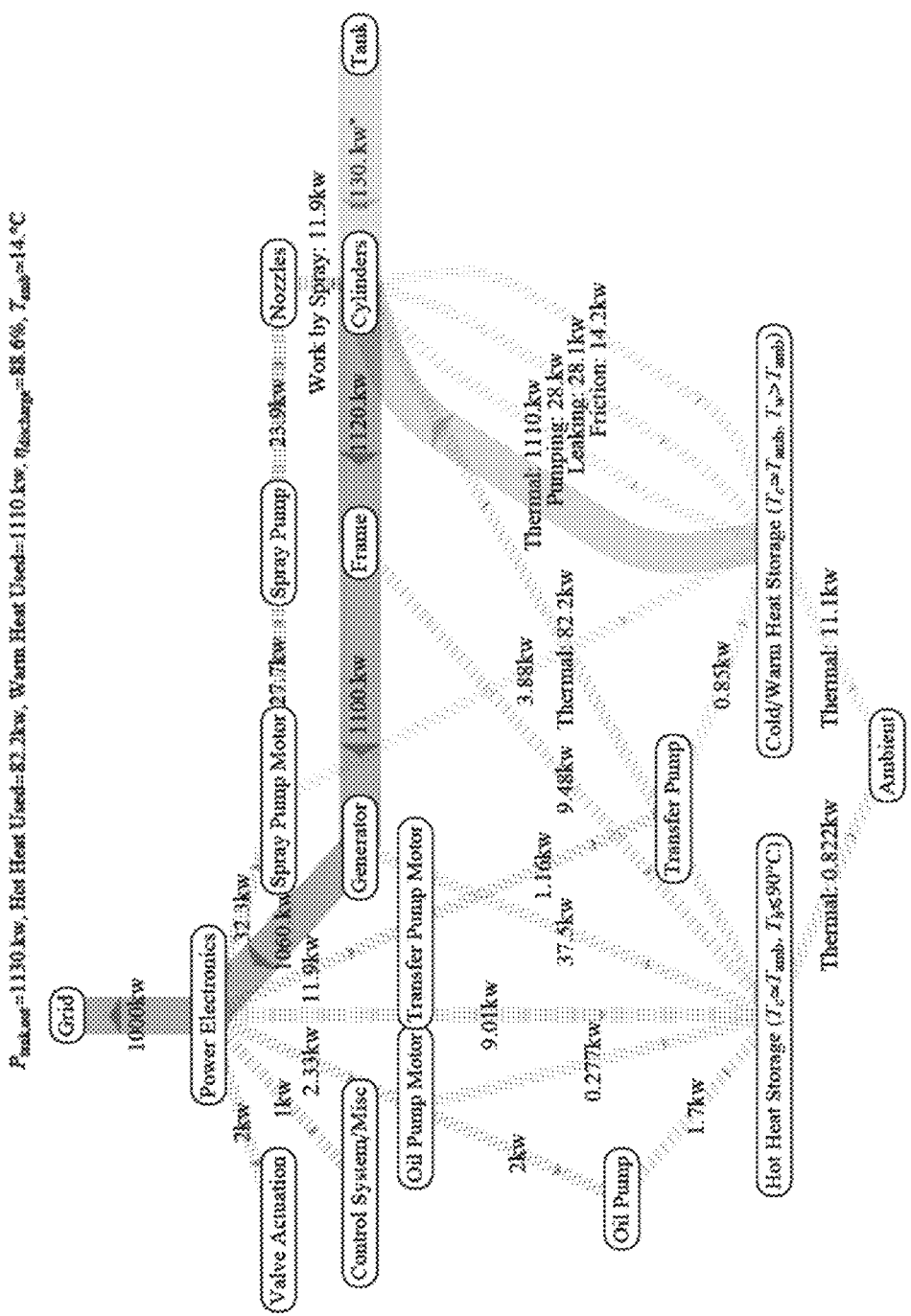
FIG. 37B shows internal energy flows in one embodiment of an expansion cycle.

FIG. 37A thus shows a number of thermal sources arising from the compression of gas for storage in one possible embodiment, and the flows of energy from these thermal sources to thermal storage. In the particular embodiment of FIG. 37A, two separate thermal storage units are employed. These units are maintained at different temperatures for purposes of efficient storage, but this is not required and in some embodiments only one thermal storage unit may be used. FIG. 37B shows a number of thermal sources arising from the expansion of compressed gas, and the flows of energy from these thermal sources to storage (again a high temperature storage and a low temperature storage). Such collection of internal heat for storage may be effected through a circuit employing a circulating heat-absorbing fluid such as oil, water, or air. The heat-absorbing fluid could be circulated by a pump.

Returning to FIG. 33, while the particular system shown in that figure features a tube-in-shell heat exchanger, this is not required. Alternative embodiments could utilize other forms of heat exchangers. For example, a counter-flow heat exchanger could be employed to efficiently transfer heat between the separated liquid flowed for spraying, and the circulated liquid being flowed to thermal storage.

Figure 34:
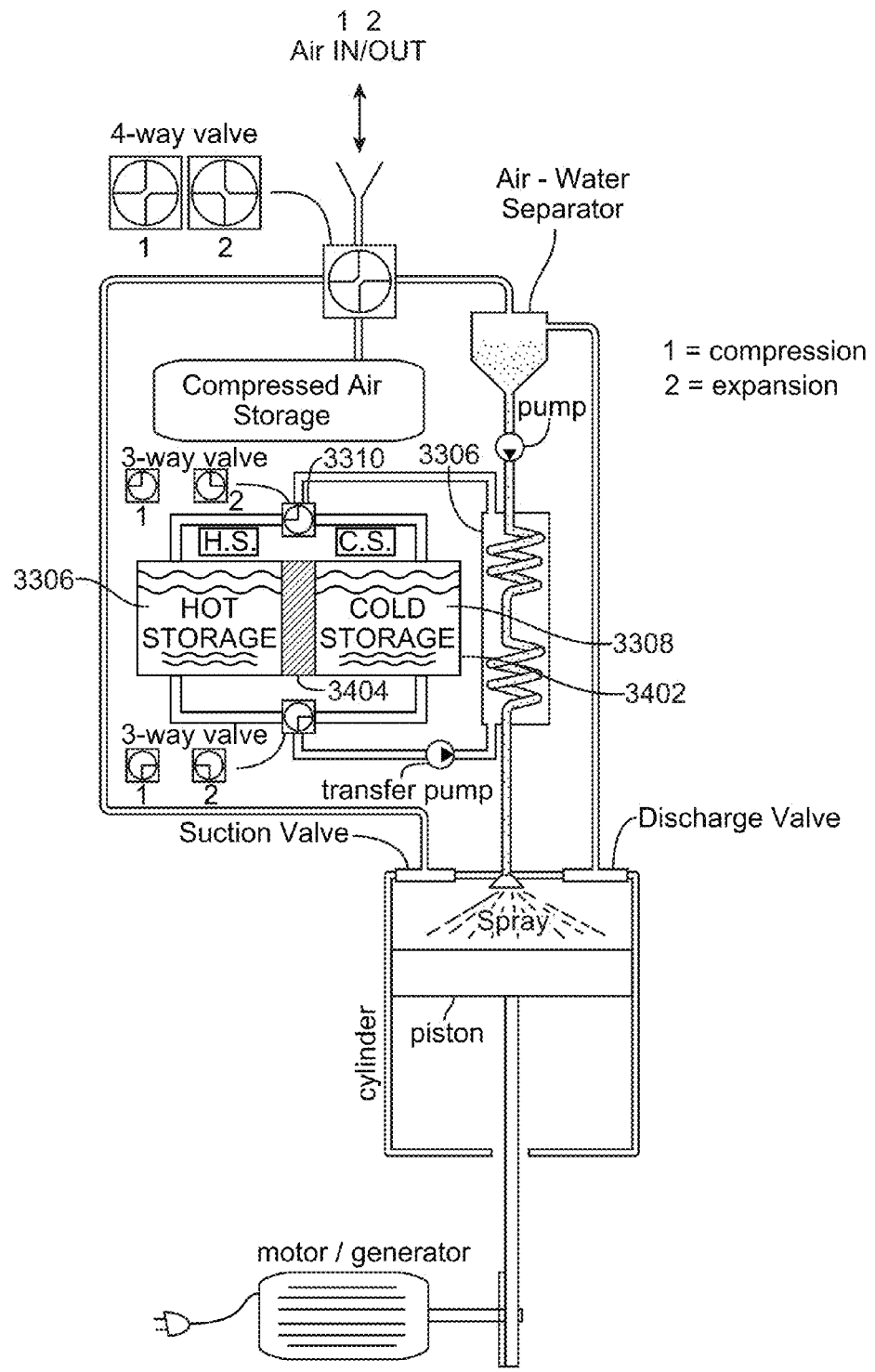
FIG. 34 shows an embodiment of an energy storage system utilizing a single insulated thermal storage tank having a moveable partition.

And while FIG. 33 shows the use of separate thermal insulation tanks for hot and cold liquids, this is not required. FIG. 34 shows an alternative embodiment of an energy storage system 3400 comprising a single thermal tank 3402 having an insulated partition 3404 moveable to define chambers 3406 and 3408 for containing hot and cold liquid respectively.

In the compression mode, the partition moves to the right as hot liquid accumulates and cold liquid is depleted. In the expansion mode, the partition moves to the left as cold liquid accumulates and hot liquid is depleted.

The thermal storage approaches of FIGS. 33 and 34 offer a potential benefit, in the ability to retain and utilize thermal energy available from heat exchange with expanding gas or gas being compressed. These thermal storage approaches also substantially reduces the volume of liquid maintained at high pressure.

In particular, the separated liquid is elevated to a high pressure by virtue of any compression process. Rather than incurring the expense of storing this liquid at an elevated pressure, thermal storage can instead be achieved by storing the thermal energy of a second liquid at a lower pressure.

Figure 35:
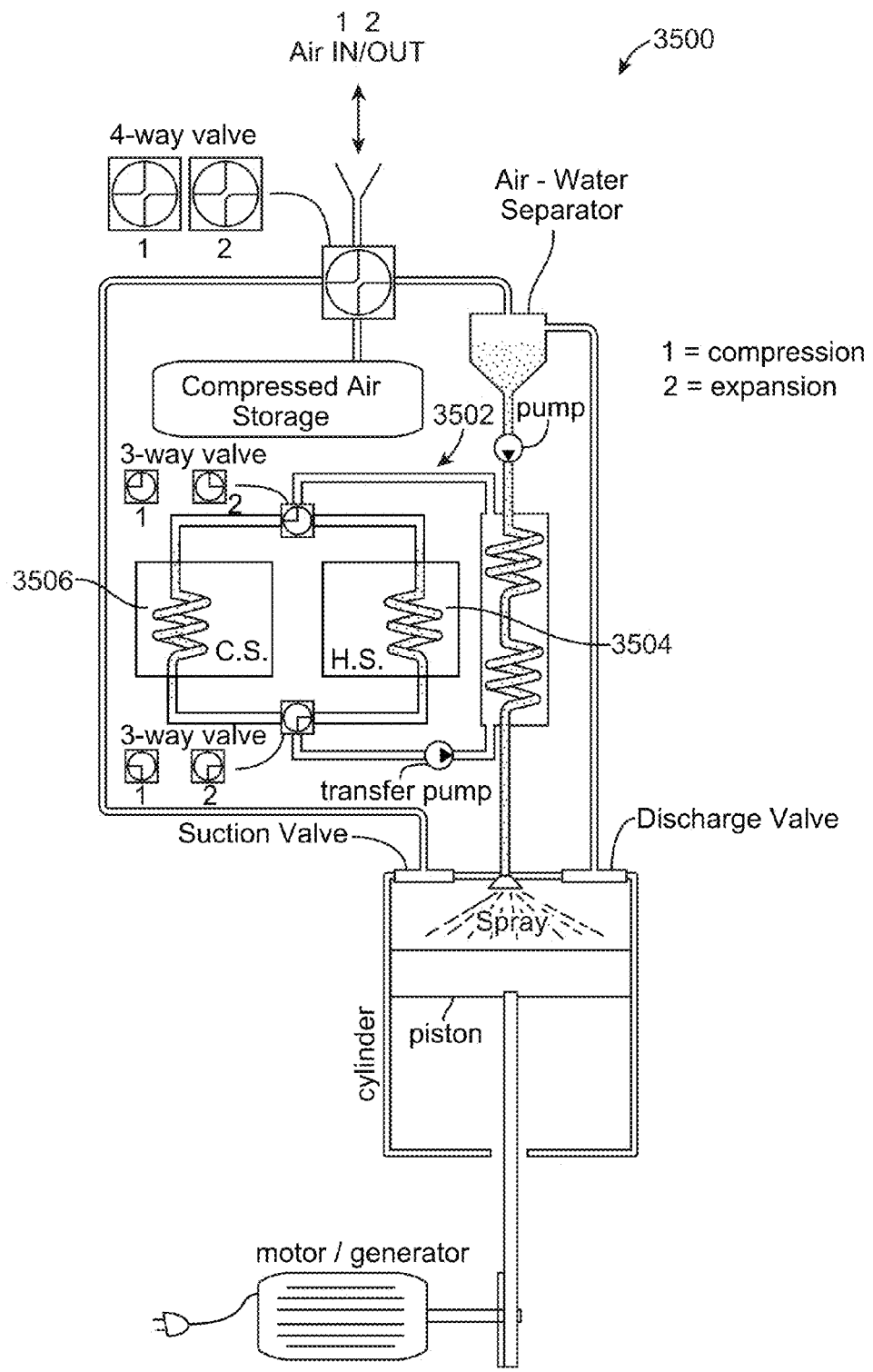
FIG. 35 shows an embodiment of an energy storage system utilizing a liquid stored at a lower pressure.

FIG. 35 shows another embodiment which also realizes the advantage of reduced volumes of liquid that are required to be maintained at high pressure. The system 3500 does not necessarily employ thermal storage, but does utilize heat exchange between a pressurized separated liquid, and a second liquid in thermal communication with the separated liquid but which may be stored at a lower pressure. Depending upon the state of the liquid circulation system 3502, the second liquid may be in thermal communication with a heat source (H.S.) 3504 or a cool source (C.S) 3506 through respective heat exchangers (which may be of the tube-in-shell type).

FIGS. 33-35 depict embodiments employing gas flow valves dedicated to suction and discharge roles in both the compression and expansion cases. However this is not required, and alternative embodiments could employ configurations having gas flow valves dedicated to high- and low-pressure sides, and whose role (e.g. suction or discharge) changes between compression and expansion.

Figure 36A:
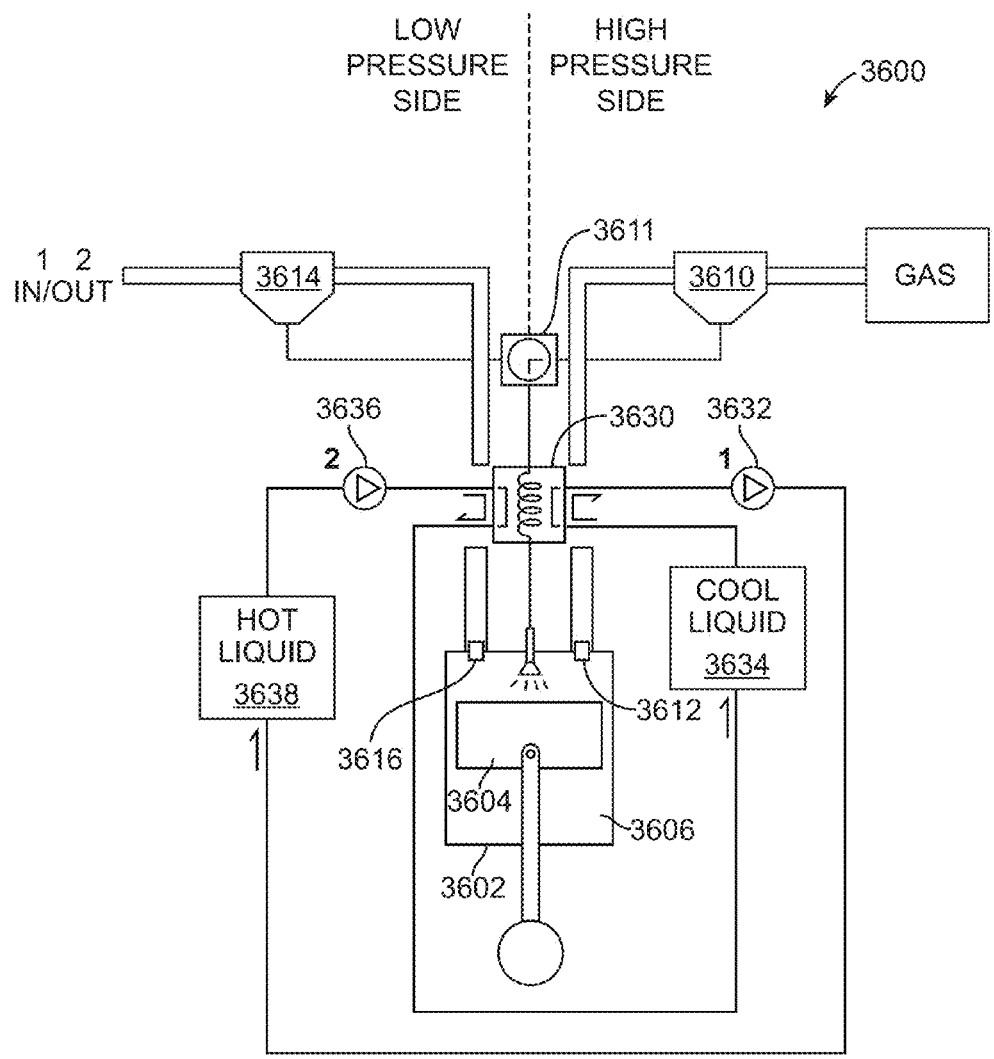
FIG. 36A shows an embodiment of an energy storage system utilizing heat exchange between a separated liquid and a second liquid stored at a lower pressure.

Accordingly, FIG. 36A depicts an alternative embodiment wherein thermal energy from separated liquid may be transferred to a second liquid, whose storage at low pressures may afford increased efficiency in operation. Energy storage system 3600 comprises reversible compressor/expander 3602 comprising piston 3604 reciprocating within chamber 3606.

A first gas-liquid separator 3610 is configured to receive a compressed gas-liquid mixture flowed from reversible compressor/expander 3602 through dedicated high pressure side valve 3612. A second gas-liquid separator 3614 is configured to receive expanded gas-liquid mixture flowed from reversible compressor/expander 3602 through dedicated low pressure side valve 3616.

Liquid heated by compression and separated by gas-liquid separator 3610 on the high pressure side, is flowed through three-way valve 3611 to heat exchanger 3630, where it exchanges heat with second liquid circulated by pump 3632 from cool liquid tank 3634 to hot tank 3638. Liquid cooled by expansion and separated by gas-liquid separator 3614 on the low pressure side, is flowed through three-way valve 3611 to heat exchanger 3630 where it exchanges heat with second liquid circulated by pump 3636 from hot liquid tank 3638 to cool liquid tank 3634. The hot/cold liquid tanks could be in thermal communication with a heat source/heat sink to maintain their temperatures or even to increase/decrease their liquid temperatures, respectively.

In the specific embodiments of FIG. 36A, the compressor/ expander stage comprises valves 3616 and 3612 that are dedicated to being proximate to the low- and high-pressure sides respectively. That is, one side of the valve 3616 consistently experiences a relatively low pressure, while one side of the valve 3612 consistently experiences a relatively high pressure. Thus depending upon the particular function (compression or expansion), the valves 3616, 3612 may serve to intake gas or exhaust a gas-liquid mixture from the chamber.

The energy storage embodiment of FIG. 36A may offer certain benefits in terms of valve design and performance. Specifically, in the particular embodiment shown in this figure, the valve dedicated proximate to the high pressure side, may have an opening that is smaller than the valve that is dedicated proximate to the low pressure side. This is because the increased density of the higher pressure gas expected to flow through the valve 3612, may call for a smaller valve area than valve 3616 flowing a less dense gas a lower pressures.

In other embodiments the high pressure side valve could have a larger relative area. Overall, the valve areas may be sized to reduce overall pumping losses attributable to pressure drops across valves. The relative valve sizes (that is the ratio of effective valve areas) may be greater or less than one in order to achieve this goal.

Using dedicated valves with different valve areas can allow the valve to the high-pressure side to be more compact. Such a scheme can also enhance efficiency by reducing valve losses attributable to effects such as free expansion, because the area of the valve is designed to match the expected pressure of the gas flowing therethrough.

A possible benefit of the approach of the embodiment of FIG. 36A, is that a valve always experiences a pressure differential in the same direction. That is, one side of the valve is at high pressure relative to the other side of the valve, simplifying design and construction of the mechanism used to actuate the valve as appropriate during compression or expansion.

Figure 36B:
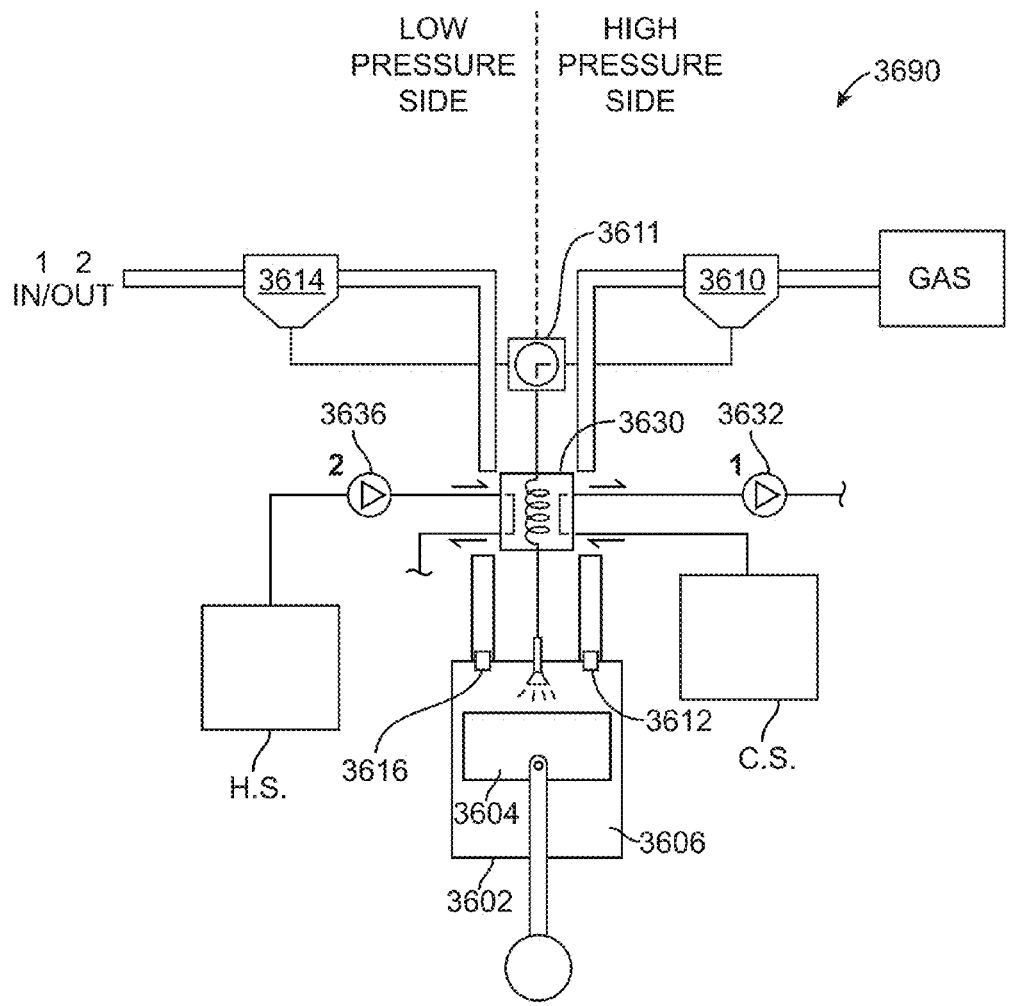
FIG. 36B shows an alternative embodiment of an energy storage system utilizing heat exchange between a separated liquid and a second liquid stored at a lower pressure.

FIG. 36B depicts an alternative embodiment utilizing a thermal sink and thermal source. This embodiment 3690 is similar to that of FIG. 36A, except there is essentially an unlimited amount of heat (as with geothermal) or cooling (as with a body of water) available. In that case, the hot source would replace 3638 and the cold source would replace 3634. After passing through the heat exchanger, water would be ejected elsewhere (perhaps in a lake far from the point where water is taken from).

Round-Trip Efficiency

Figure 19:
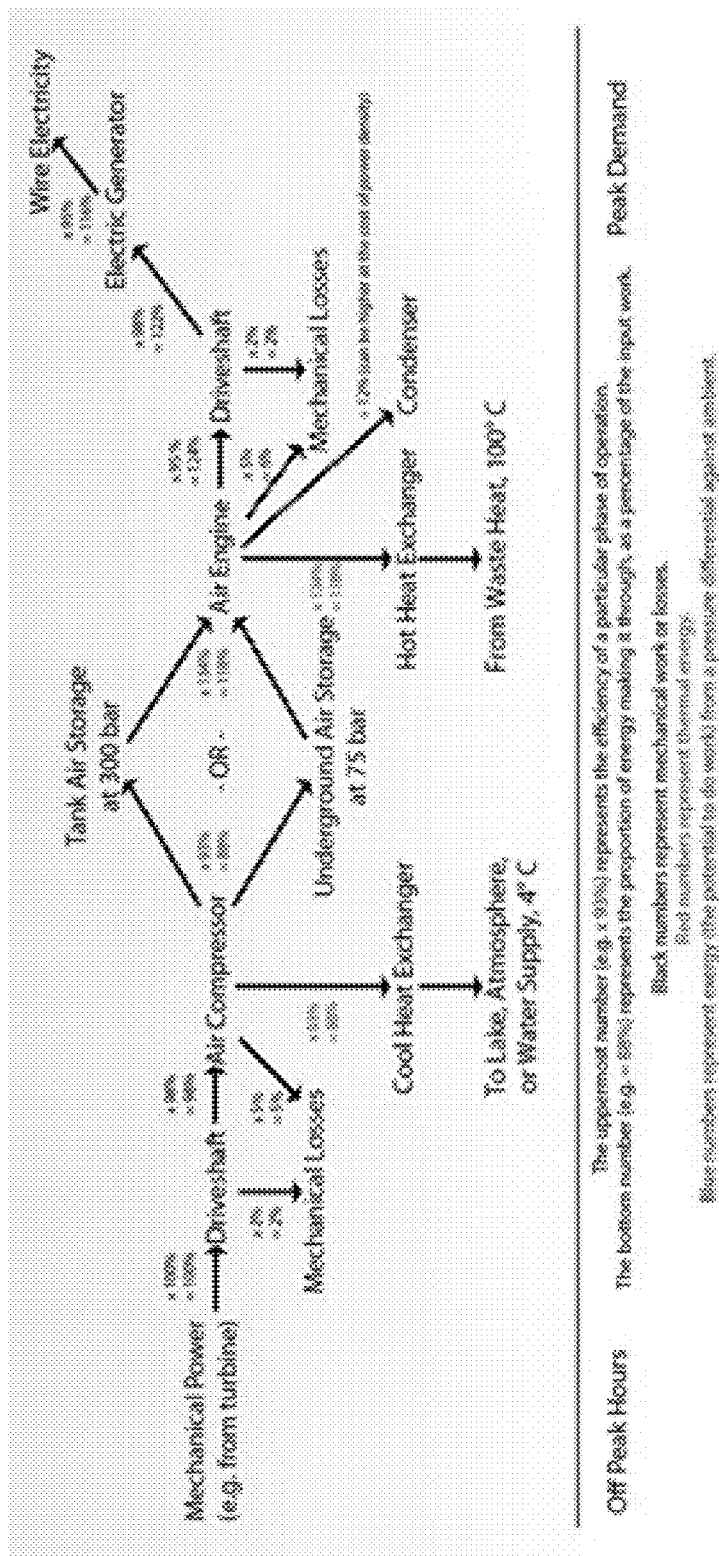
FIG. 19 shows schematically where the energy goes during the complete compression/expansion cycle.

FIG. 19 shows schematically where the energy goes during the complete compression/expansion cycle. The full-cycle, or round-trip, efficiency depends in part on the way in which the system is coupled to the grid.

In the chart, it is assumed that mechanical power is taken directly from a rotating shaft. If the source of energy is electricity, a motor would be used to convert that electricity to mechanical energy. That would reduce the round-trip efficiency by a factor of about 0.95 (just as a motor at the end of the pipeline reduces the overall efficiency by the same factor).

As mentioned above, a boost in round-trip efficiency can be achieved by scavenging waste heat from some other process (e.g. solar thermal) during the expansion phase. With enough waste heat energy, it's possible to overcome all the other drains on the full-cycle efficiency and to deliver more work than was originally stored. Of course, energy is still being conserved: the energy originally stored in the compressed air is being augmented with some of the waste heat's energy.

Certain system design trade-offs may affect efficiency. A smaller ΔT improves efficiency, but it also means that a larger heat exchanger will be required, increasing the cost of the system. Similarly, running the system at higher speed will produce higher power but will require faster heat transfer, adding to system cost.

For some applications—a UPS, for example—we'll be less concerned with efficiency than with capital cost. Other applications may most often require high efficiency, but, at times of peak demand, need the highest possible power output. Embodiments of the present invention offer an ability to control temperature by varying the amount of fluid sprayed into the cylinders during operation, and also to vary the power output by adjusting valve timing, thereby allowing the efficiency/power trade-off to be adjusted in real time.

In summary, embodiments according to the present invention may share one or more of the following features.

The system may use a temperature-controlled cycle utilizing a reversible compression/expansion mechanism. Near-isothermal operation addresses the low-efficiency problem that has limited the broad adoption of compressed air energy storage. Near isothermal operation, along with control of other parasitic losses, can provide system efficiencies comparable to large-scale batteries at lower cost and with a much longer lifetime.

Liquid may be injected into the cylinder in the form of small droplets, which mixes with the air during both compression and expansion. This facilitates heat exchange and enables near-isothermal operation.

Precision electronic valve timing may manage the trade-off of efficiency for power in real time. This allows the system operation to match demand and to extract useful power over a wide of tank pressures.

Two-step expansion may be used. A pre-determined pulse of air, $V_0$, is let into the cylinder, at which point the inlet and exhaust valves are closed and the air is allowed to expand. This allows maximum possible work from compressed air, and it also allows varying the power output by the system.

Waste heat added during expansion can be used to substantially improve efficiency.

Current Development

A prototype capable of storing and recovering about 30 minutes of energy at about 60 kW is being developed. Tasks associated with that project include but are not limited to:

1. Development, testing, and optimization of a single-stage compression/expansion mechanism
2. Maximizing heat exchange inside the cylinder (that is, mixing the incoming air optimally with the liquid inside the pressure cells used to facilitate heat exchange)
3. Control and monitoring (valve timing, optimization of cycling time, logging of system behavior)

Single-Stage System Configuration

In an embodiment, the system includes a 200 horsepower motor (which acts as a generator during expansion), an air intake line to supply ambient air to the compression cylinder, a water line to supply water to the spray nozzles, and an air-water separator. FIG. 31 shows a schematic of an embodiment of a system.

Figure 20:
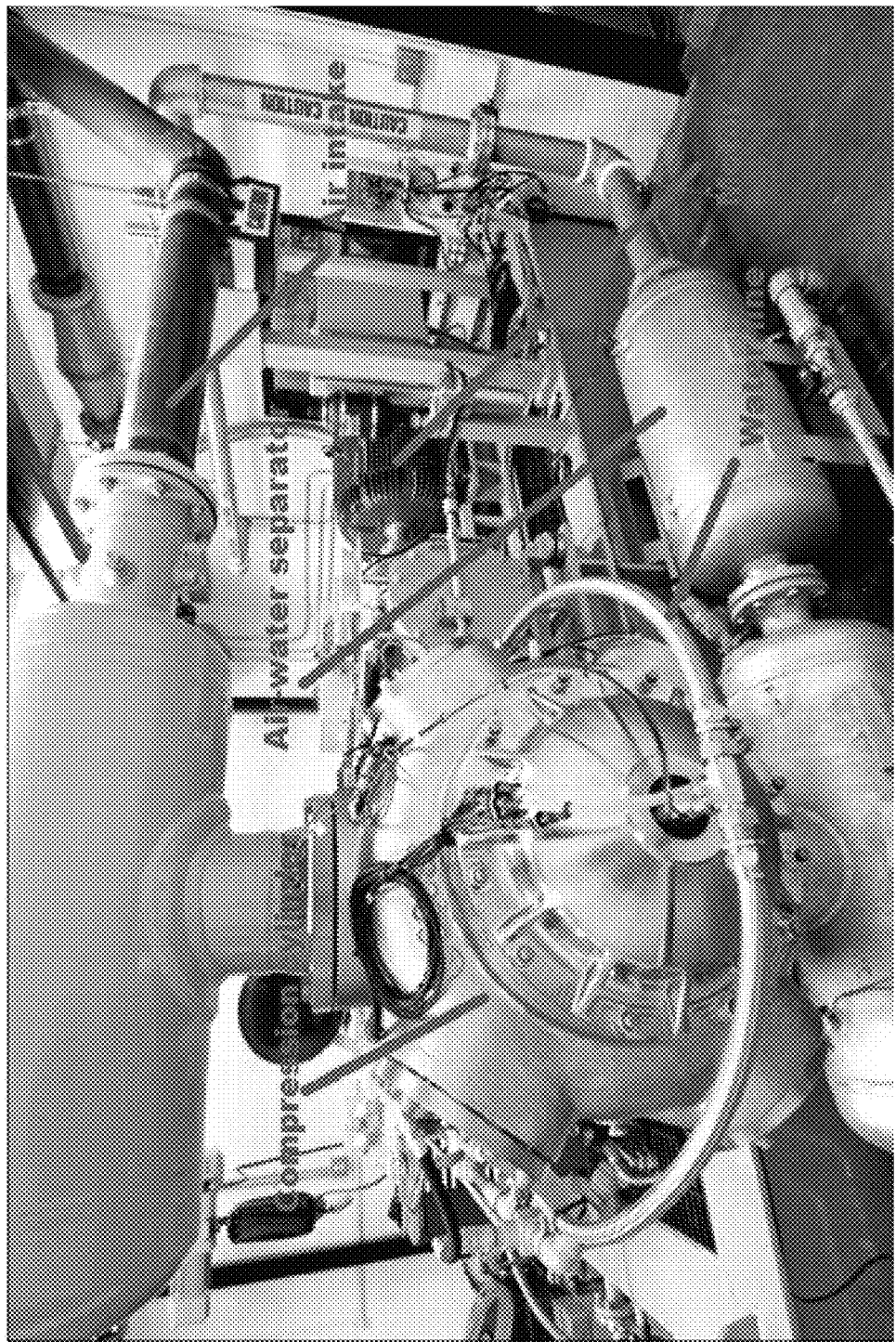
FIG. 20 shows a photograph of a compression cylinder.
Figure 21:
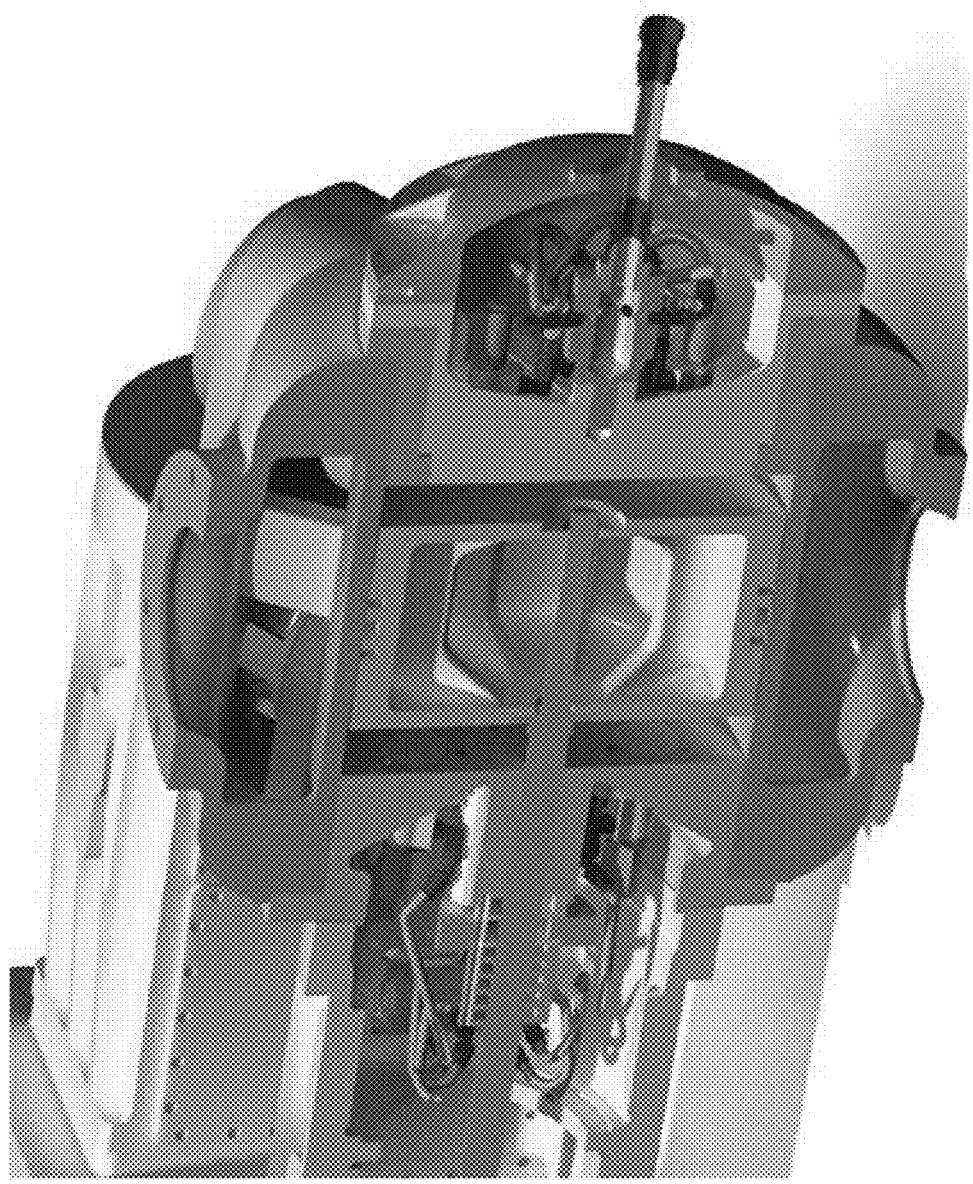
FIG. 21 shows a cross-section.

FIG. 20 shows the compression cylinder is 15.25" in diameter with a 3.5" stroke that is double-acting. Eight spray manifolds are arranged in a circle on each head. Different nozzles can be swapped in and out each manifold. The hoses, shown in magenta in FIG. 21, supply water to the nozzle manifolds.

Figure 22:
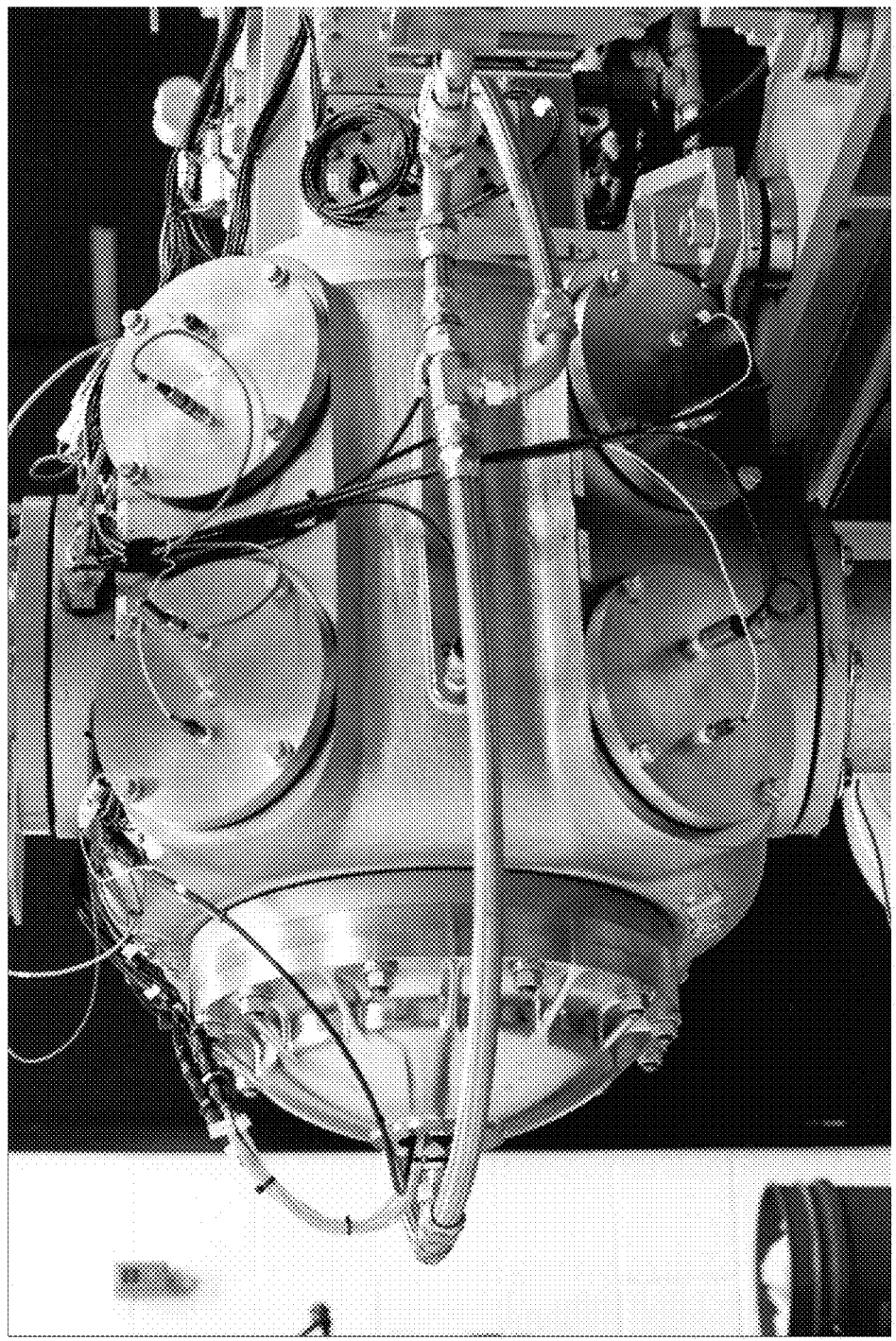
FIG. 22 shows the position of various sensors in the valve covers and in the intake and exhaust manifolds.

The compression cylinder is coated with nickel-polymer to prevent corrosion. FIG. 22 shows that various sensors can be seen in the valve covers and in the intake and exhaust manifolds.

The Spray System

Figure 23:
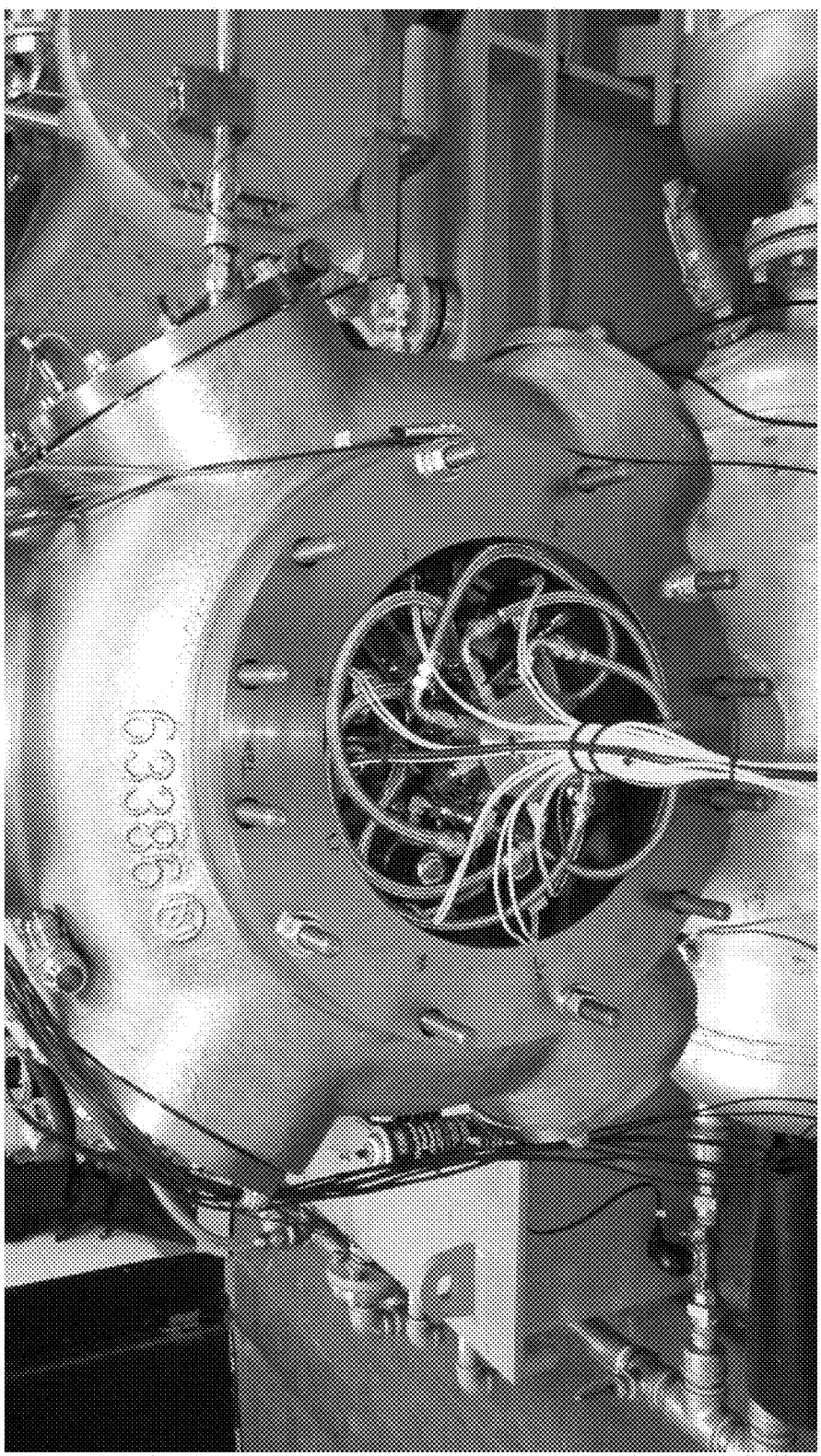
FIG. 23 shows the cylinder with the cover removed, indicating how the water is distributed to the nozzle manifolds.
Figure 24:
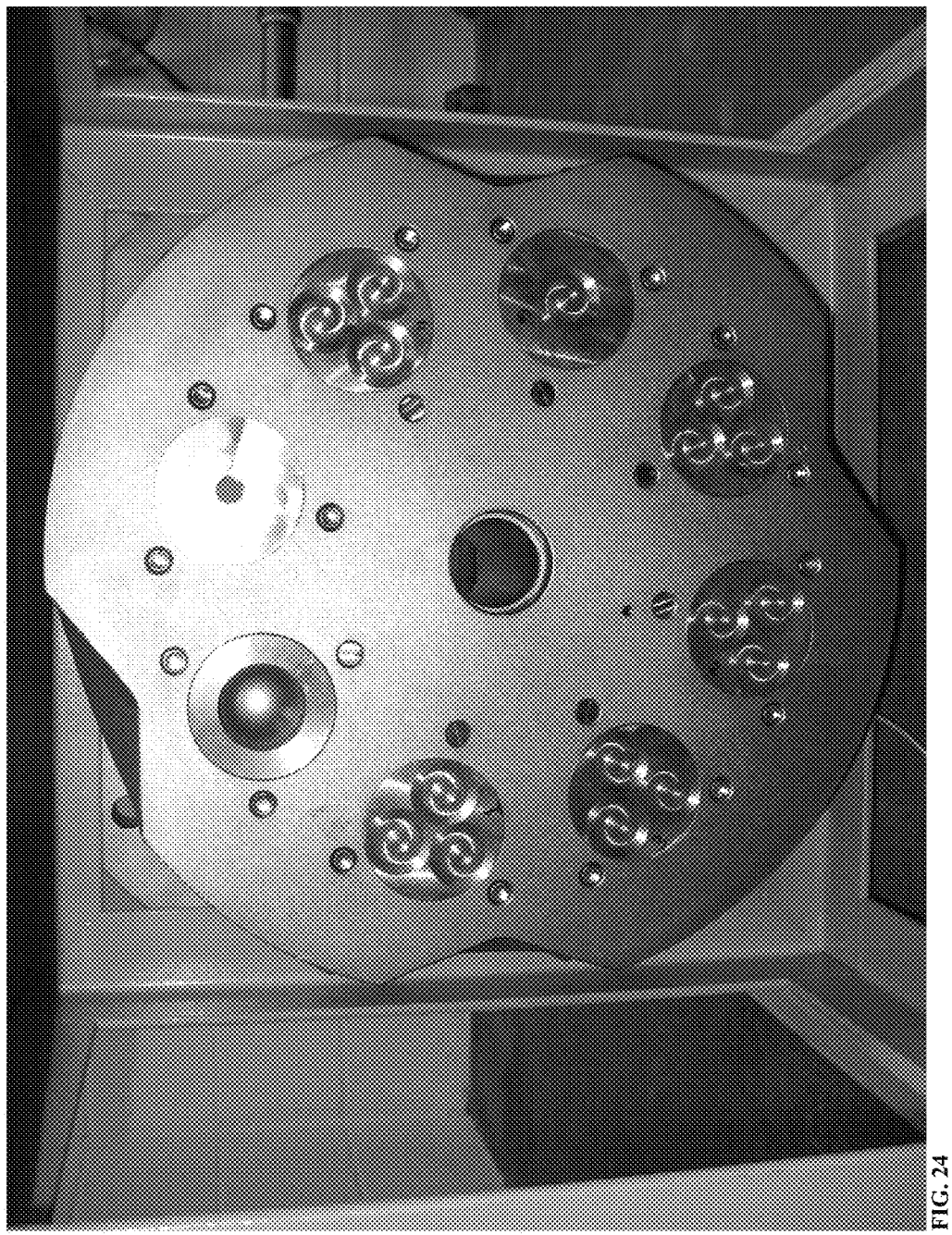
FIG. 24 shows one configuration of the outboard cylinder head.
Figure 25:
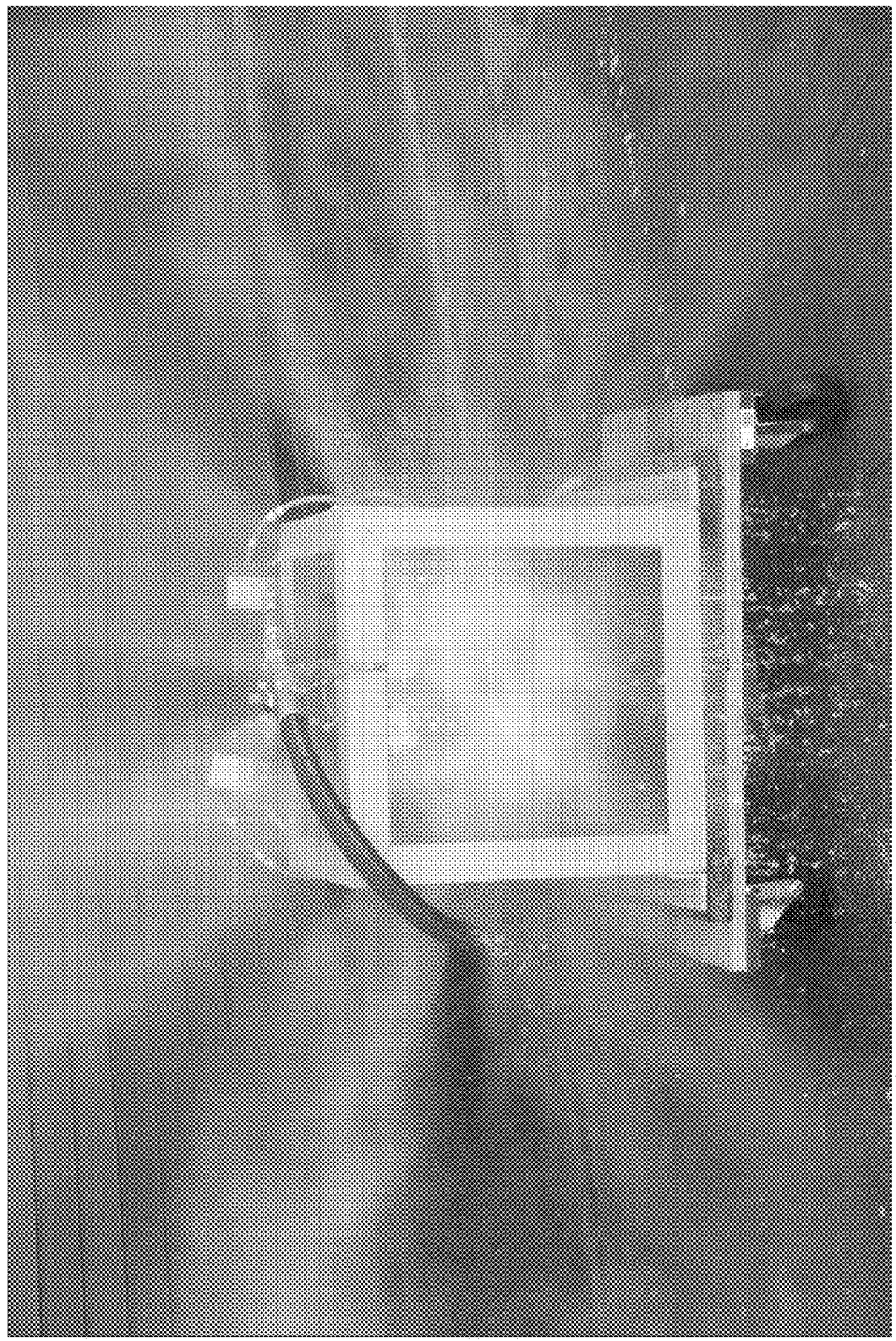
FIG. 25 shows the above head configuration running at about 0.3 liters/sec total flow rate and 100 psi pump pressure.

FIG. 23 shows the cylinder with the cover removed, indicating how the water is distributed to the nozzle manifolds. FIG. 24 shows one configuration of the outboard cylinder head. Five of the manifolds have three nozzles each, one has a single nozzle, another holds a pressure sensor, and one has a rupture disk as fail-safe to protect the cylinder if a pressure spike occurs. FIG. 25 shows the above head configuration running at about 0.3 liters/sec total flow rate and 100 psi pump pressure.

Control and Data Logging

Figure 26:
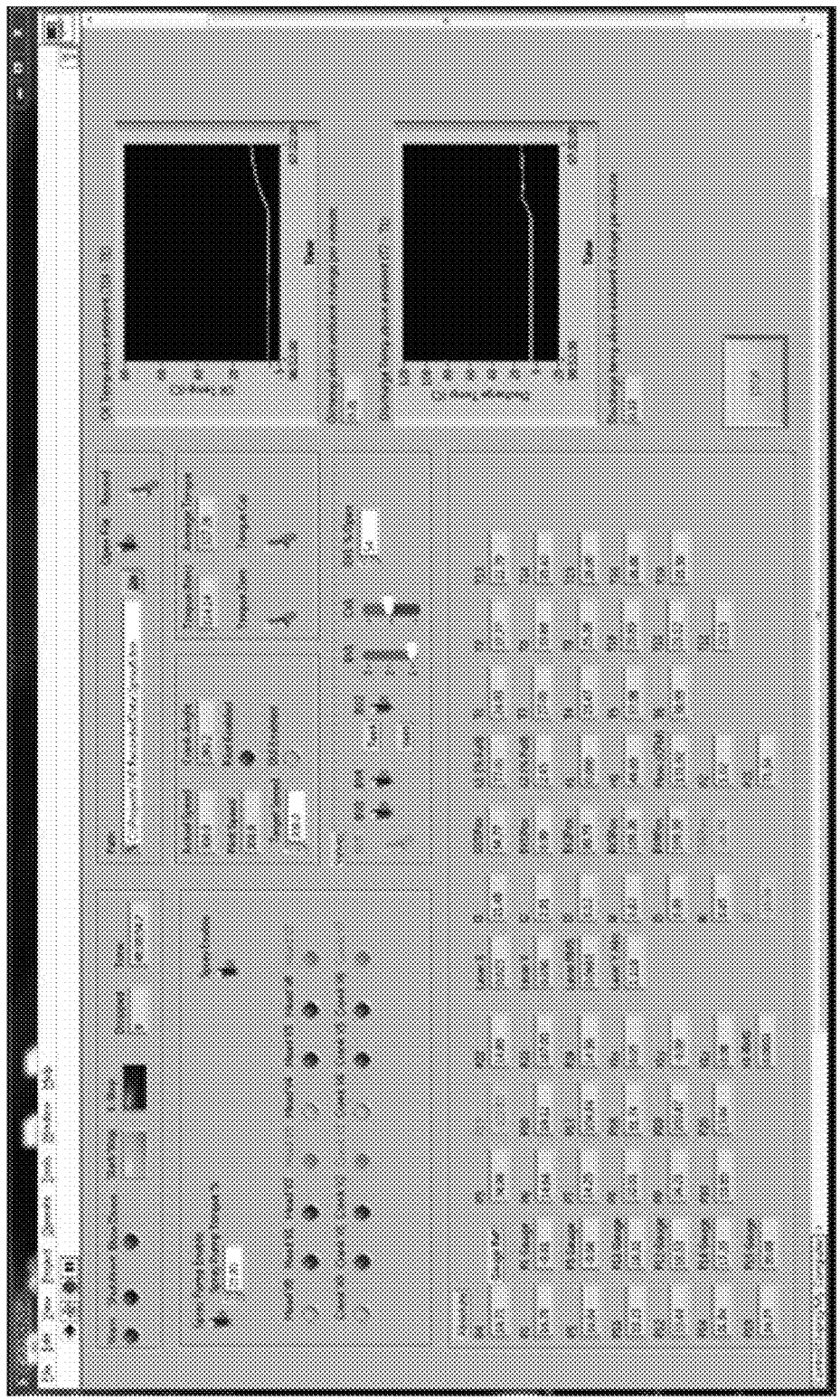
FIG. 26 shows display of data from about 50 sensors—pressure, temperature, air and water flow rates, electrical current, crank angle, and shaft torque.

Data from about 50 sensors—pressure, temperature, air and water flow rates, electrical current, crank angle, and shaft torque—can be displayed as shown in FIG. 26. FIG. 31 indicates where the sensors are positioned in that system embodiment. There is a safety system that monitors a number of critical values (such as motor vibration) and can shut the motor down automatically when a problem occurs. Data can be logged and stored at 4 kHz.

A variable-frequency drive (VFD) allows control over the motor speed. Our experiments to date have varied the speed from 300 RPM to 1200 RPM.

Spray nozzles can be turned on and off individually, and the pump pressure can be set to any value below 500 psi. Water flow can be set to be straight through (that is, pumped from a storage tank, through the cylinder and out to a drain) or re-circulated through an air-cooled heat exchanger and back into the spray pump.

Other parameters that can be varied are the upstream and downstream pressures. That is, the incoming pressure to the cylinder can be set when performing expansion as well as the outgoing pressure (vented to the atmosphere through a muffler) during compression. This has allowed us to perform tests at compression ratios ranging from less than 2:1 to about 6:1. Because of the high "dead volume" (that is, the un-swept volume remaining in the cylinder when the piston is at top dead center), higher compression ratios may need to be tested by another cylinder.

Results

Figure 27:
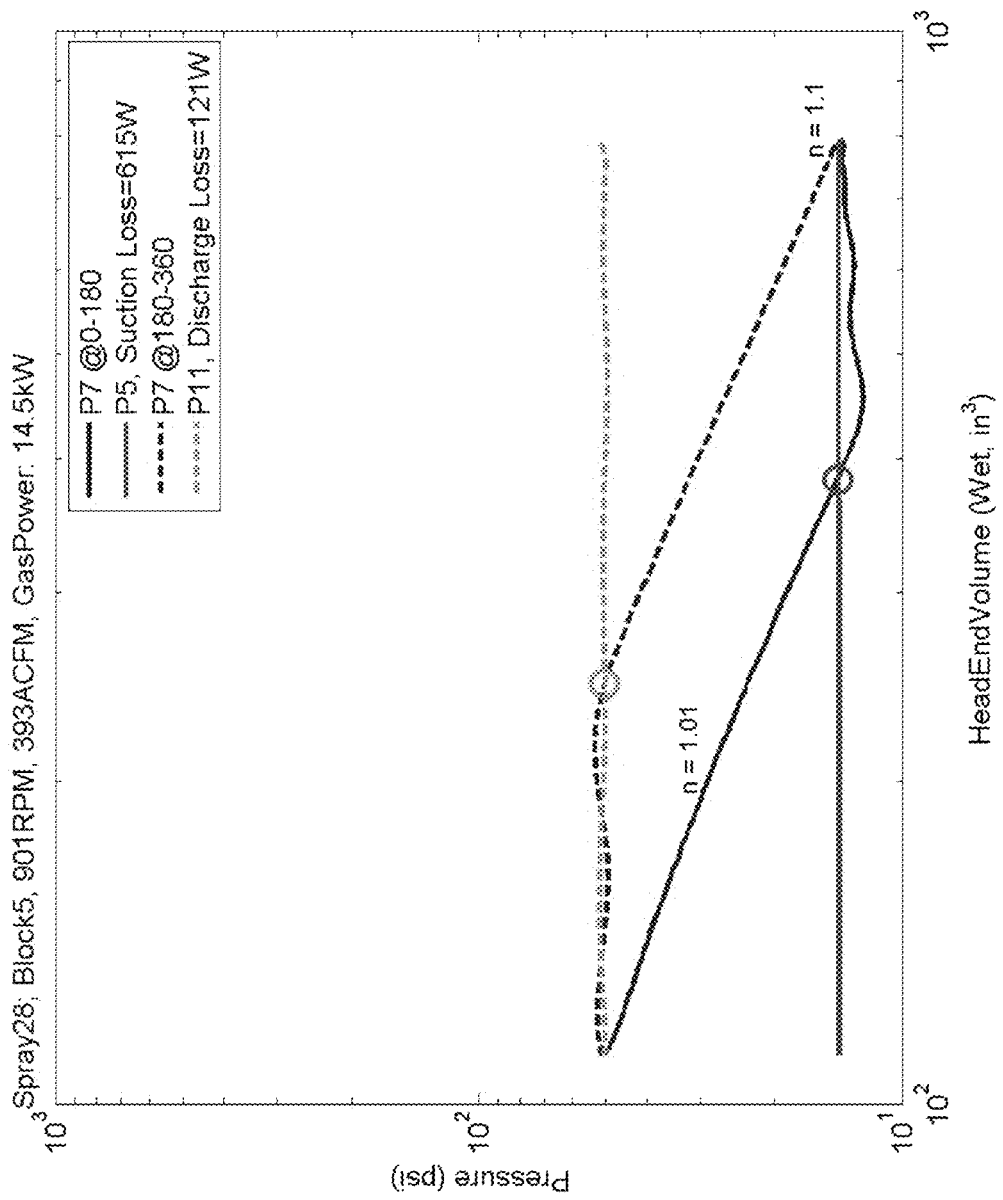
FIG. 27 shows a PV diagram of a typical run.

The PV diagram of FIG. 27 shows the results of a typical run. The speed is 900 RPM and the compression ratio is about 4.5:1 (53 psi). Water is being sprayed in at about 0.3 liters/second. The data is displayed on a log-log scale so that the polytropic index can be measured as the slope of the diagonal lines.

Briefly, the polytropic index is a measure of how close to isothermal the process is. The work done by the expanding air is derived by integrating the expression $$W = -\int p\,dV$$

over all the stages. When the valve is first opened, neglecting some small transients, the pressure is constant in the limit of a large tank. Hence the work done in this filling stage is:

$$W_{fill} = (p_0 - p_{back})V_0,$$

where:
$V_0$ is the volume of the expansion chamber at the moment the valve is closed, and
$p_{back}$ is the back pressure.

Afterward, the expansion is polytropic (that is $pv^k$=const and k is called the polytropic index), through N stages.

Neglecting back pressure, by integration, the work done in each stage i is:

$$W_i = \frac{p_0 V_0}{k-1}\left[1 - \left(\frac{1}{r}\right)^{k-1}\right]$$

Hence over N stages, it is:

$$W_N = \frac{N p_0 v_0}{k-1}\left[1 - \left(\frac{1}{r}\right)^{\frac{k-1}{N}}\right]$$

However, back pressure is to be accounted for. Working against the back pressure during polytropic expansion requires additional work:

$$W_{back} = p_{back} V_0 (R-1)$$

That is, simply the back pressure multiplied by the swept volume.

Adding these terms gives the work done per 'stroke':

$$W_{total} = (p_0 - p_{back})V_0 + \frac{N p_0 V_0}{k-1}\left[1 - \left(\frac{1}{r}\right)^{\frac{k-1}{N}}\right] - p_{back} V_0 (R-1)$$

Running the system close to isothermal makes a difference in the amount of work is required to compress a volume of air to a pressure $p_0$ (or that can be gotten out of air stored at a given $p_0$).

In the polytropic model (which is the usual one for engine design):
$pv^5$=const, where:
p=pressure,
v=volume, and
k is the polytropic index, a measure of how much heat is transferred in or out of the system as it operates.

k=1 for isothermal compression and expansion (that is, operation during which the system remains at a constant temperature). The polytropic index for pure adiabatic compression/expansion is about 1.4.

The work done per piston stroke for a system with N stages, with expansion at constant pressure during the filling stage is:

$$W_{total} = (p_0 - p_{back})V_0 + \frac{N p_0 V_0}{k-1}\left[1 - \left(\frac{1}{r}\right)^{\frac{k-1}{N}}\right] - p_{back} V_0 (R-1),$$

where:
r is the expansion ratio in a given stage;
R is the total expansion ratio;
$p_{back}$ is the back pressure; and
$V_0$ is the initial volume.

Figure 32:
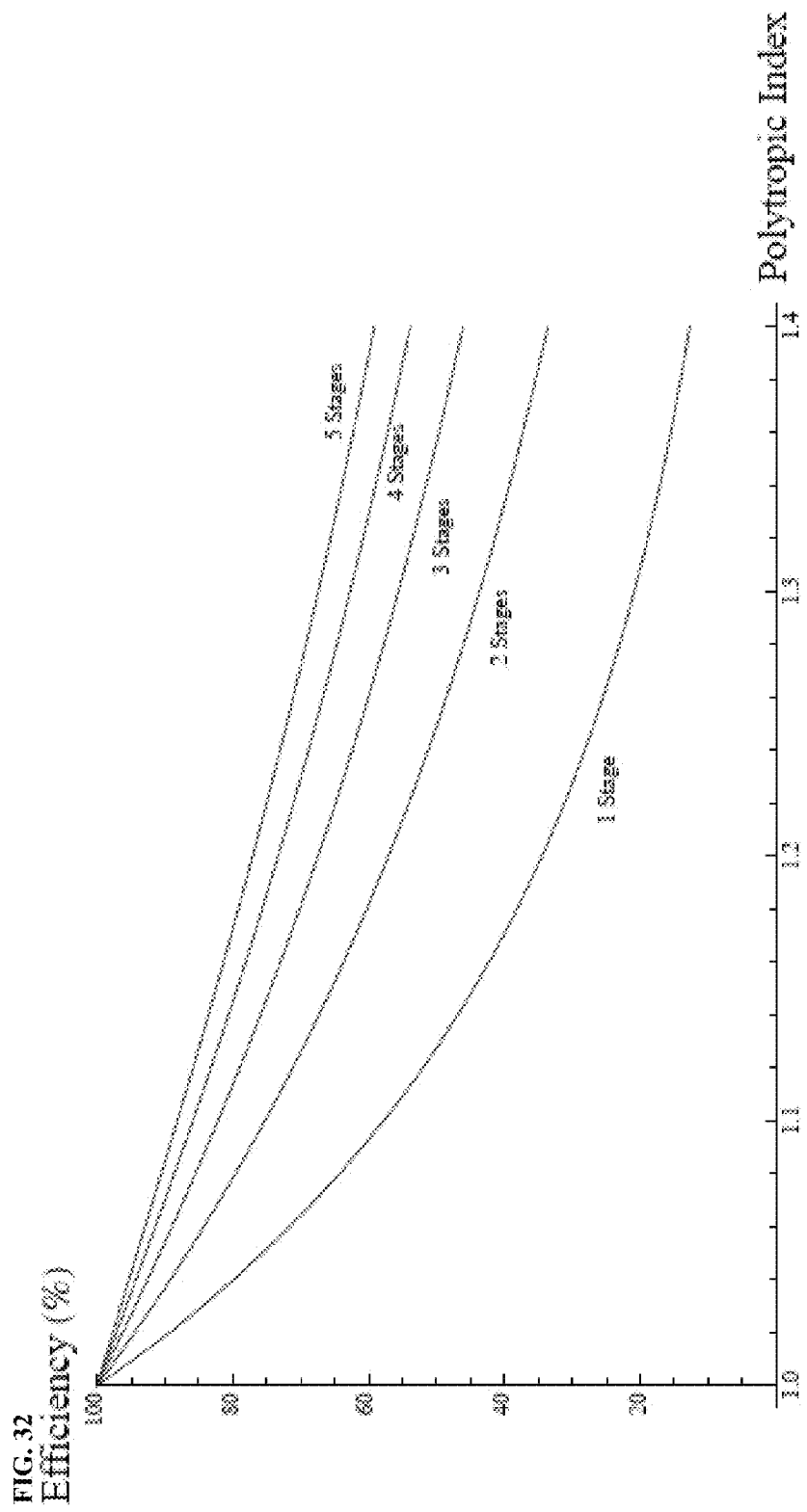
FIG. 32 plots the efficiency as a function of the polytropic index.

Taking the ratio of computed work output to theoretical work output, we can plot the efficiency of the system as a function of the polytropic index. This is shown in FIG. 32.

In a multi-stage compressor, the discharged air is assumed to be cooled back to ambient temperature between stages, improving efficiency. In the limit of an infinite number of stages, compression would occur isothermally.

Returning to FIG. 27, the compression cycle is represented in a PV diagram by a loop (here dashed). The bottom, relatively horizontal, line is the piston moving down with the intake valve open, drawing in atmospheric air.

At the lower rightmost point, the piston starts to move upwards and the intake valve closes. Air is compressed nearly isothermally—a slope of 1.0 would represent isothermal compression—the slope here is 1.1.

When the pressure reaches that of the air tank, in this case about 53 psig, the exhaust valve opens (upper right-hand corner of the diagram). The pressure stays constant as the compressed air is pushed out of the cylinder, until the piston reaches top dead center (upper left-hand corner).

There is still compressed air in the cylinder, filling the dead volume. This air drops in pressure, again nearly isothermally, as the piston descends. Once the air in the cylinder reaches atmospheric pressure, the intake valve opens, completing the cycle.

Active Valve Development

Compression experiments were performed using passive valves—plate and ring valves, specifically. However, for expansion experiments, these may be replaced with an active valve developed in-house One embodiment of an active valve is shown in various views in FIGS. 28-30. The custom valve uses a stepper motor to spin a disk with pie-shaped ports. The rotation of the disk is phase-locked to the compressor shaft rotation. A second plate can be rotated using a second, smaller motor to close off part of the aperture.

By changing the phase of the rotating disk relative to the crankshaft, the valve can be made to open earlier or later in the cycle. The position of the aperture plate then determines how long the valve will be open.

Both the phase and the aperture opening are electronically adjustable. This allows modification of the valve timing to maximize efficiency as well as to operate at different tank pressures.

Development

Successive prototypes may add stages. That is, they operate at higher pressures.

for the first stage, 6 for the second stage, and 4 for the third stage, resulting in a final compression ratio of 240, or 3600 psi.

The table below summarizes or goals for upcoming milestones. The numbers shown are percentages of the input electrical power lost via various mechanisms—waste heat, leaks, friction, etc. The losses shown are one-way. The losses are multiplicative. That is, our one-stage system loses 10% of the input power as heat, then 5% of the remaining 90% (that is, 4.5% of the input power) via piston ring leakage. Similar losses are expected for compression and expansion, so that each loss has to be counted twice. The product of all the losses is therefore squared to compute the round-trip efficiency. The "Typical" column represents losses for a conventional (non spray-cooled) air compressor.

| Category | Loss Channel | Typical | 1 Stage | 2 Stage | Alpha | Production | Notes |
|---|---|---|---|---|---|---|---|
| Thermodynamic | Thermal | 40% loss | 10% | 4% | 3% | 2% | 1 |
| Leaks | Piston rings | 2 | 5 | 3 | 2 | 1.5 | |
| | Packing | 0.5 | 0.5 | 0.5 | 0.5 | 0.5 | |
| | Valves | 3 | 4 | 3 | 2 | 1 | 2 |
| Pressure drops | Valves | 1.5 | 1.5 | 1.5 | 1 | 1 | 2 |
| | Heat exchanger | 0.5 | 1 | 0.5 | 0.5 | 0.5 | |
| | Air-water separator | 0 | 0.5 | 0.5 | 0.5 | 0.5 | 3 |
| | Filters | 0.5 | 0.5 | 0.5 | 0.5 | 0.5 | |
| | Nozzles | 0 | 1.5 | 1.5 | 0.5 | 0.5 | 3 |
| | System piping | 0.5 | 1 | 1 | 0.5 | 0.5 | |
| Friction | Frame | 1 | 5 | 2.5 | 1 | 1 | 4 |
| | Oil pump | 1 | 2 | 2 | 1 | 1 | |
| | Piston rings | 3 | 3 | 3 | 2 | 1.5 | 5 |
| Spray | Pumps | 0 | 2.5 | 1.5 | 1 | 0.5 | 3 |
| | Piping | 0 | 1 | 1 | 0.5 | 0.5 | 3 |
| Electrical | Motor/generator | 4 | 8 | 6 | 5 | 4 | 6 |
| | Valve actuation | 0 | 2 | 1 | 1 | 0.5 | 2 |
| | Power electronics | 1.5 | 6 | 5 | 2 | 1 | 6 |
| | Heat exchanger fan | 1 | 1 | 1 | 1 | 1 | |
| | Control system | 0.5 | 1 | 0.5 | 0.5 | 0.5 | |
| Miscellaneous | System | 1 | 2 | 2 | 1 | 0.5 | |
| One-way Efficiency | | 39% | 55% | 63% | 74% | 84% | |
| Round-trip Efficiency | | 15% | 30% | 40% | 55% | 70% | |

Note 1 The thermal loss shown in the "Typical" column is for an air compressor with a 6:1 compression ratio - about what the one-stage prototype can do. Later prototypes will have higher compression ratios, so this loss would get even worse in the absence of spray cooling.
Note 2 Conventional air compressors use passive plate valves that leak due to fluttering and incomplete seating of the valve plate. Sealing of our active rotary valves is accomplished via a mechanism similiar to piston ring sealing. This should, ultimately, minimize leaks.
Note 3 The water spray system is absent in a conventional compressor. Losses associated therewith can be reduced over development generations.
Note 4 Frame friction is high for the one and two-stage systems because only two cylinders are mounted on a frame designed for four cylinders.
Note 5 Ring leakage and friction represents an area of research, with relatively little investigation by previous researchers.
Note 6 Prototypes use a VFD to allow the motor to run at different speeds. Production units may be optimized to run at a single speed. This will reduce the cost of the power electronics and permit the motor and frame to operate at their optimal performance points, maximizing efficiency.

The single-stage system will compresses and stores air at about 6 atmospheres (90 psig). This relatively low number is because the off-the-shelf cylinder being used for the single-stage prototype has a high "dead volume". That is, there is still a volume of air in the cylinder even when the piston is at top dead center—about 20% of the total volume isn't swept by the piston.

Some of that dead volume is filled by liquid water which collects after the first few strokes and remains in the cylinder. The dead volume that remains, limits the compression ratio.

Certain units may use custom-designed cylinders with much lower dead volume, perhaps 5%. This will allow us to operate a higher compression ratio and still get high air flow. One embodiment may achieve compression ratios of about 10

Costs

Embodiments of compressed air energy storage systems according to the present invention may comprise at least two major sub-systems: 1) the air compressor/expander mechanism, and 2) the air storage sub-system. Because the job of the former is to store and deliver power at a certain rate, it is best defined in terms of how many kilowatts (or megawatts) it can handle.

The air storage system holds energy. So it is best defined in terms of how many kilowatt-hours or megawatt-hours it can contain. Therefore, to correctly cost a system, how much power to be delivered for how long needs to be specified.

One embodiment, for example, will store and deliver 500 kW. If it's desired to deliver that rated power for, say, five hours, it will need 2500 kWhrs of storage. The cost of that system will be the sum of the costs of a 500 kW compressor/expander and 2500 kWhrs of air storage.

The cost per kilowatt-hour is based almost exclusively on the cost of the air storage tanks Conventional steel compressed gas cylinders offer a straight-forward solution for commercial-scale applications. At 250 atm and an expansion efficiency of 85%, about 40 liters of compressed air is required to deliver a kilowatt-hour. High-strength steel tanks that hold 110 liters at 250 atm cost about $430 in quantity. That works out to about $155 per kWh. To this needs to be added the cost of a container, mounting brackets, valves, manifolds, gauges, etc.; plus the costs associated with certification. $200 per kWhr probably represents a reasonable estimate for this approach.

Other options exist for storing large quantities of compressed air. For large-scale applications, underground storage is likely the least expensive solution—but the exact cost is highly location-specific. Seamless steel pipes are another approach for megawatt-scale storage. X65 steel (commonly used for natural gas pipelines) have roughly half the tensile strength of the CrMo steel used in the gas storage tanks mentioned above, but costs proportionately less. Welding X65 (or similar) pipes together to form a large storage unit, especially if installed underground as is done with natural gas pipelines, could be a more economical solution than packing many small air tanks into a shipping container.

The cost per kilowatt of power delivered is driven by the cost of our expansion/compression mechanism. That cost per kilowatt of power delivered is more complex to compute, as there are a number of different components. There are also trade-offs to be made between the triad of cost, efficiency, and power output. For example, running slower improves the thermal efficiency, but reduces the power output. A bigger heat exchanger improves efficiency but costs more.

Estimate for a typical 500 kW system are shown in the table below:

| Component | Unit #1 Cost ($000) | Unit #500 Cost ($000) |
|---|---|---|
| Compressor frame | 175 | 100 |
| Custom cylinders | 45 | N/A |
| Spray system | 20 | 10 |
| Valves | 50 | 25 |
| Heat exchange/Thermal store | 50 | 30 |
| Air-water separator | 30 | 20 |
| Piping, misc. pressure vessels | 80 | 60 |
| Motor-generator | 50 | 40 |
| Control and power electronics | 50 | 30 |
| Balance of system | 50 | 30 |
| Compressor/expander Total | 600 ($1200/kW) | 345 ($690/kW) |
| Air storage (6 hours = 3 MWHrs) | 600 | 450 |
| System Total | 1200 ($400/kWhr) | 795 ($265/kWhr) |
| Lithium-ion battery system | 3000 ($1000/kWhr) | 2250 ($750/kWhr) |

The cost of units is expected to be cost-reduced in a number of areas compared with the initial production units. Most significantly, it will likely be built on a custom compressor frame that integrates the cylinders into the engine block.

Note that the "System Total" line is divided by the number of kilowatt-hours stored to give a system cost per kilowatt-hour for a six-hour system. This allows a more or less direct comparison with the cost of a comparable battery system, which is typically quoted as a price per kilowatt-hour.

Mechanical Versus Hydraulic Compression

Figure 3:
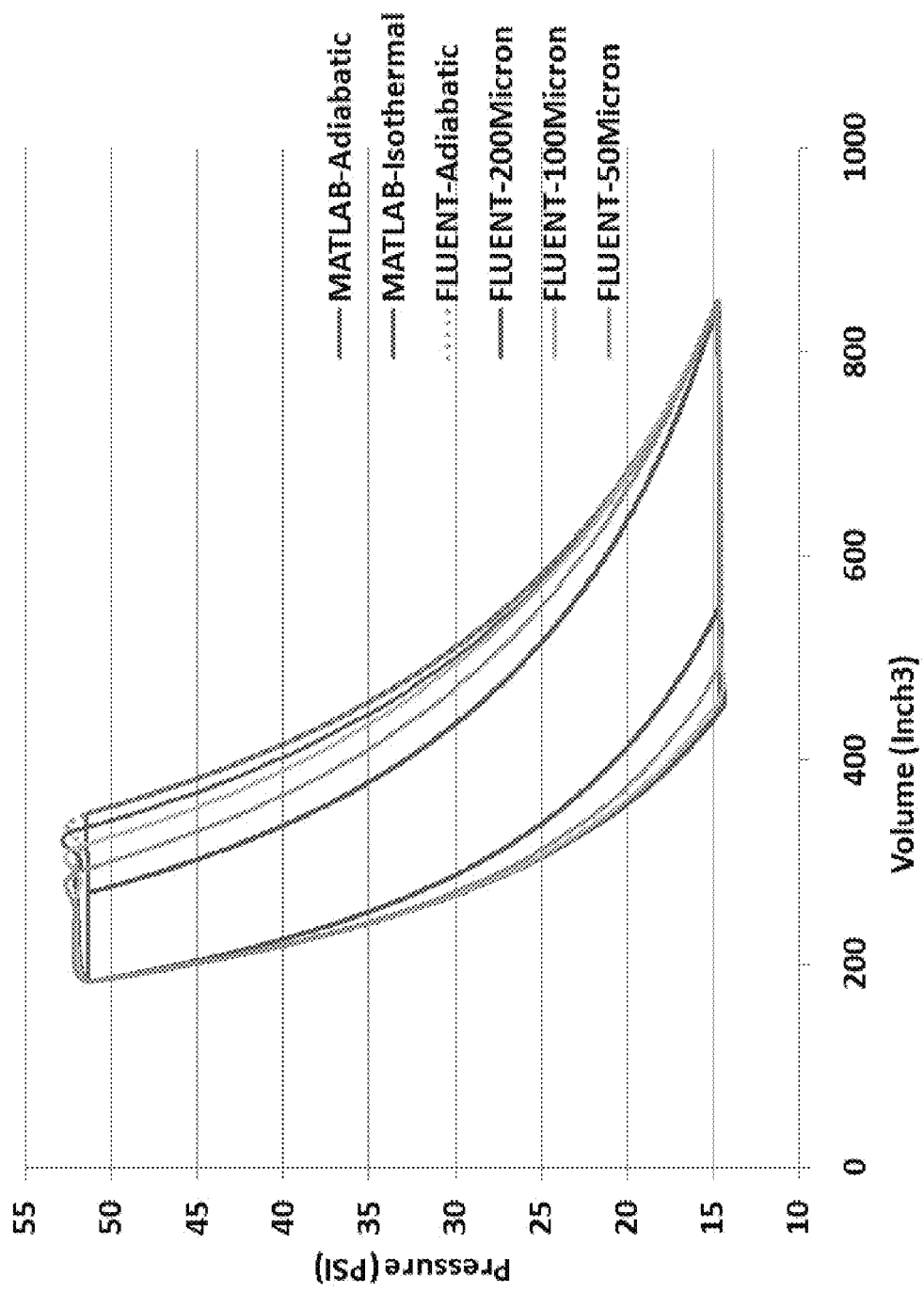
FIG. 3 provides the P-V curve at various particle sizes.

Other approaches to air compression for energy storage purposes have been proposed. One such approach that is being developed is hydraulic or "liquid piston" compression. An embodiment of such a system is shown in FIG. 3 of U.S. Nonprovisional patent application Ser. No. 13/010,683 filed Jan. 20, 2011 ("the '683 Application"), incorporated by reference in its entirety herein for all purposes.

In a liquid piston system, hydraulic fluid is pumped from one pressure vessel into another via a hydraulic motor, compressing the air inside the second vessel. At the end of the compression stroke, the first vessel will be empty of fluid (but filled with air drawn in at atmospheric pressure), and the second vessel will be filled with fluid.

In the FIG. 3 of the '683 Application, the four-way hydraulic valve shown at the lower left of changes state, and the flow direction reverses, compressing the air in the first pressure vessel. Expansion works in a similar fashion, with the compressed air in the air storage tank expanding to push fluid through the hydraulic motor, turning a generator.

This is a viable approach to air compression, with the virtue that the same mechanism can be used for expansion as well as compression. Such approaches, however, may face challenges in providing sufficient efficiency and power density. For example hydraulic motors, generally speaking, aren't as efficient as reciprocating mechanical engines.

Moreover, columns of fluid can't move as fast as mechanical linkages. In particular, the force of gravity may impose limits upon the efficient transfer of power utilizing a hydraulic system. For example, downward acceleration of a liquid column in excess of the pull of gravity, can give rise to non-laminar flow in the column that degrades efficient transfer of power.

This is the reason mechanical crankshafts and pistons are used where power density is important (in applications like automobile engines for example). To deliver a lot of power, a lot of air needs to be moved. This can present problems for system unable to move that air quickly.

To deliver a megawatt, for example, an expander would exhaust about three cubic meters of air per second. That would involve moving a same volume of hydraulic fluid from one pressure vessel to another via the hydraulic motor, likely requiring a large/cumbersome system.

Further Description

Included in the '683 Application is a description of various types of energy storage systems utilizing compressed gas as a storage medium. In certain embodiments, energy stored in the compressed gas is recovered by expansion of compressed gas in a cylinder device, to drive a moveable member (such as a reciprocating piston) that is in physical communication with a generator through a linkage (such as a crankshaft).

Figure 8:
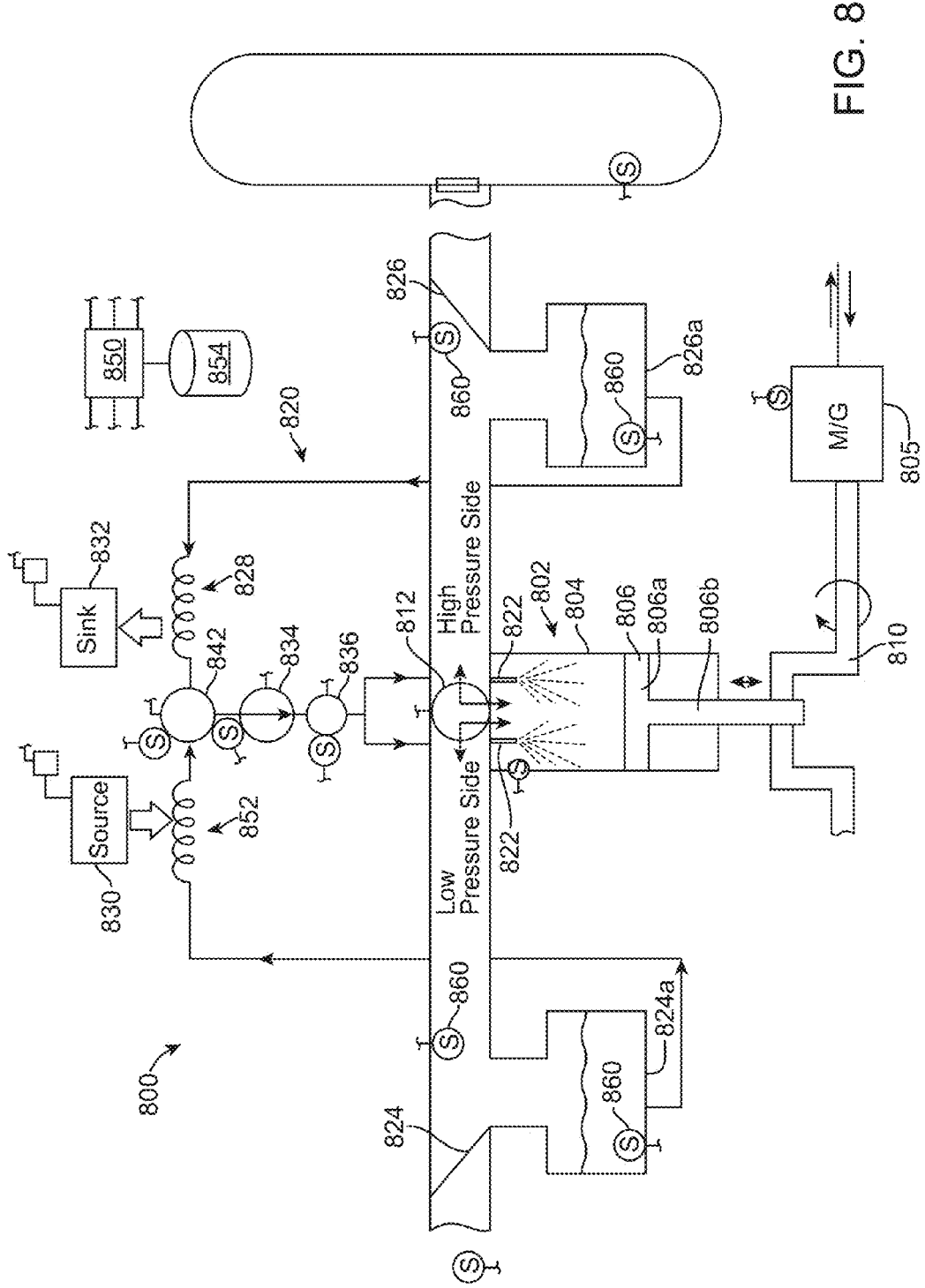
FIG. 8 shows a simplified view of an embodiment of an energy storage system.

FIG. 8 shows a simplified view of one embodiment of such a compressed gas energy system. In particular, the system 800 includes a compressor/expander 802 comprising a cylinder 804 having piston 806 moveably disposed therein. The head 806a of the piston is in communication with a motor/generator 808 through a piston rod 806b and a linkage 810 (here a crankshaft).

In a compression mode of operation, the piston may be driven by the motor/generator 805 acting as a motor to compress gas within the cylinder. The compressed gas may be flowed to a gas storage tank 870, or may be flowed to a successive higher-pressure stage for additional compression.

In an expansion mode of operation, the piston may be moved by expanding gas within the cylinder to drive the motor/generator acting as a generator. The expanded gas may be flowed out of the system, or flowed to a successive lower-pressure stage for additional expansion.

The cylinder is in selective fluid communication with a high pressure side or a low pressure side through valving 812. In this particular embodiment, the valving is depicted as a single multi-way valve. However, the present invention is not limited to such a configuration, and alternatives are possible.

For example, in lieu of a single, multi-way valve, some embodiments of the present invention may include the arrangement of multiple one-way, two-way, or three-way valves in series. Examples of valve types which could be suitable for use in accordance with embodiments of the present invention include, but are not limited to, spool valves, gate valves, cylindrical valves, needle valves, pilot valves, rotary valves, poppet valves (including cam operated poppet valves), hydraulically actuated valves, pneumatically actuated valves, and electrically actuated valves (including voice-coil actuated valves).

When operating in the compression mode, gas from the low pressure side is first flowed into the cylinder, where it is compressed by action of the piston. The compressed gas is then flowed out of the cylinder to the high pressure side.

When operating in the expansion mode, gas from the high pressure side is flowed into the cylinder, where its expansion drives the piston. The expanded gas is subsequently exhausted from the cylinder to the low pressure side.

While FIG. 8 shows an apparatus employing a moveable member configured to reciprocate within a chamber, this is not required. Alternative embodiments could employ a moveable member that is configured to undergo a different type of motion. Thus, some embodiments could employ a moveable member configured to rotate within a chamber. Examples include but are not limited to screws, and also rotors featuring blades, lobes, scrolls, or vanes. Some examples include but are not limited to turbines, gerotors, quasi-turbines, and roots-type devices.

While the particular embodiment of FIG. 8 shows power being communicated to and from the chamber through a mechanical linkage comprising a piston rod and a crankshaft, a wide variety of mechanical linkages are possible. Examples include but are not limited to multi-node gearing systems such as planetary gear systems. Examples of mechanical linkages include shafts such as crankshafts, chains, belts, driver-follower linkages, pivot linkages, Peaucellier-Lipkin linkages, Sarrus linkages, Scott Russel linkages, Chebyshev linkages, Hoekins linkages, swashplate or wobble plate linkages, bent axis linkages, Watts linkages, track follower linkages, and cam linkages. Cam linkages may employ cams of different shapes, including but not limited to sinusoidal and other shapes. Various types of mechanical linkages are described in Jones in "Ingenious Mechanisms for Designers and Inventors, Vols. I and II", The Industrial Press (New York 1935), which is hereby incorporated by reference in its entirety herein for all purposes.

And while the particular embodiment of FIG. 8 features the transmittal of power from the chamber by a mechanical linkage, this is also not necessarily required. Alternative embodiments could utilize other types of linkages, including but not limited to hydraulic linkages, magnetic linkages, electro-magnetic linkages, electric linkages, or pneumatic linkages.

Moreover, while FIG. 8 shows an apparatus comprising a single moveable member capable of operating in a reversible manner to compress gas or to be driven in response to expanding gas, this is also not required. Alternative embodiments could employ separate structures dedicated to the compression and expansion functions. In certain embodiments, these dedicated compression and expansion structures could be configured to be in selective communication with one another through a common linkage, which may be mechanical, hydraulic, pneumatic, magnetic, or electro-magnetic in nature. For example, particular embodiments may employ selective communication with a common rotating shaft through clutch mechanisms.

Embodiments of the present invention utilize heat exchange between liquid and gas that is undergoing compression or expansion, in order to achieve certain thermodynamic efficiencies. Accordingly, the system further includes a liquid flow network 820 that includes pump 834 and valves 836 and 842.

The liquid flow network is configured to inject liquid into the cylinder to perform heat exchange with expanding or compressing gas. In this embodiment, the liquid is introduced through nozzles 822. In other embodiments, a bubbler may be used, with the gas introduced as bubbles through the liquid.

The liquid that has been injected into the cylinder to exchange heat with compressed gas or expanding gas, is later recovered by gas-liquid separators 824 and 826 located on the low- and high-pressure sides respectively. Examples of gas-liquid separator designs include vertical type, horizontal type, and spherical type. Examples of types of such gas-liquid separators include, but are not limited to, cyclone separators, centrifugal separators, gravity separators, and demister separators (utilizing a mesh type coalescer, a vane pack, or another structure).

Liquid that has been separated may be stored in a liquid collector section (824*a* and 826*a* respectively). A liquid collector section of a separator may include elements such as inlet diverters including diverter baffles, tangential baffles, centrifugal, elbows, wave breakers, vortex breakers, defoaming plates, stilling wells, and mist extractors.

The collected separated liquid is then thermally conditioned for re-injection. This thermal conditioning may take place utilizing a thermal network. Examples of components of such a thermal network include but are not limited to liquid flow conduits, gas flow conduits, heat pipes, insulated vessels, heat exchangers (including counterflow heat exchangers), loop heat pipes, thermosiphons, heat sources, and heat sinks.

For example, in an operational mode involving gas compression, the heated liquid collected from gas-liquid separator 826 is flowed through heat exchanger 828 that is in thermal communication with heat sink 832. The heat sink may take one of many forms, including an artificial heat sink in the form of a cooling tower, fan, chiller, or HVAC system, or natural heat sinks in the form of the environment (particularly at high latitudes or altitudes) or depth temperature gradients extant in a natural body of water.

In an operational mode involving gas expansion, the cooled liquid collected from gas-liquid separator 824 is flowed through heat exchanger 852 that is in thermal communication with heat source 830. Again, the heat source may be artificial, in the form of heat generated by industrial processes (including combustion) or other man-made activity (for example as generated by server farms). Alternatively, the heat source may be natural, for example geothermal or solar in nature (including as harnessed by thermal solar systems).

Flows of liquids and/or gases through the system may occur utilizing fluidic and/or pneumatic networks. Examples of elements of fluidic networks include but are not limited to tanks or reservoirs, liquid flow conduits, gas flow conduits, pumps, vents, liquid flow valves, gas flow valves, switches, liquid sprayers, gas spargers, mixers, accumulators, and separators (including gas-liquid separators and liquid-liquid separators), and condensers. Examples of elements of pneumatic networks include but are not limited to pistons, accumulators, gas chambers liquid chambers, gas conduits, liquid conduits, hydraulic motors, hydraulic transformers, and pneumatic motors.

As shown in FIG. 8, the various components of the system are in electronic communication with a central processor 850 that is in communication with non-transitory computer-readable storage medium 854, for example relying upon optical, magnetic, or semiconducting principles. The processor is configured to coordinate operation of the system elements based upon instructions stored as code within medium 854.

The system also includes a plurality of sensors 860 configured to detect various properties within the system, including but not limited to pressure, temperature, volume, humidity, and valve state. Coordinated operation of the system elements by the processor may be based at least in part upon data gathered from these sensors.

Liquid that is being introduced for the purpose of heat exchange with gas undergoing compression or expansion according to embodiments of the present invention, may exhibit particular performance characteristics. One performance characteristic is droplet size.

Droplet size may be measured using DV50, Sauter mean diameter (also called SMD, D32, d32 or D[3, 2]), or other measures. Embodiments of nozzles according to the present invention may produce liquid droplets having SMD's within a range of between about 10-300 microns. Examples of droplet sizes produced by embodiments of nozzles according to the present invention may include but are not limited to those having a SMD of about 300 microns, 250 microns, 200 microns, 150 microns, 100 microns, 90 microns, 80 microns, 70 microns, 60 microns, 50 microns, 40 microns, 30 microns, 25 microns, and 10 microns.

Another performance characteristic of liquid spray nozzles according to embodiments of the present invention, is flow rate. Embodiments according to the present invention may produce a flow rate of between about 20 and 0.01 liters per second. Examples of flow rates of embodiments of nozzles according to the present invention are 20, 10, 5, 2, 1, 0.5, 0.25, 0.1, 0.05, 0.02, and 0.01 liters per second.

Another performance characteristic of liquid spray nozzles according to embodiments of the present invention, is breakup length. Liquid output by embodiments of nozzles according to the present invention may exhibit a breakup length of between about 1-100 mm. Examples of breakup lengths of sprays of liquid from nozzles according to the present invention include 100, 50, 25, 10, 5, 2, and 1 mm.

Embodiments of nozzles according to the present invention may produce different types of spray patterns. Examples of spray patterns which may be produced by nozzle embodiments according to the present invention include but are not limited to, hollow cone, solid cone, stream, single fan, and multiple fans.

Embodiments of nozzles according to the present invention may produce spray cone angles of between about 20-180 degrees. Examples of such spray cone angles include but are not limited to 20 °, 50°, 90°, 120°, 140°, 150°, 155°, 160°, 165°, 170°, 175°, and 180°.

Droplet spatial distribution represents another performance characteristic of liquid spray nozzles according to embodiments of the present invention. One way to measure droplet spatial distribution is to measure the angle of a sheet or cone cross-section that includes most of the droplets that deviate from the sheet. In nozzle designs according to embodiments of the present invention, this angle may be between 0-90 degrees. Examples of such angles possibly produced by embodiments of the present invention include but are not limited to 0°, 1°, 2°, 3°, 4°, 5°, 7.5°, 10°, 15°, 20°, 25°, 30°, 45°, 60°, 75°, or 90°.

According to certain embodiments of the present invention, it may be important to control the amount of liquid introduced into the chamber to effect heat exchange. The ideal amount may depends on a number of factors, including the heat capacities of the gas and of the liquid, and the desired change in temperature during compression or expansion.

The amount of liquid to be introduced may also depend on the size of droplets formed by the spray nozzle. One measure of the amount of liquid to be introduced, is a ratio of the total surface area of all the droplets, to the number of moles of gas in the chamber. This ratio, in square meters per mole, could range from about 1 to 250 or more. Examples of this ratio which may be suitable for use in embodiments of the present invention include 1, 2, 5, 10, 15, 25, 30, 50, 100, 125, 150, 200, or 250.

Two-Phase Heat Transfer

As mentioned above, embodiments of the present invention may utilize heat exchange between liquid and gas that is undergoing compression or expansion, in order to achieve certain thermodynamic efficiencies. In certain embodiments this liquid may be introduced into the cylinder in the form of fine liquid droplets that become entrained within the gas flow.

Embodiments in accordance with the present invention are not limited to injection of liquids in any particular direction relative to a direction of motion of a moveable member, or to a direction of an inlet flow of gas. For example, the particular embodiments of FIGS. 8, 11, and 33-36 feature liquid sprayers positioned on end walls of a cylinder with valve structures.

In the configuration of these embodiments, owing to the location of the sprayers, liquid may be injected into the chamber in a direction parallel to the movement of the piston. Such an orientation may promote interaction between the gas and the injected liquid to form a liquid-gas mixture having the desired properties.

In other embodiments, the direction of liquid injection need not necessarily be substantially coincident with the direction of inlet of gases through gas flow valves located on the end walls of the chamber. Such an orientation may promote interaction between the gas and the injected liquid to form a liquid-gas mixture having the desired properties.

For example, the particular embodiment of FIG. 31 shows sprayers positioned on opposite side walls of the chamber, with the valve structures positioned on the end walls. Accordingly, a direction of liquid injection may not necessarily be substantially parallel to a direction of gas flowed into the chamber (in compression or expansion mode). Such lack of coincidence between the direction of liquid injection and directions of inlet gas flow, may promote gas-liquid mixing and the formation of a liquid-gas mixture having the desired properties.

According to still other embodiments, liquid could be sprayed in directions not corresponding to either the direction of gas flow or of piston reciprocation. Such lack of coincidence between the direction of liquid injection and directions of inlet gas flow or piston movement could further promote gas-liquid mixing in a manner to promoting heat exchange.

While the embodiments shown in certain of figures shows sprayers positioned on one chamber wall, this is not required. According to alternative embodiments, sprayers could be positioned on a plurality of walls. Such a configuration may be facilitated by use of a liquid manifold extending around multiple sides of the compression or expansion chamber. In some embodiments, the outlets of the sprayers may be aligned in a uniform or non-uniform manner relative to each other.

Certain embodiments may position valves and sprayers proximate to one another within a within a relatively small region at the end wall of the chamber. Such a clustering of elements within a small space may affect design, construction, inspection, and/or maintenance of the apparatus.

However, it is typically the orientation of the sprayers relative to a gas inlet valve, that determines the character of the liquid-gas mixture. In particular the liquid is injected into the inlet gas for heat exchange during compression/expansion processes. Because compression or expansion may be concurrent with inlet gas flow, it may be desirable to position the sprayers in a manner promoting rapid interaction between incoming gas and the liquid spray.

By contrast, the orientation of the liquid sprayers relative to the outlet valve may be less important. This is because the outlet valve is utilized simply to exhaust the liquid-gas mixture once an exchange of thermal energy during compression or expansion has already taken place.

Accordingly, certain embodiments of the present invention may introduce liquid through sprayers oriented relative to a single valve dedicated to regulating a flow of gases into the chamber in compression and/or expansion modes. By careful design of the sprayers and their position relative to the inlet valve, liquid may be introduced to the chamber to result in a liquid-gas mixture possessing the desired characteristics (such as droplet size, uniformity of droplet distribution, liquid volume fraction, temperature, and pressure). And because the same valve is used to admit gas in both the compression and expansion modes, a liquid-gas mixture having desired properties may be produced in each case.

The conditions under which liquid is introduced, may be different in the compression case versus the expansion case. For example during compression, the liquid will be introduced into a gas flow having a lower pressure. During expansion, the liquid will be introduced into a compressed gas flow having a higher pressure.

Accordingly, the operational parameters of certain elements may be controlled to produce a liquid-gas mixture having the desired properties. One example of a parameter which may be varied is the velocity at which the liquid is introduced into the chamber. Such a velocity parameter may be affected by variables such as the speed of the pump, and/or the dimensions of the sprayer, and/or characteristics of the conduit leading to the sprayer, such as bore, length, and number/degree of turns. In certain embodiments, the sprayer may comprise a nozzle having an orifice with dimensions adjustable to control a velocity of the liquid. In certain embodiments, the characteristics of the conduit leading to the sprayer may be changed (for example by actuation of valving changing a path of liquid flow).

In certain embodiments, a pressure of the liquid may be changed. This may be done, for example, by altering a characteristic of operation of the pump (for example pump speed). In certain embodiments, liquid pressure may be changed by manipulation of a valve to give rise to pressure accumulation that is periodically relieved by bursts of liquid flows at high velocities.

The size of the liquid droplet may also affect its interaction with gas flows of different pressures. For example, a liquid droplet of a greater size may be able to penetrate more deeply into a compressed volume of gas. Thus in certain embodiments, the sprayer may be designed to produce droplet size that is different for the compression versus the expansion case.

Example #1

A series of simulations were devised to investigate flow dynamics and heat transfer within gas undergoing compression within a cylinder device. In particular, the cylinder device housed a horizontally reciprocating piston, with two gas input ports located in pockets in the upper portion of the cylinder head, and two gas output ports located in pockets in the lower portion of the cylinder head. Four liquid spray nozzles were arranged outside of the valve pockets in the cylinder head.

Simulations were carried out using MATLAB AND FLUENT. The velocities and directions of the gas flows through the inlet valves were calculated based upon the cylinder size, inlet valve size, and a piston speed of 300 RPM.

The simulations utilized Lagrangian particle tracking to estimate the cooling effect brought about by liquid particles injected from nozzles. Heat transfer through a splash effect was not considered. The droplets were terminated upon hitting the wall of the cylinder device.

In particular, turbulence effects were accounted for using a k-epsilon model. A random stochastic tracking approach was used to account for turbulent dispersion of droplets.

Simulations were run with three different droplet sizes (200 microns, 100 microns, and 50 microns). The droplet size in a given simulation was uniform.

Figure 1A:
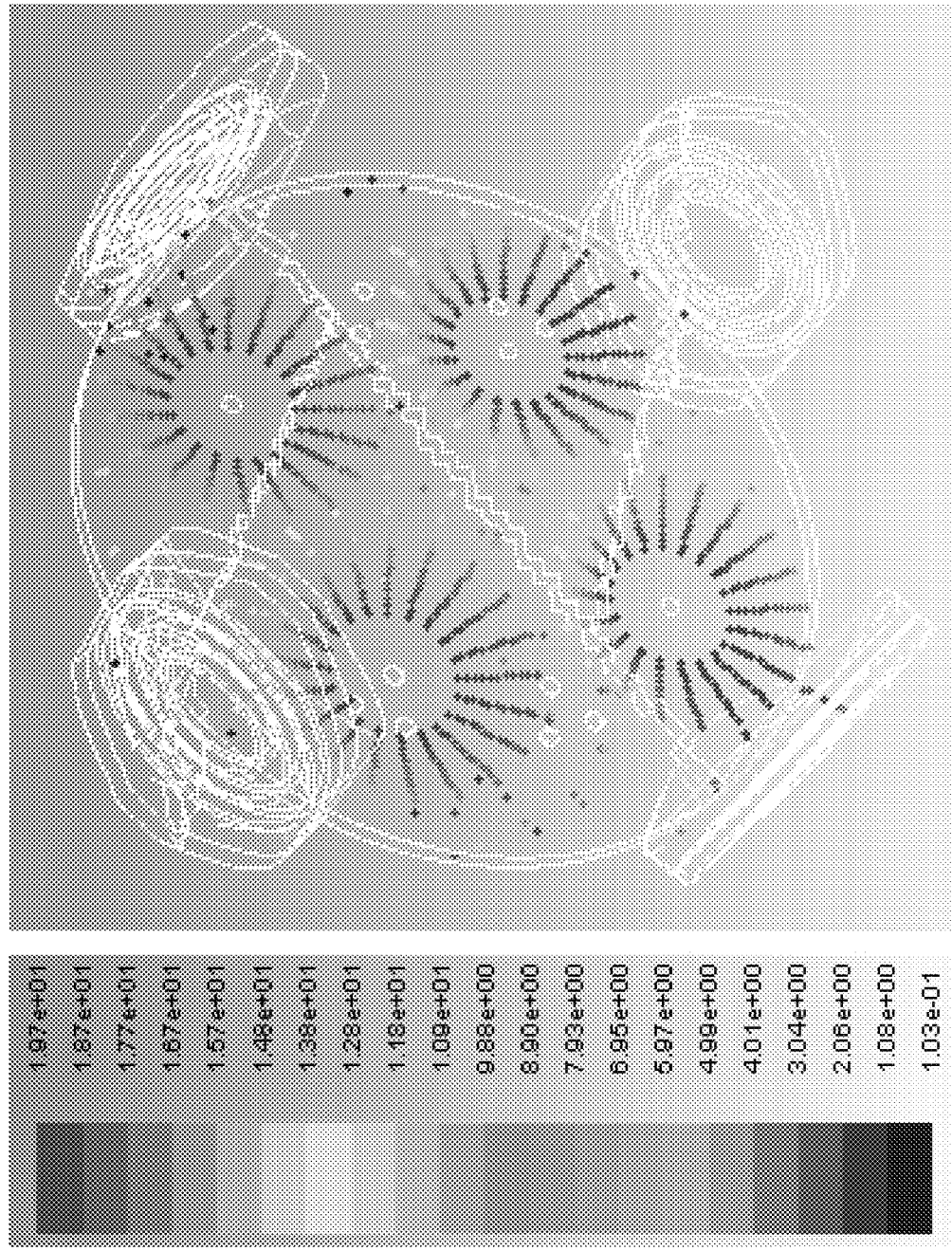
FIG. 1A shows droplet distribution (colored by particle velocity) modeled during compression for 200 micron droplets in a cylinder.
Figure 1B:
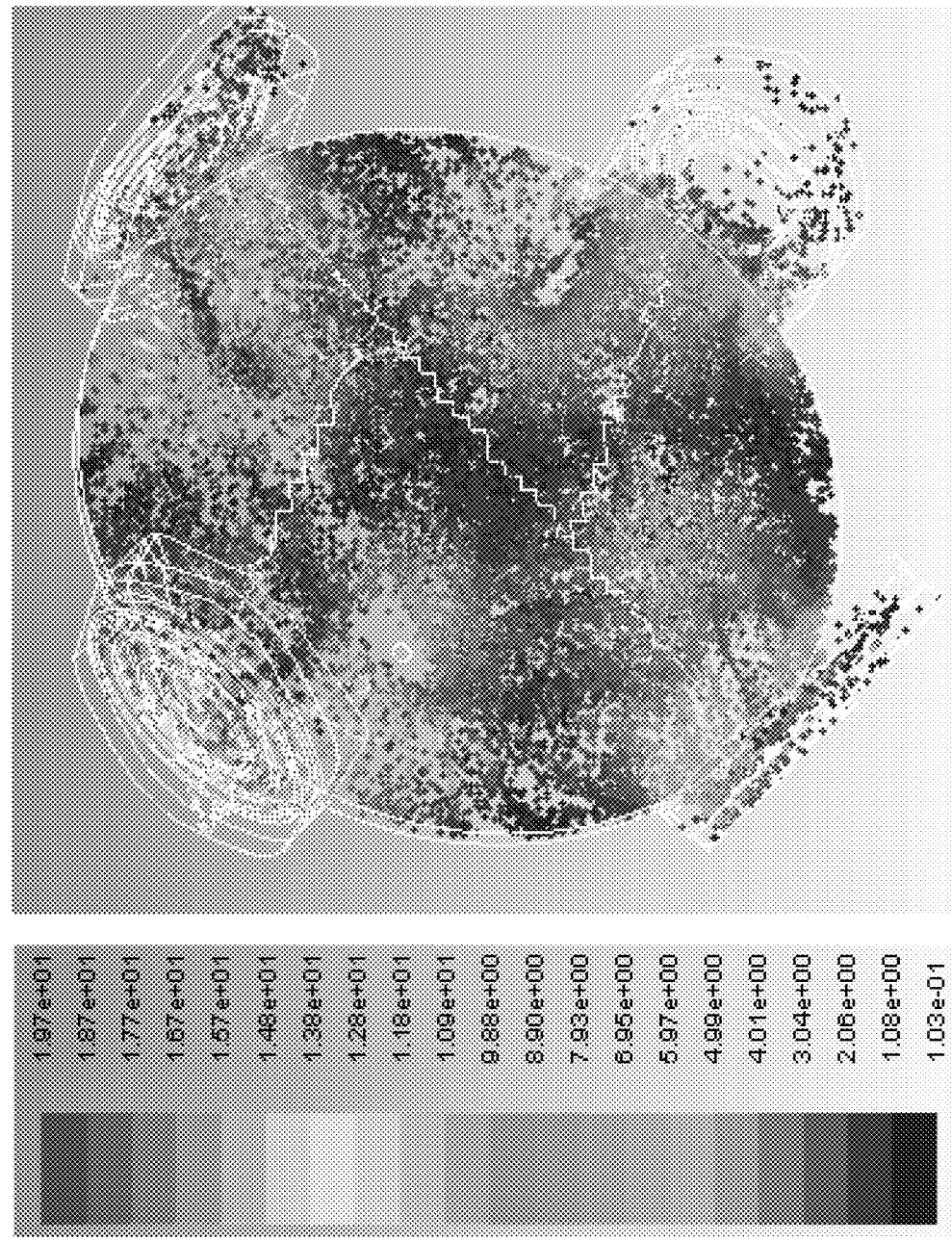
FIG. 1B shows the modeled droplet distribution for 50 micron droplets.

FIG. 1A shows the droplet distribution (colored by droplet velocity) during the compression part of cycle for 200 micron droplets. FIG. 1B shows the distribution for 50 micron droplets. The droplets were injected at a velocity of 20 m/s. The piston position is shown at a crank angle of 135 degrees. Comparison of FIGS. 1A-B shows that at a droplet size of 200 micron, there are less than 1/10 of the number of suspended droplets at 50 micron.

The simulation reflects that this difference in distribution of the different sized droplets within the cylinder, is primarily because the smaller 50 micron droplets slow down more quickly due to turbulent dispersion, and are thus able to become entrained in the flow.

Figure 2A:
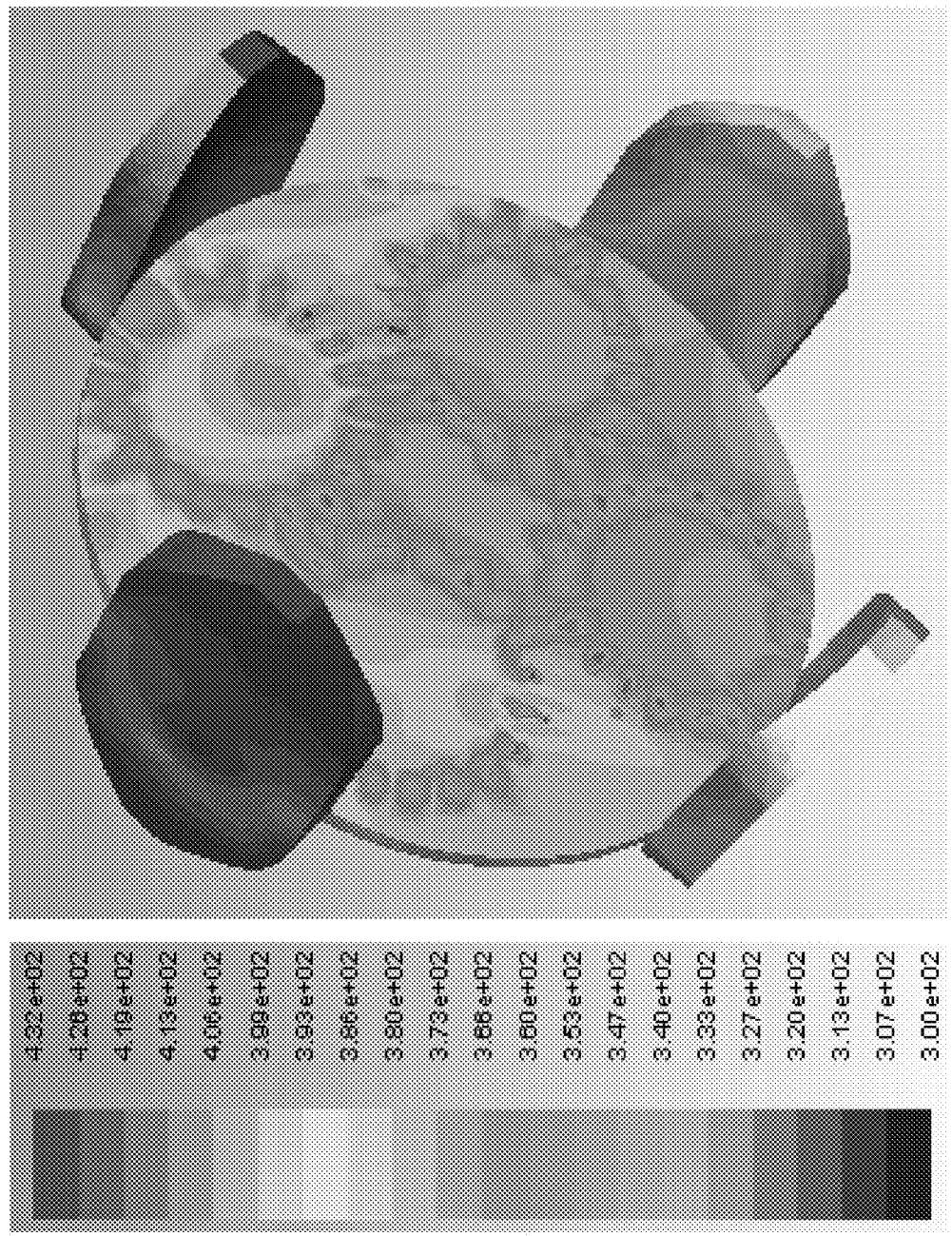
FIG. 2A shows the temperature distribution within the cylinder for 200 micron droplets.
Figure 2B:
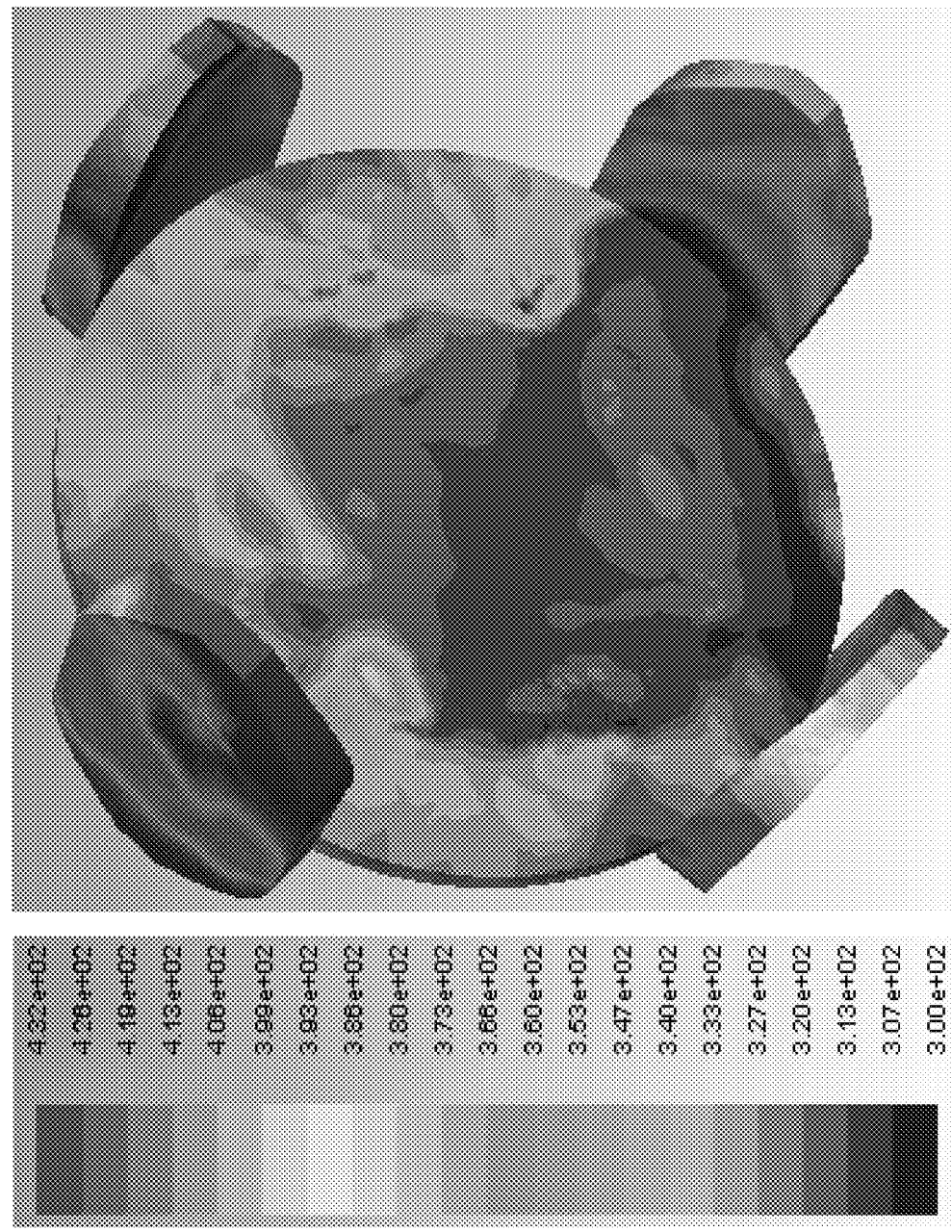
FIG. 2B shows the temperature distribution within the cylinder for 50 micron droplets.

FIGS. 2A-B shows the resulting temperature distribution within the cylinder, with particle sizes of 200 micron and 50 microns respectively. The particles were injected at a velocity of 100 m/s, and the crank angle is as in FIGS. 1A-B. The 50 micron particles appear to provide better heat transfer in comparison with 200 micron-sized particles.

FIG. 3 provides the P-V curve at various particle sizes. These were calculated utilizing FLUENT and MATLAB. The operation becomes more isothermal at smaller particle diameter.

Also, it seems to be easier to achieve isothermal behavior during compression rather than expansion because the particles have had greater chance to disperse inside the cylinder before the beginning of the compression part of the cycle.

Figure 4:
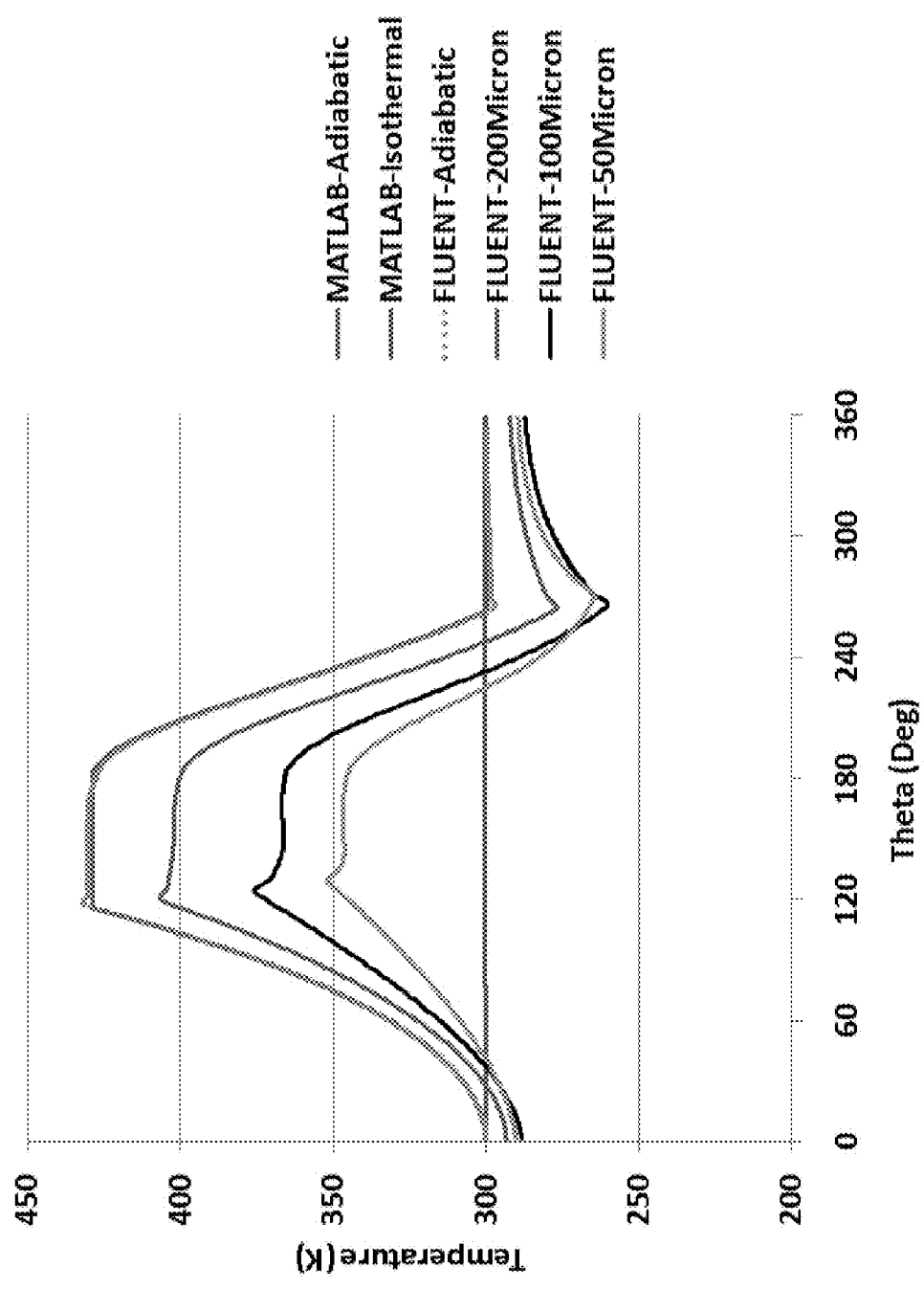
FIG. 4 shows the spatially average temperature inside the cylinder.

FIG. 4 shows the spatially average temperature inside the cylinder. This figure indicates that the 50 micron particle provides improved cooling.

Returning to FIGS. 2A-B, hot spots were observed in the inlet valve pocket for both the 200 micron and 50 micron particle sizes. Accordingly, the potential cooling effect of placing extra sprays/nozzles at the center of the valve pockets was also simulated.

Figure 5:
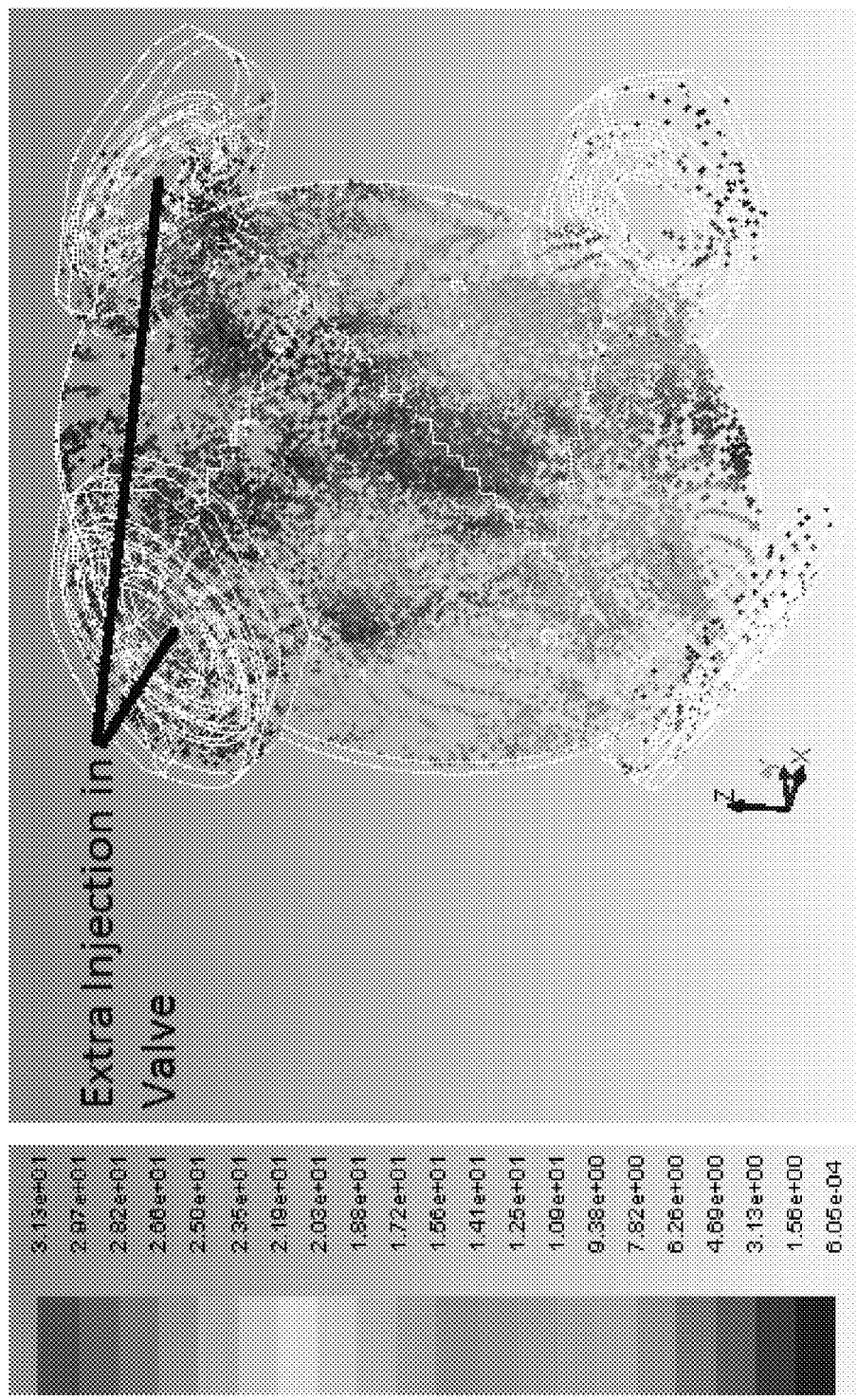
FIG. 5 shows the particle distribution when the nozzles are present in the center of the valve pockets.

FIG. 5 shows the particle distribution when the nozzles are present in the center of the valve pockets. The injected particle size is 50 microns, with a velocity of 30 m/s. The piston is running at 300 RPM, and the crank angle is 135 degrees.

Spray can be observed in the valve pockets, and is seen to cover a considerable region of these pockets. It may be desirable to have a smaller droplet diameter in this region to further improve the number of entrained droplets in valve pockets.

Figure 6:
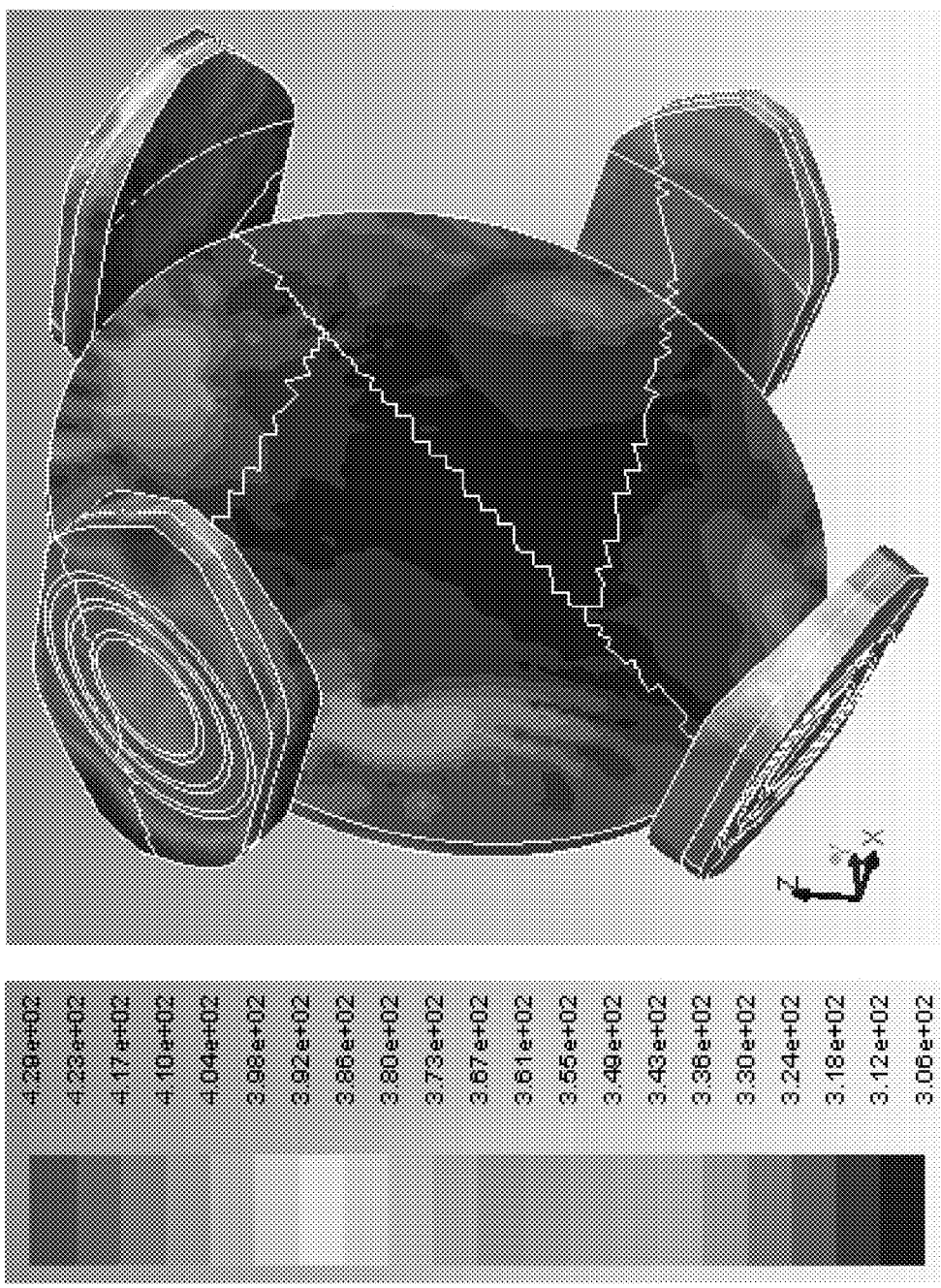
FIG. 6 shows the temperature distribution inside the cylinder.

FIG. 6 shows the temperature distribution inside the cylinder. Significant reduction in temperature inside the valve pocket is observed. However, regions with high temperature continue to persist.

Figure 7:
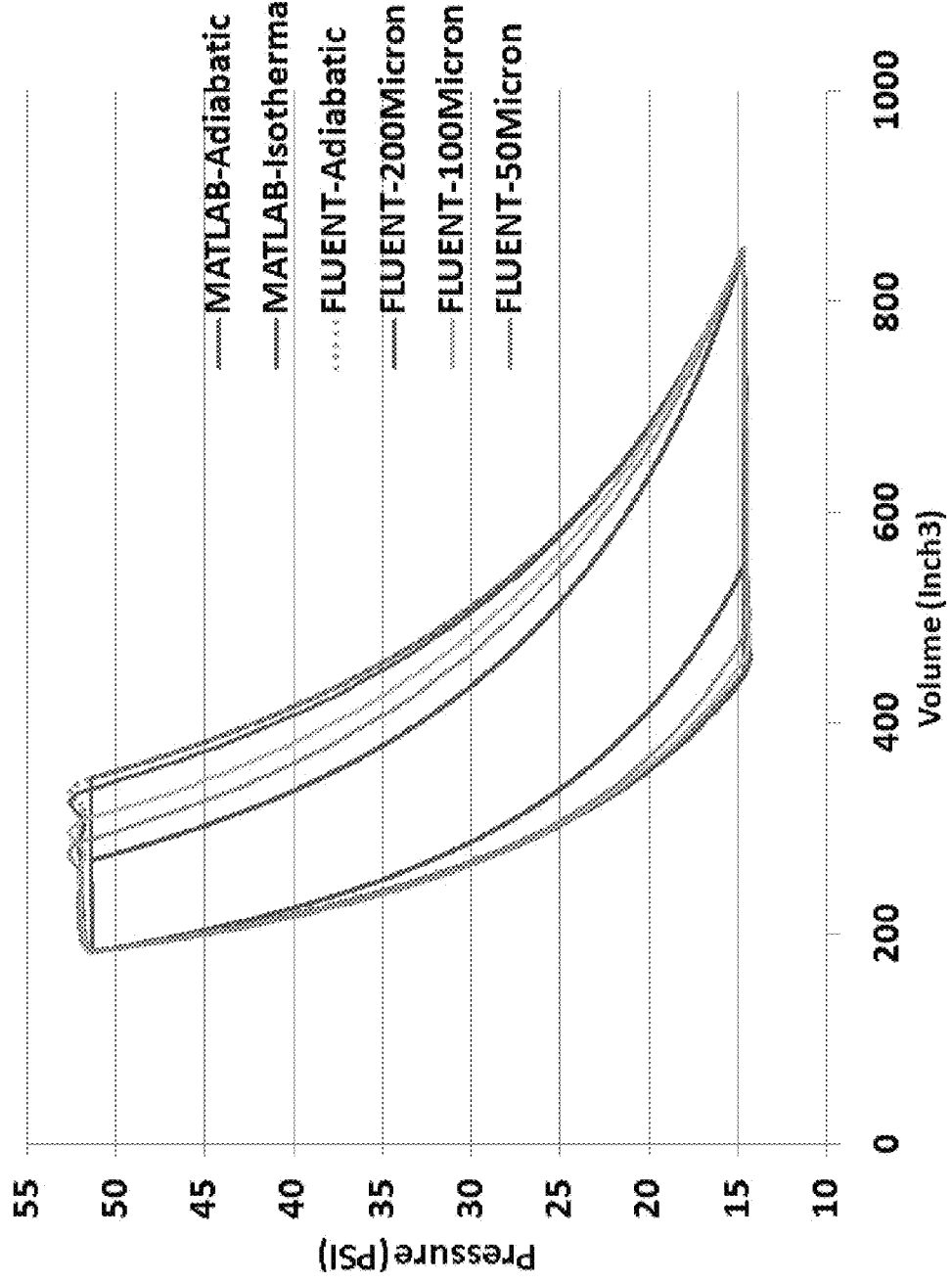
FIG. 7 shows P-V curve at various particle diameter when the nozzles are present in valve pocket.

FIG. 7 shows P-V curve at various particle diameter when the nozzles are present in valve pocket. Again, these were calculated utilizing FLUENT and MATLAB. The P-V curves for 50 micron and 100 micron particles are slightly closer to the isothermal P-V curve.

By contrast, not much impact is observed for 200 micron particle. This is likely because there is not enough entrainment of such droplets in the gas flow.

In conclusion, this CFD simulation example indicates that relatively few particles of size 200 microns are entrained in the flow. Instead, most of the 200 micron particles pass straight through the domain without slowing down and then impact of the walls of the compressor. Due to low entrainment of the larger particles, there is less cooling effect.

At particle sizes of 50 and 100 micron, more droplets become entrained in the gas flow and the average temperature is significantly lower. The number of 100 micron droplets suspended in the cylinder is 5 times the number of droplets of 200 microns. The number of droplets entrained in 50 microns is roughly 1.8 times the number of droplets at 100 microns.

Smaller droplet sizes seem to aid in the transfer of heat from the compressed gas. Droplets distributed with a Sauter mean diameter in the range of 100 microns or less may be valuable to achieve effective heat transfer.

The above example represents only one possible embodiment, to which the present invention should not be construed as being limited. For example, while this example utilizes k-epsilon modeling of turbulence, this is not required and other turbulence modeling approaches could be used.

For example, k-epsilon turbulence modeling is a two-equation form of a linear eddy viscosity model utilizing the Reynolds-averaged Navier-stokes (RANS) technique. Near-wall approaches are another two-equation form of this technique.

Alternative linear eddy viscosity models include but are not limited to algebraic models (including the Cebeci-Smith model, the Baldwin-Lomax model, the Johnson-King model, and roughness-dependent models), one-equation models (including Prandtl's one-equation model, the Baldwin-Barth model, and the Spalart-Allmaras model), k-omega models (including Wilcox's k-omega model, Wilcox's modified k-omega model, the SST k-omega model, and Near-wall treatment).

Nonlinear eddy viscosity models that are based upon RANS include but are not limited to, explicit nonlinear constitutive relation (including cubic k-epsilon and Explicit Algebraic Reynolds Stress Models—EARSM), and $v^2$-f models (including $v^2$-f and $\zeta$-f).

The Reynolds Stress Model (RSM) is another example of RANS-based turbulence model. An example of non-RANS based turbulence modeling is Large Eddy Simulation (LES) (which includes the Smagorinsky-Lilly model, the Dynamic subgrid-scale model, the RNG-LES model, the wall-adapting local eddy-viscosity (WALE) model, the kinetic energy subgrid-scale model, and near-wall treatment for LES models. Other examples of non-RANS based turbulence modeling include but are not limited to detached eddy simulation (DES), direct numerical simulation (DNS), and turbulence near-wall modeling.

Alternative Embodiments

The particular system shown in FIG. 8 represents only one embodiment of the present invention, and alternative embodiments having other features are possible. For example, while FIG. 8 shows an embodiment with compression and expansion occurring in the same cylinder, with the moveable element in communication through a linkage with a motor/generator, this is not required.

Figure 9:
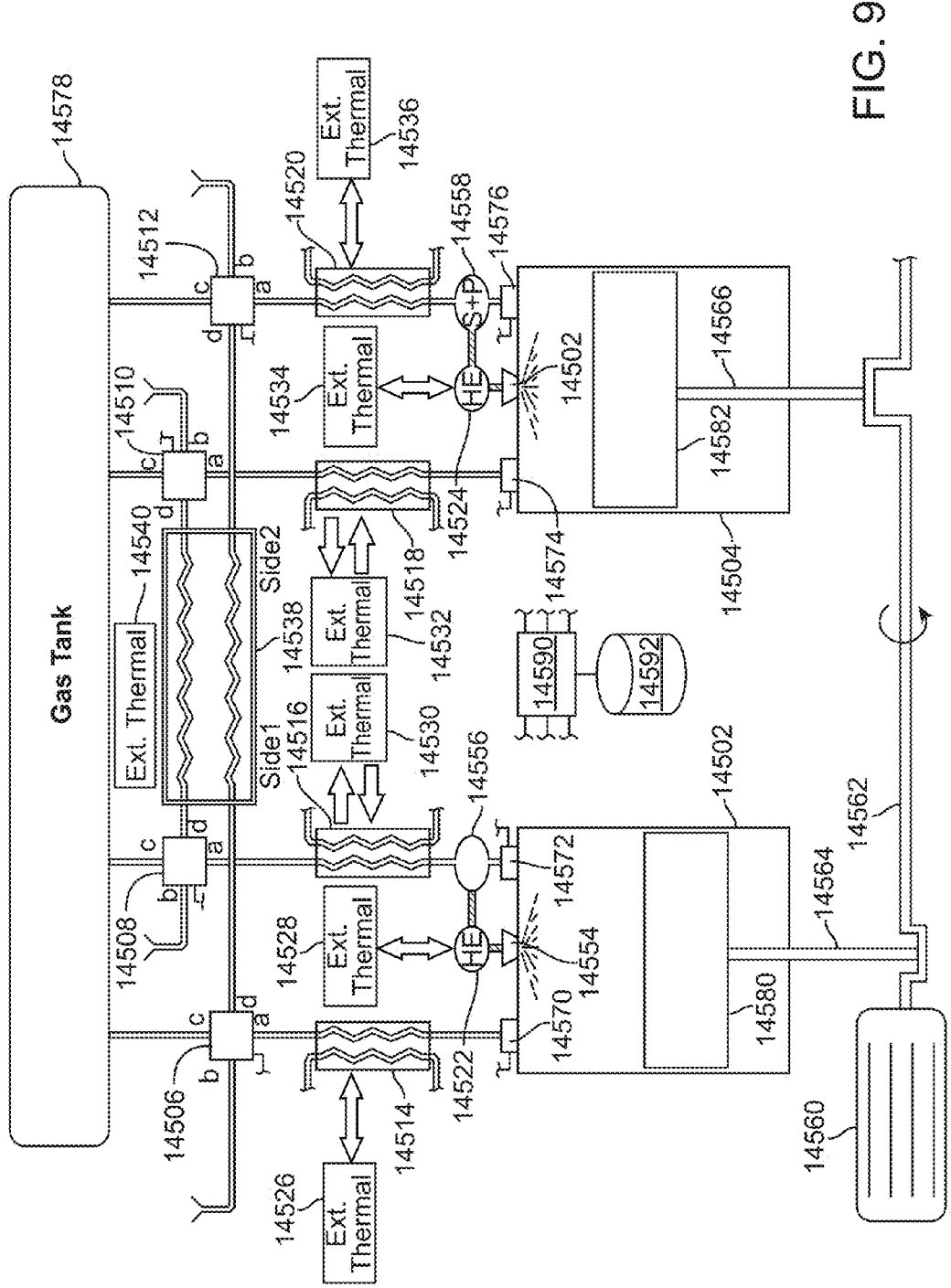
FIG. 9 shows a simplified view of an alternative embodiment of an energy storage system.

FIG. 9 shows an alternative embodiment utilizing two cylinders, which in certain modes of operation may be separately dedicated for compression and expansion. Embodiments employing such separate cylinders for expansion and compression may, or may not, employ utilize a common linkage (here a mechanical linkage in the form of a crankshaft) with a motor, generator, or motor/generator.

For example, FIG. 9A is a table showing four different basic configurations of the apparatus of FIG. 9. The table of FIG. 9A further indicates the interaction between system elements and various thermal nodes 14625, 14528, 14530, 14532, 14534, 14536, and 14540, in the different configurations. Such thermal nodes can comprise one or more external heat sources, or one or more external heat sinks, as indicated more fully in that table. Examples of such possible such external heat sources include but are not limited to, thermal solar configurations, geothermal phenomena, and proximate heat-emitting industrial processes. Examples of such possible such external heat sinks include but are not limited to, the environment (particularly at high altitudes and/or latitudes), and geothermal phenomena (such as snow or water depth thermal gradients).

Figure 9B:
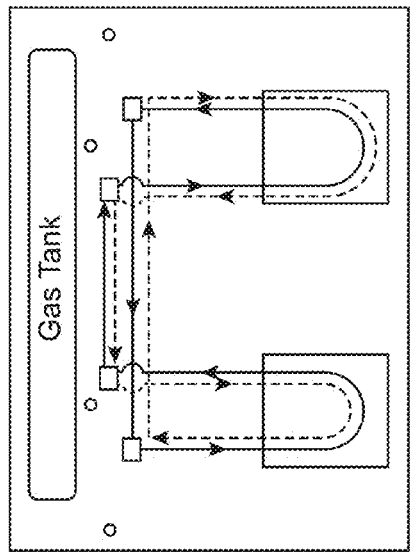
FIGS. 9BA-BF show simplified views of the gas flow paths in various operational modes of the system of FIG. 9.
Figure 9B:
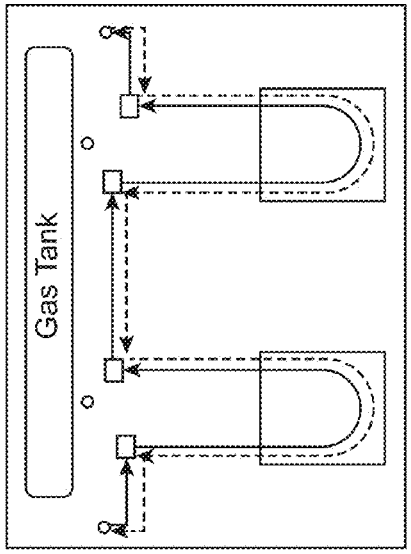
Figure 9B:
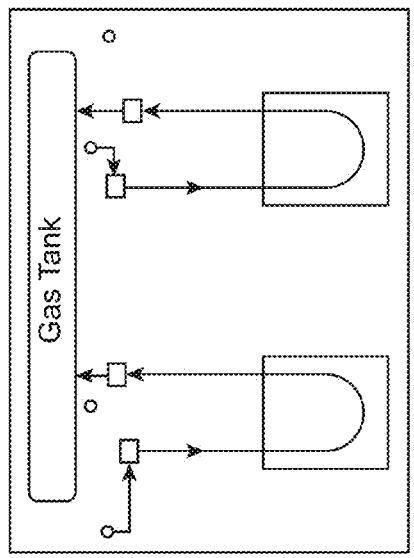
Figure 9B:
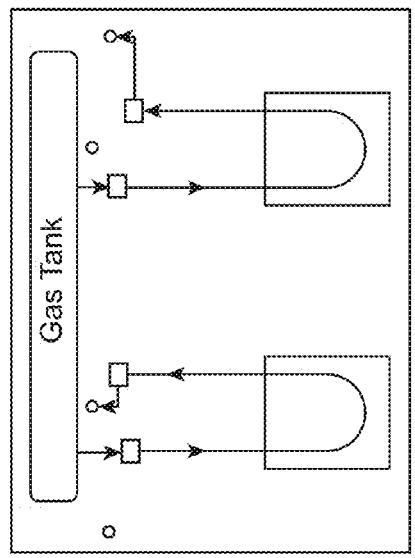
Figure 9B:
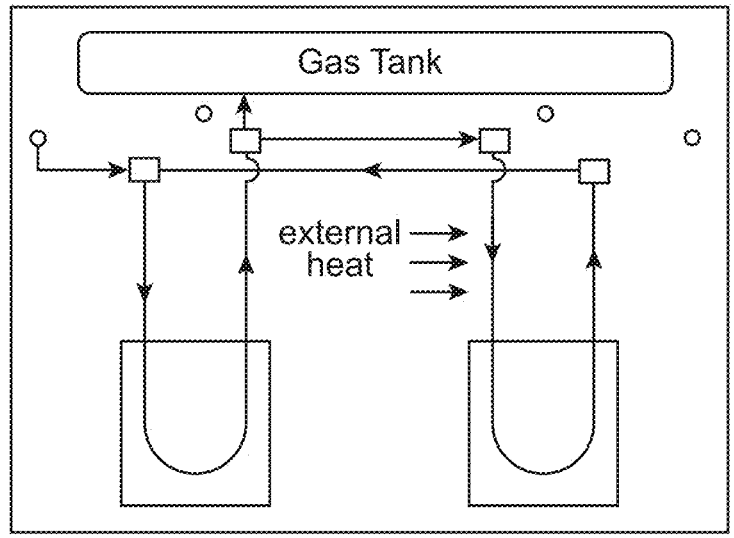
Figure 9B:
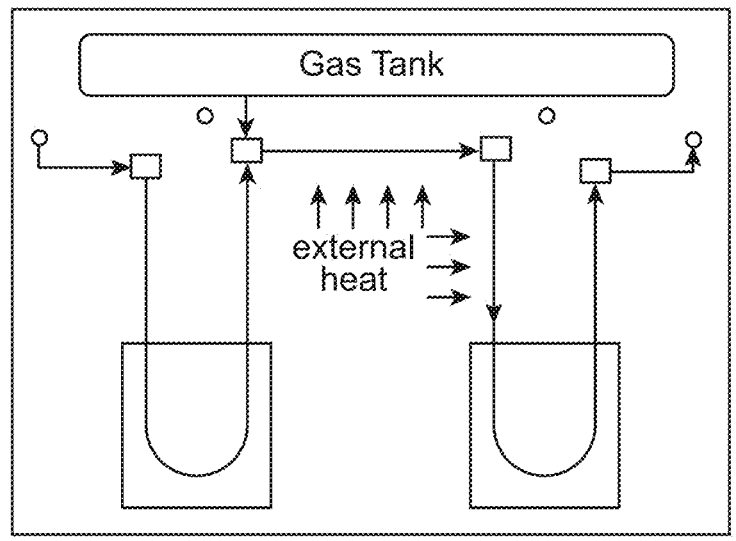

FIGS. 9BA-9BD are simplified views showing the various basic operational modes listed in FIG. 9A. The four different basic modes of operation shown in FIG. 9A may be intermittently switched, and/or combined to achieve desired results. FIGS. 9BE-BF show operational modes comprising combinations of the basic operational modes.

One possible benefit offered by the embodiment of FIG. 9 is the ability to provide cooling or heating on demand. Specifically, the change in temperature experienced by an expanding or compressed gas, or an injected liquid exchanging heat with such an expanding or compressed gas, can be used for temperature control purposes. For example, gas or liquid cooled by expansion could be utilized in an HVAC system. Conversely, the increase in temperature experienced by a compressed gas, or a liquid exchanging heat with a compressed gas, can be used for heating.

By providing separate, dedicated cylinders for gas compression or expansion, embodiments according to FIG. 9 may provide such temperature control on-demand, without reliance upon a previously stored supply of compressed gas. In particular, the embodiment of FIG. 9 allows cooling based upon immediate expansion of gas compressed by the dedicated compressor.

While FIGS. 8-9 show embodiments involving the movement of a solid, single-acting piston, this is not required. Alternative embodiments could utilize other forms of moveable elements. Examples of such moveable elements include but are not limited to double-acting solid pistons, liquid pistons, flexible diaphragms, screws, turbines, quasi-turbines, multi-lobe blowers, gerotors, vane compressors, scroll compressors, and centrifugal/axial compressors.

Moreover, embodiments may communicate with a motor, generator, or motor/generator, through other than mechanical linkages. Examples of alternative linkages which may be used include but are not limited to, hydraulic/pneumatic linkages, magnetic linkages, electric linkages, and electro-magnetic linkages.

While the particular embodiments of FIGS. 8-9 show a solid piston in communication with a motor generator through a mechanical linkage in the form of a crankshaft, this is not required. Alternative embodiments could utilize other forms of mechanical linkages, including but not limited to gears such as multi-node gearing systems (including planetary gear systems). Examples of mechanical linkages which may be used include shafts such as crankshafts, gears, chains, belts, driver-follower linkages, pivot linkages, Peaucellier-Lipkin linkages, Sarrus linkages, Scott Russel linkages, Chebyshev linkages, Hoekins linkages, swashplate or wobble plate linkages, bent axis linkages, Watts linkages, track follower linkages, and cam linkages. Cam linkages may employ cams of different shapes, including but not limited to sinusoidal and other shapes. Various types of mechanical linkages are described in Jones in "Ingenious Mechanisms for Designers and Inventors, Vols. I and II", The Industrial Press (New York 1935), which is hereby incorporated by reference in its entirety herein for all purposes.

1. A method comprising:
providing a cylinder device having a moveable member disposed therein;
allowing expanding gas within the cylinder device to accelerate the moveable member at greater than 9.8 m/s (1 g) in an absence of combustion;
spraying a liquid through a nozzle to create in the cylinder device a mist comprising droplets having a mean diameter of 100 um or less to exchange heat with the expanding gas;
flowing from the cylinder device, a mixture comprising expanded gas and the liquid; and
separating the liquid from the mixture.

2. A method as in claim 1 wherein the gas comprises air and the liquid comprises water.

3. A method as in claim 1 wherein the liquid droplet is introduced at approximately ambient temperature.

4. A method as in claim 1 wherein the moveable member is solid.

5. A method as in claim 4 wherein the moveable member comprises a solid piston.

6. A method as in claim 4 further comprising extracting energy by causing the moveable member to drive a physical linkage.

7. A method as in claim 6 wherein the physical linkage comprises a crankshaft.

8. A method as in claim 6 further comprising generating electricity from the physical linkage.

9. A method as in claim 1 wherein the mist comprises droplets having a mean diameter of 50 um or less.

10. A method as in claim 1 wherein expanding gas within the cylinder device accelerates the moveable member at greater than 10 g.

11. A method as in claim 1 further comprising flowing the gas to the cylinder device from a compressed gas storage unit.

12. A method as in claim 11 further comprising flowing the gas to the cylinder device from a higher-pressure expansion stage.

13. An apparatus comprising:
a cylinder device having a moveable member in communication with a mechanical linkage;
a valve in electronic communication with a control system to selectively admit compressed gas through a port of the cylinder device;
a nozzle configured to create in the cylinder device a mist comprising droplets having a mean diameter of 100 um or less to exchange heat with the compressed gas expanding within the cylinder in an absence of combustion; and an electrical generator in communication with the mechanical linkage.

14. An apparatus as in claim 13 further comprising a gas-liquid separator configured to receive a gas-liquid mixture from the cylinder device.

15. An apparatus as in claim 13 wherein the gas-liquid separator is configured to receive the gas-liquid mixture through a second port of the cylinder device.

16. An apparatus as in claim 13 wherein the cylinder device is in selective fluid communication with a compressed gas storage unit through the valve.

17. An apparatus as in claim 13 wherein the cylinder device is in selective fluid communication with a higher-pressure expansion stage through the valve.

18. An apparatus as in claim 13 wherein the mechanical linkage comprises a crankshaft.

19. An apparatus as in claim 13 wherein the mechanical linkage is in selective physical communication with a motor to cause the moveable member to compress gas within the cylinder device.

20. An apparatus as in claim 19 wherein the motor and the electrical generator comprise a motor/generator.

21. An apparatus as in claim 13 further comprising a second moveable member in physical communication with the mechanical linkage to compress gas within a second cylinder device.

What is claimed is:

1. An energy storage and recovery system comprising:
a reversible compressor/expander in selective fluid communication with a compressed gas storage unit and comprising an element configured to introduce liquid to effect gas-liquid heat exchange with gas being compressed or expanded within the reversible compressor/expander;
a gas-liquid separator configured to separate the liquid from a gas-liquid mixture received from the reversible compressor/expander;
an insulated thermal storage unit in thermal communication with separated liquid; and
a second insulated thermal storage unit configured to be in thermal communication with liquid separated by a second gas-liquid separator when the reversible compressor/expander is operating as a compressor.

2. An energy storage and recovery system as in claim 1 wherein the insulated thermal storage unit is configured to store the separated liquid.

3. An energy storage and recovery system as in claim 1 wherein the insulated thermal storage unit is configured to store a second liquid in thermal communication with the separated liquid through a heat exchanger.

4. An energy storage and recovery system as in claim 3 wherein the second liquid is maintained at a lower pressure than the gas-liquid mixture.

5. An energy storage and recovery system as in claim 3 wherein the separated liquid and the second liquid comprise water.

6. An energy storage and recovery system as in claim 3 wherein the separated liquid comprises water and the second liquid comprises an oil.

7. An energy storage and recovery system as in claim 3 wherein the heat exchanger comprises a tube-in-shell heat exchanger.

8. An energy storage and recovery system as in claim 3 wherein the heat exchanger comprises a counter flow heat exchanger.

9. An energy storage and recovery system as in claim 1 wherein the heat source is internal to the energy storage and recovery system.

10. An energy storage and recovery system as in claim 1 wherein the heat source is external to the energy storage and recovery system.

11. An energy storage and recovery system as in claim 1 further comprising a second insulated thermal storage unit configured to be in thermal communication with the separated liquid when the reversible compressor/expander is operating as a compressor.

12. An energy storage and recovery system as in claim 11 wherein the second insulated thermal storage unit is in thermal communication with a heat source.

13. An energy storage and recovery system as in claim 1 wherein the insulated thermal storage unit is configured to store a second liquid in thermal communication with the separated liquid through a heat exchanger.

14. An energy storage and recovery system as in claim 1 wherein the second insulated thermal storage unit is in thermal communication with a heat sink.

15. An energy storage and recovery system as in claim 1 wherein the reversible compressor/expander undergoes rotational motion.

16. An energy storage and recovery system as in claim 15 wherein the reversible compressor/expander comprises a turbine.

17. An energy storage and recovery system as in claim 1 wherein the reversible compressor/expander undergoes reciprocating motion.

18. An energy storage and recovery system as in claim 17 wherein the reversible compressor/expander comprises a crankshaft.

19. An energy storage and recovery system as in claim 1 wherein the element is configured to introduce liquid directly into the reversible compressor/expander.

20. An energy storage and recovery system as in claim 1 wherein the element is configured to introduce liquid upstream of the reversible compressor/expander.

21. An energy storage and recovery system as in claim 1 wherein the reversible compressor/expander further comprises an actively controlled valve.

22. An energy storage and recovery system as in claim 1 wherein:
the reversible compressor/expander comprises a valve pocket; and
the element comprises a sprayer in the valve pocket.

* * * * *